US006570563B1

(12) United States Patent
Honda

(10) Patent No.: US 6,570,563 B1
(45) Date of Patent: *May 27, 2003

(54) METHOD AND SYSTEM FOR THREE-DIMENSIONAL VIRTUAL REALITY SPACE SHARING AND FOR INFORMATION TRANSMISSION

(75) Inventor: Yasuaki Honda, Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/680,224

(22) Filed: Jul. 11, 1996

(30) Foreign Application Priority Data

Jul. 12, 1995 (JP) .............................. 7-175854

(51) Int. Cl.[7] ................................ G06J 15/00
(52) U.S. Cl. ...................... 345/419; 345/473
(58) Field of Search ................. 345/419, 502, 345/473; 706/11, 45; 707/201

(56) References Cited

U.S. PATENT DOCUMENTS

| 5,197,094 | A | | 3/1993 | Tillery et al. .................. 379/91 |
| 5,251,300 | A | | 10/1993 | Halliwell et al. ............ 395/200 |
| 5,315,709 | A | | 5/1994 | Alston, Jr. et al. ........... 395/600 |
| 5,471,629 | A | * | 11/1995 | Risch .......................... 707/201 |
| 5,490,239 | A | | 2/1996 | Myers ......................... 395/129 |

(List continued on next page.)

FOREIGN PATENT DOCUMENTS

| GB | 2256567 A | 12/1992 | ........... G06F/15/72 |
| JP | 5-233779 | 9/1993 | ........... G06F/15/62 |

OTHER PUBLICATIONS

J. Vitek, et al., "Taming Message Passing: Efficient Method Look–Up For Dynamically Typed Languages," Jul. 1994.*

M. Pesce, "VRML–Browsing And Building Cyberspace," New Riders Publishing, Copyright 1995, pp. 43–81.

(List continued on next page.)

Primary Examiner—Mark Zimmerman
Assistant Examiner—Lance W. Sealey
(74) Attorney, Agent, or Firm—Oblon, Spivak, McClelland, Maier & Neustadt, P.C.

(57) ABSTRACT

A method of minimizing the volume of communication necessary for displaying moving images is disclosed. When an object is moved on a client terminal, a message indicating the movement of the object is transmitted to a server terminal. The server terminal transmits the message to other client terminals. Each of the client terminals stores a message table in advance to execute the message. According the message table, an image for locally moving a particular object, for example, is generated and displayed. This novel setup transmits information about the update of an updated object composed of a plurality of sub objects each of whose state is subject to change, in a minimum transmission volume. This, in turn, allows cooperative operations of the plurality of sub objects to be smoothly displayed in a three-dimensional virtual reality space shared by a plurality of users.

67 Claims, 38 Drawing Sheets

U.S. PATENT DOCUMENTS

| | | |
|---|---|---|
| 5,546,584 A | 8/1996 | Lundin et al. ............... 395/700 |
| 5,557,724 A | 9/1996 | Sampat et al. .............. 395/157 |
| 5,566,280 A | 10/1996 | Fukui et al. ................ 395/119 |
| 5,588,104 A | 12/1996 | Lanier et al. ............... 395/326 |
| 5,588,914 A | 12/1996 | Adamczyk .................... 463/32 |
| 5,602,564 A | 2/1997 | Iwamura et al. ............ 345/119 |
| 5,608,446 A | 3/1997 | Carr et al. ..................... 348/6 |
| 5,623,642 A | 4/1997 | Katz et al. .................. 395/500 |
| 5,623,656 A | 4/1997 | Lyons ........................ 395/610 |
| 5,625,408 A | 4/1997 | Matsugu et al. .............. 348/42 |
| 5,625,818 A | 4/1997 | Zarmer et al. .............. 395/615 |
| 5,633,993 A | 5/1997 | Redmann et al. ........... 395/119 |
| 5,634,004 A | 5/1997 | Gopinath et al. ...... 395/200.02 |
| 5,634,053 A | 5/1997 | Noble et al. ................ 395/604 |
| 5,635,979 A | 6/1997 | Kostreski et al. ............. 348/13 |
| 5,659,691 A | 8/1997 | Durward et al. ............ 395/329 |
| 5,675,721 A | 10/1997 | Freedman et al. .......... 395/129 |
| 5,734,795 A * | 3/1998 | Rogers ......................... 706/45 |
| 5,742,767 A | 4/1998 | Honda ................... 395/200.32 |
| 5,826,266 A | 10/1998 | Honda ........................... 707/9 |
| 6,141,000 A * | 10/2000 | Martin ....................... 345/178 |

OTHER PUBLICATIONS

K. Matsuda et al, "Sony's Enhanced VRML Browser (Beta Version4B)–Cyber Passage Browser Manual," Software Library, Architecture Laboratories, Sony Corporation, Sony Computer Science Laboratory, (date text was written is and/or published is unknown), pp 1–2, 1–13.

Material Collected From The World Wide Web On Jun. 16, 1996: K. Matsuda et al, "Sony's Approach To Behavior And Scripting Aspects Of VRML: And Object–Oriented Perspective," Sony Computer Sciences Laboratory Inc. With Central Research Center, Sony Corp., (date text was written and/or published is unknown), pp. 1–6.

C. Morningstar et al, "The Lessons Of Lucasfilm's Habitat," First Steps, Michael Benedikt (Ed.), 1990, Mit Press, Cambridge, Mass., Address Is: File:///C/MY Documents/Lessons.HTML, pp. 1–13.

Materials Collected From The World Wide Web On Jun. 23, 1996, (date text was written and/or published is unknown), Pages Include: HTTP://WWW.COMMUNITIES.COM/HABITAT.HTML, pp. 1–2; FILE:///C/MY DOCUMENTS/DESCENT.GIF, pp. 1; HTTP://WWW.RACE.U–TOKYO.AC.JP/RACE/TGM/MUD/HABITAT.HTML, pp. 1–2; HTTP://WWW.NETUSA.NET/SHADOW/HABITAT/HABITAT.HTML, pp. 1–2.

Materials Collected From The World Wide Web On Jun. 21, 1996, (date the text was written and/or published is unknown), Pages Included: HTTP://VS.SONY.CO.JP/VS–E/VSTOP.HTML, pp. 1–2; HTTP://VS.SONY.CO.JP/VS–E/WORKS/BROWSER/WHAT.HTML, pp. 1–2; HTTP://VS.SONY.CO.JP/VS–E/WORKS/SERVER/WHAT.HTML, pp. 1–2; HTTP://VS.SONY.CO.JP/VS–E/INFO/TECHINFO.HTML, pp. 1–3; HTTP://VS.SONY.CO.JP/VS–E/INFO/FAQ/ , pp. 1–5.

Proceedings: Human Factors In Computing Systems, Monterey, CA, May 3–7, 1992, ACM Press, USA, pp. 329–334, C. Codella et al., "Interactive Simulation In A Multi–Person Virtual World".

Proceedings: Computer Animation, Geneva, Switzerland, Apr. 19–21, 1995, IEEE Comput. Soc. Press, USA, pp. 44–49, G. Singh et al., "Networked Virtual Worlds".

Fujitsu Scientific And Technical Journal, Japan, vol. 26, No. 3, Oct. 1990, pp. 197–206, K Fukuda et al., "Hypermedia Personal Computer Communication System: Fujitsu Habitat".

Proceedings: Virtual Reality Annual International Symposium, Seattle, WA, Sep. 18–22, 1993, IEEE C. Soc. Press, USA, pp. 394–400, C. Carlsson et al., "Drive—A Multi–User Virtual Reality System".

Proceedings: Virtual Reality Annual International Symposium, Research Triangle Park, NC, Mar. 11–15, 1995, IEEE C. Soc. Press, USA, pp. 11–18, Q. Wang et al, "EM—An Environment Manager For Building Networked Virtual Environments".

Proceedings: Advances In Parallel And Distributed Simulation, Anaheim, CA, Jan. 23–25, 1991, vol. 23, No. 1, SCS, USA, pp. 104–111, C. Kanarick, "A Technical Overview And History Of The Simnet Project".

Proceedings 1992 Symposium On Interactive 3D Graphics, Mar. 29, 1992—Apr. 1, 1992, New York, US, pp. 147–156, M. Zyda et al., "NPSNET: Constructing A 3D Virtual World".

Proceedings Of The INET/JENCS, Jun. 15–17, 1994, Reston, VA, US, pp. 242/1–242/3, D. Raggett, "Extending WWW To Support Platform Independent Virtual Reality".

Communicating With Virtual Worlds, Proceedings Of Computer Graphics International, Jun. 21–25, 1993, Tokyo, JP, pp. 41–49, M. Gigante et al., "Distributed, Multi–Person, Physically–Based Interaction In Virtual Worlds".

"Shopping As Virtual Reality," Chain Store Executive, vol. 69, No. 9, Sep. 1993, pp. 64.

J. Stoppi, "VR–Chitecture"—A New Discipline, IEE Colloquim On Distributed Virtual Reality, Digest No. 121, May 1993, pp. 6/1–3.

G. House, "Going To The Shopping Mall Via VR," Virtual Reality World, Nov.–Dec. 1994, vol. 2, No. 6, pp. 41–43.

J. Vitek, et al., Proc. Europ. Conf. on Object–Oriented Programming, pp. 1–18, "Taming Message Passing: Efficient Method Look–Up For Dynamically Typed Languages", Jul. 1994.

* cited by examiner

CYBERSPACE SYSTEM

VIRTUAL WORLD MODEL

VIEWPOINT FROM AVATAR C

VIEWPOINT FROM AVATAR D

FIG. 9A

MESSAGE TABLE

| MESSAGE NO. | CONTENTS | |
|---|---|---|
| 1 | MOVE | OBJECT ID<br>ORIENTATION<br>VELOCITY<br>PERIOD |
| 2 | STOP | OBJECT ID |
| 3 | MOVE AVATAR | OBJECT ID<br>ORIENTATION<br>DISTANCE<br>NO. OF HAND SWIVELS<br>NO. OF LEG SWIVELS |
| 4 | START COMPLEX MOTION | OBJECT ID |
| 5 | STOP COMPLEX MOTION | OBJECT ID |
| 6 | START PARADE | FIRST OBJECT $ID_1$<br>SECOND OBJECT $ID_2$<br>$\vdots$<br>LAST OBJECT $ID_n$<br>ORIENTATION<br>VELOCITY<br>PERIOD<br>NO. OF HAND SWIVELS<br>NO. OF LEG SWIVELS |
| $\vdots$ | $\vdots$ | $\vdots$ |

PROTOCOL TYPE · FILE NAME http : // www. csl. sony. co. jp / index. html

HOST NAME

FIG. 29

| CASE | BASIC OBJECT DATA STORED IN : | URL OF UPDATE OBJECT DATA STORED IN : | UPDATE OBJECT DATA STORED IN : |
|---|---|---|---|
| 1 | VRML FILE OF SPECIFIC DIRECTORY IN STORAGE DEVICE OF INFORMATION SERVER | DEFAULT URL | INFORMATION SERVER |
| 2 | | MAPPING SERVER | SHARED SERVER IN JAPAN |
| 3 | | | SHARED SERVER IN US |
| 4 | VRML FILE OF SPECIFIC DIRECTORY IN STORAGE DEVICE OF CLIENT TERMINAL | MANUALLY SPECIFY URL | SPECIFIED SHARED SERVER |
| 5 | | MAPPING SERVER | SHARED SERVER IN JAPAN |
| 6 | | | SHARED SERVER IN US |
| 7 | VRML FILE OF SPECIFIC DIRECTORY OF CD-ROM OF CLIENT TERMINAL | MANUALLY SPECIFY URL | SPECIFIED SHARED SERVER |
| 8 | | MAPPING SERVER | SHARED SERVER IN JAPAN |
| 9 | | | SHARED SERVER IN US |

F I G. 33

| | MINIMUM OPERATING ENVIRONMENT | RECOMMENDED OPERATING ENVIRONMENT |
|---|---|---|
| HARDWARE | PC ON WHICH WINDOWS 95/NT OPERATE | ↓ |
| CPU | 486D×2, 66MHz | PENTIUM 75MHz OR HIGHER |
| MEMORY | 12MB | 32MB OR HIGHER |
| DISK FREE SPACE | 3MB (9MB AT INSTALLATION) OR HIGHER | ↓ |
| RESOLUTION | 640 × 480 PIXELS | 800 × 600 PIXELS OR HIGHER |
| DISPLAY COLORS | 256 COLORS | 65536 COLORS OR HIGHER |
| SOFTWARE | NETSCAPE NAVIGATOR FOR WINDOWS (VER 2.0 OR LATER) | ↓ |
| SOUND | | SOUND BOARD |

F I G. 39

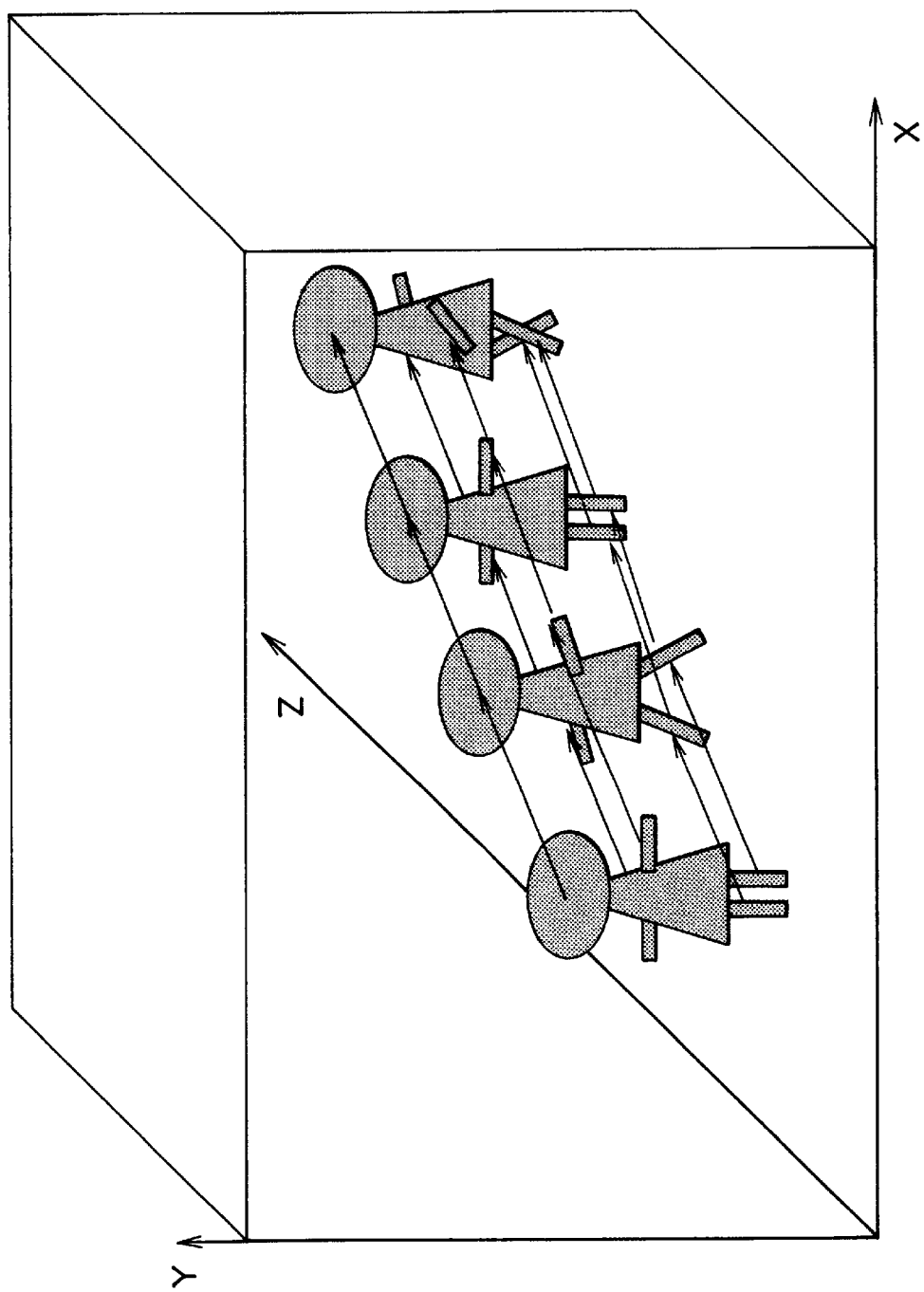

METHOD AND SYSTEM FOR THREE-DIMENSIONAL VIRTUAL REALITY SPACE SHARING AND FOR INFORMATION TRANSMISSION

BACKGROUND OF THE INVENTION

The present invention relates to a method of sharing a three-dimensional virtual reality space, a system of sharing a three-dimensional virtual reality space, a method of information processing, an information recording medium, a method of information recording, an information transmission medium, a method of information transmission, a client terminal, and a shared server terminal and, more particularly, to a method of sharing a three-dimensional virtual reality space, a system of sharing a three-dimensional virtual reality space, a method of information processing, an information recording medium, a method of information recording, an information transmission medium, a method of information transmission, a client terminal, and a shared server terminal which are suitable for generating a virtual reality space for example to be provided to users.

A cyberspace service named Habitat (trademark) is known in the so-called personal computer communications services such as NIFTY-Serve (trademark) of Japan and CompuServe (trademark) of the US in which a plurality of users connect their personal computers via modems and the public telephone network to the host computers installed at the centers of the services to access them in predetermined protocols. Development of Habitat started in 1985 by Lucas Film of the US, operated by Quantum Link, one of the US commercial networks, for about three years. Then, Habitat started its service in NIFTY-Serve as Fujitsu Habitat (trademark) in February 1990. In Habitat, users can send their alter egos called avatars (the incarnation of a god figuring in the Hindu mythology) into a virtual city called Populopolis drawn by two-dimensional graphics to have a chat (namely, a realtime conversation based on text entered and displayed) with each other. For further details of Habitat, refer to the Japanese translation of "Cyberspace: First Steps," Michael Benedikt, ed., 1991, MIT Press Cambridge, Mass., ISBN0-262-02327-X, the translation being published Mar. 20, 1994, by NTT Publishing, ISBN4-87188-265-9C0010, pp. 282–307.

In the related art cyberspace system operated on such personal communications servers as mentioned above, a virtual street, a virtual room interior, and the like are drawn in two-dimensional graphics. In such an environment, movement of an avatar backward or forward is realized simply by moving it up or down in a two-dimensional background, providing poor representation for enabling the user to experience walking or movement in the virtual space. Because this scheme makes the user look at the virtual space in which the user's avatar and another user's avatar are shown from the viewpoint of a third person, the sense of the pseudo experience is marred to a large extent. Therefore, realization of the walk-through capability has been awaited by the industry concerned, in which the virtual space is displayed in three-dimensional graphics and an avatar can walk freely in the virtual space from the viewpoint of avatar itself, thus enhancing the sense of pseudo experience.

On the other hand, for a related art example for realizing the sharing of a three-dimensional virtual reality space on a network, a system of FIG. 42 is known which is constituted by client terminals 3-1 through 3-3 interconnected by the LAN (Local Area Network) installed in companies or laboratories.

First, all client terminals 3-1 through 3-3 read graphics data from a storage device 2 of a server terminal 1 that describes the same three-dimensional space to display the same three-dimensional space. At this point of time, the three-dimensional spaces visually recognized by all users match each other. Namely, the client terminals 3-1 through 3-3 show three-dimensional images according to the viewpoints of the users of these terminals as shown in FIGS. 43 A through 43 C. In this example, a triangular pyramidal object 101, a quadrangular prism object 102, and a cylindrical object 103.

Meanwhile, if, at a client terminal 3-1, the user changed positions of the conical object 101, information about the change (change information) is sent from the client terminal 3-1 to the server 1 via a LAN 4. The change information about the movement is then transmitted from the server terminal 1 via the LAN 4 to the client terminals 3-2 and 3-3. Then, on the client terminals 3-2 and 3-3, the display position of the conical object is changed according to the change information transmitted from the client terminal 3-1.

Likewise, when, on the client terminal 3-2 or 3-3, an operation is made to move the quadrangular prism object 102 or the cylindrical object 103, an image in which the quadrangular prism object 102 or the cylindrical object 103 has been moved accordingly is displayed on the client terminal 3-1.

To be more specific, when a change is made to the virtual reality space on any of the client terminals 3-1 through 3-3, the change is reflected in the display of the other client terminals, thereby allowing the users of the client terminals 3-1 through 3-3 to share the same virtual reality space.

The above-mentioned objects 101 through 103 and avatar objects representing the users can be moved within a virtual reality space and made to enter or exit the virtual reality space, the states of the objects being changed (or updated) inside the virtual reality space. The objects that can change their states are hereinafter appropriately referred to as update objects. Unlike the update objects, objects representing buildings for example which constitute a town in a virtual reality space are commonly used by a plurality of users, the basic states of such objects remaining unchanged. Even if their states change, such a change is autonomous; namely, the change takes place independently of the operation made on a client terminal. These objects which are used by a plurality of users are hereinafter appropriately referred to as basic objects.

Meanwhile, in the system for sharing a three-dimensional virtual reality space by using the LAN as shown in FIG. 42, if objects 101 through 103 each having a simple shape consisting of a single object as shown in FIG. 43, it can be implemented by transferring the identification numbers of the objects 101 through 103 and the update information including shift vectors of the objects 101 through 103 for example.

However, moving an object having a complex shape consisting of a plurality of sub objects has to transfer the identification number and update information of each sub object separately, thereby increasing the traffic through the LAN and delaying the transmission of each update information, resulting in a mismatch between the movements of the objects displayed on the client terminals 3-1 through 3-3, a delay in a plurality of sub objects, and eventually in a jerky movement in a series of interlocking operations as an object in its entirety.

For example, FIG. 44 shows principles of operation of representing the walking behavior of an avatar simulating a user in a three-dimensional virtual reality space. In this example, the avatar object is constituted by a total of five sub objects; a body including a head, a right arm, a left arm, a right leg, and a left leg. To make the hands and the legs of this avatar swing to provide a walk behavior along with the movement of this avatar, it is required to transmit the update information at least including the shift vector of the body sub object, the shift vectors of the right-arm, left-arm, right-leg and left-leg sub objects, and the fluctuation angle from the axis provided by the joint to the body, along with the identification numbers of the sub objects.

Consequently, the number of sub objects constituting each object increases. Therefore, as a movement involving more complex operations is expressed, the volume of communication for transmitting the update information of objects increases, thereby increasing the load to the server terminal 1 and decreasing the smoothness of the display of the movement of the object represented by the cooperative operations of the sub objects.

SUMMARY OF THE INVENTION

It is therefore an object of the present invention to provide a method of sharing a three-dimensional virtual reality space, a three-dimensional virtual reality space sharing system, a method of information processing, an information recording medium, a method of information recording, an information transmission medium, a method of information transmission, a client terminal, and a server terminal for transmitting, in a minimum quantity, the update information of an update object composed of sub objects of which states are subject to change and smoothly displaying a cooperative operation of these sub objects in a three-dimensional virtual reality space shared by a plurality of users.

In carrying out the invention and according to a first aspect thereof, a method of sharing a three-dimensional virtual reality space comprising the steps of: connecting a plurality of client terminals for displaying a three-dimensional virtual reality space including an update object constituted by a plurality of sub objects each of whose state is subject to change to a shared server terminal for controlling a state of the update object on each of the plurality of client terminals via a communication network; registering in each of the plurality of client terminals in advance a change sequence table for defining a relationship between a sequence of changing the state of each of the plurality of sub objects according to a change to the state of the update object and a message for specifying a type of the change sequence; when the state of the update object controlled by the shared server terminal is updated, notifying each of the plurality of client terminals of the message corresponding to the updated content of the state of the update object from the shared server terminal; and changing on each of the plurality of client terminals the state of each of the plurality of sub objects based on the change sequence specified by the message to reflect the change in the displayed three-dimensional virtual reality space.

In carrying out the invention and according to a second aspect thereof, there is provided a system of sharing a three-dimensional virtual reality space comprising: a plurality of client terminals for displaying a three-dimensional virtual reality space including an update object constituted by a plurality of sub objects each of whose state is subject to change; a shared server terminal for controlling a state of the update object on each of the plurality of client terminals; a communication network for connecting each of the plurality of client terminals to the shared server terminal; and a change sequence table for defining a relationship between a change sequence of the state of each of the sub objects corresponding to update content of the state of the update object and a message for specifying a type of the change sequence, the change sequence table being registered in each of the plurality of client terminals in advance; wherein, when the state of the update object controlled by the shared server terminal is updated, the shared server terminal notifies each of the plurality of client terminals of the message corresponding to the updated content of the state of the update object, and each of the client terminals changes the state of each of the plurality of sub objects based on the change sequence specified by the message to reflect the change in the displayed three-dimensional virtual reality space.

In carrying out the invention and according to a third aspect thereof, there is provided an information recording medium for use in a three-dimensional virtual reality space sharing system to record a computer program comprising the processing steps of: connecting a plurality of client terminals for displaying a three-dimensional virtual reality space including an update object constituted by a plurality of sub objects each of whose state is subject to change to a shared server terminal for controlling a state of the update object on each of the plurality of client terminals via a communication network; registering in each of the plurality of client terminals in advance a change sequence table for defining a relationship between a sequence of changing the state of each of the plurality of sub objects according to a change to the state of the update object and a message for specifying a type of the change sequence; when the state of the update object controlled by the shared server terminal is updated, notifying each of the plurality of client terminals of the message corresponding to the updated content of the state of the update object from the shared server terminal; and changing on each of the plurality of client terminals the state of each of the plurality of sub objects based on the change sequence specified by the message to reflect the change in the displayed three-dimensional virtual reality space; wherein the computer program is readable and executable by at least one of the terminals consisting of the shared server terminal and the plurality of client terminals.

In carrying out the invention and according to a fourth aspect thereof, there is provided an information recording method for use in a three-dimensional virtual reality sharing system to record a computer program in an information recording medium, the computer program comprising the processing steps of: connecting a plurality of client terminals for displaying a three-dimensional virtual reality space including an update object constituted by a plurality of sub objects each of whose state is subject to change to a shared server terminal for controlling a state of the update object on each of the plurality of client terminals via a communication network; registering in each of the plurality of client terminals in advance a change sequence table for defining a relationship between a sequence of changing the state of each of the plurality of sub objects according to a change to the state of the update object and a message for specifying a type of the change sequence; when the state of the update object controlled by the shared server terminal is updated, notifying each of the plurality of client terminals of the message corresponding to the updated content of the state of the update object from the shared server terminal; and changing on each of the plurality of client terminals the state of each of the plurality of sub objects based on the change sequence specified by the message to reflect the change in the displayed three-dimensional virtual reality space; wherein the computer program is readable and executable by at least one of the terminals consisting of the shared server terminal and the plurality of client terminals.

In carrying out the invention and according to a fifth aspect thereof, there is provided an information transmission medium for use in a three-dimensional virtual reality space sharing system to transmit a computer program comprising the processing steps of: connecting a plurality of client terminals for displaying a three-dimensional virtual reality space including an update object constituted by a plurality of sub objects each of whose state is subject to change to a shared server terminal for controlling a state of the update object on each of the plurality of client terminals via a communication network; registering in each of the plurality of client terminals in advance a change sequence table for defining a relationship between a sequence of changing the state of each of the plurality of sub objects according to a change to the state of the update object and a message for specifying a type of the change sequence; when the state of the update object controlled by the shared server terminal is updated, notifying each of the plurality of client terminals of the message corresponding to the updated content of the state of the update object from the shared server terminal; and changing on each of the plurality of client terminals the state of each of the plurality of sub objects based on the change sequence specified by the message to reflect the change in the displayed three-dimensional virtual reality space; wherein the computer program is readable and executable by at least one of the terminals consisting of the shared server terminal and the plurality of client terminals and the executable computer program is transmitted to at least one of the terminals consisting of the shared server terminal and the plurality of client terminals.

In carrying out the invention and according to a sixth aspect thereof, there is provided an information transmission method for use in a three-dimensional virtual reality space sharing system to transmit a computer program comprising the processing steps of: connecting a plurality of client terminals for displaying a three-dimensional virtual reality space including an update object constituted by a plurality of sub objects each of whose state is subject to change to a shared server terminal for controlling a state of the update object on each of the plurality of client terminals via a communication network; registering in each of the plurality of client terminals in advance a change sequence table for defining a relationship between a sequence of changing the state of each of the plurality of sub objects according to a change to the state of the update object and a message for specifying a type of the change sequence; when the state of the update object controlled by the shared server terminal is updated, notifying each of the plurality of client terminals of the message corresponding to the updated content of the state of the update object from the shared server terminal; and changing on each of the plurality of client terminals the state of each of the plurality of sub objects based on the change sequence specified by the message to reflect the change in the displayed three-dimensional virtual reality space; wherein the computer program is readable and executable by at least one of the terminals consisting of the shared server terminal and the plurality of client terminals and the executable computer program is transmitted to at least one of the terminals consisting of the shared server terminal and the plurality of client terminals.

In carrying out the invention and according to a seventh aspect thereof, there is provided an information processing method of a client terminal in a three-dimensional virtual reality space sharing system in which a plurality of client terminals for displaying a three-dimensional virtual reality space including an update object constituted by a plurality of sub objects each of whose state is subject to change are connected to a shared server terminal for controlling a state of the update object on each of the plurality of client terminals via a communication network, the information processing method comprising the steps of: registering in each of the plurality of client terminals in advance a change sequence table for defining a relationship between a sequence of changing the state of each of the plurality of sub objects according to a change to the state of the update object and a message for specifying a type of the change sequence; acquiring the message corresponding to the update content of the state of the update object, the message being notified from the shared server terminal when the state of the update object controlled by the shared server terminal is updated; and changing the state of each of the plurality of sub objects based on the change sequence specified by the message to reflect the change in the displayed three-dimensional virtual reality space.

In carrying out the invention and according to an eighth aspect thereof, there is provided a client terminal in a three-dimensional virtual reality space sharing system in which a plurality of client terminals for displaying a three-dimensional virtual reality space including an update object constituted by a plurality of sub objects each of whose state is subject to change are connected to a shared server terminal for controlling a state of the update object on each of the plurality of client terminals via a communication network, the client terminal comprising: a registering means for registering in each of the plurality of client terminals in advance a change sequence table for defining a relationship between a sequence of changing the state of each of the plurality of sub objects according to a change to the state of the update object and a message for specifying a type of the change sequence; an acquiring means for acquiring the message corresponding to the update content of the state of the update object, the message being notified from the shared server terminal when the state of the update object controlled by the shared server terminal is updated; and a changing means for changing the state of each of the plurality of sub objects based on the change sequence specified by the message to reflect the change in the displayed three-dimensional virtual reality space.

In carrying out the invention and according to a ninth aspect thereof, there is provided an information recording medium for use in a client terminal in a three-dimensional virtual reality space sharing system to record a computer program comprising the processing steps of: registering in each of the plurality of client terminals in advance a change sequence table for defining a relationship between a sequence of changing the state of each of the plurality of sub objects according to a change to the state of the update object and a message for specifying a type of the change sequence; acquiring the message corresponding to the update content of the state of the update object, the message being notified from the shared server terminal when the state of the update object controlled by the shared server terminal is updated; and changing the state of each of the plurality of sub objects based on the change sequence specified by the message to reflect the change in the displayed three-dimensional virtual reality space; wherein the computer program is recorded in the information recording medium in a state readable and executable by the client terminal.

In carrying out the invention and according to a tenth aspect thereof, there is provided an information recording method of a recording medium for use on a client terminal in a three-dimensional virtual reality space sharing system to record a computer program comprising the processing steps of: registering in each of the plurality of client terminals in advance a change sequence table for defining a relationship between a sequence of changing the state of each of the plurality of sub objects according to a change to the state of the update object and a message for specifying a type of the change sequence; acquiring the message corresponding to the update content of the state of the update object, the message being notified from the shared server terminal when the state of the update object controlled by the shared server terminal is updated; and changing the state of each of the plurality of sub objects based on the change sequence specified by the message to reflect the change in the displayed three-dimensional virtual reality space; wherein the computer program is recorded in the recording medium in a state readable and executable by the client terminal.

In carrying out the invention and according to an eleventh aspect thereof, there is provided an information transmission medium for use on a client terminal in a three-dimensional virtual reality space sharing system in which a plurality of client terminals for displaying a three-dimensional virtual reality space including an update object constituted by a plurality of sub objects each of whose state is subject to change are connected to a shared server terminal for controlling a state of the update object on each of the plurality of client terminals via a communication network, the information transmission method transmitting a computer program comprising the processing steps of: registering in each of the plurality of client terminals in advance a change sequence table for defining a relationship between a sequence of changing the state of each of the plurality of sub objects according to a change to the state of the update object and a message for specifying a type of the change sequence; acquiring the message corresponding to the update content of the state of the update object, the message being notified from the shared server terminal when the state of the update object controlled by the shared server terminal is updated; and changing the state of each of the plurality of sub objects based on the change sequence specified by the message to reflect the change in the displayed three-dimensional virtual reality space; wherein the computer program is transmitted to the client terminal in a state receivable and executable by the same.

In carrying out the invention and according to a twelfth aspect thereof, there is provided an information transmission method for use on a client terminal in a three-dimensional virtual reality space sharing system in which a plurality of client terminals for displaying a three-dimensional virtual reality space including an update object constituted by a plurality of sub objects each of whose state is subject to change are connected to a shared server terminal for controlling a state of the update object on each of the plurality of client terminals via a communication network, the information transmission method transmitting a computer program comprising the processing steps of: registering in each of the plurality of client terminals in advance a change sequence table for defining a relationship between a sequence of changing the state of each of the plurality of sub objects according to a change to the state of the update object and a message for specifying a type of the change sequence; acquiring the message corresponding to the update content of the state of the update object, the message being notified from the shared server terminal when the state of the update object controlled by the shared server terminal is updated; and changing the state of each of the plurality of sub objects based on the change sequence specified by the message to reflect the change in the displayed three-dimensional virtual reality space; wherein the computer program is transmitted to the client terminal in a state receivable and executable by the same.

In carrying out the invention and according to a thirteenth aspect thereof, there is provided an information processing method of a shared server terminal in a three-dimensional virtual reality space sharing system in which a plurality of client terminals for displaying a three-dimensional virtual reality space including an update object constituted by a plurality of sub objects each of whose state is subject to change are connected to a shared server terminal for controlling a state of the update object on each of the plurality of client terminals via a communication network, the information processing method comprising the steps of: determining an update of the state of the update object controlled by the shared server terminal; and when the state of the update object is updated, notifying each of the plurality of client terminals a message specifying a type of a change sequence of each of the plurality of sub objects corresponding to the updated content of the state of the update object from the shared server terminal.

In carrying out the invention and according to a fourteenth aspect thereof, there is provided a shared server terminal in a three-dimensional virtual reality space sharing system in which a plurality of client terminals for displaying a three-dimensional virtual reality space including an update object constituted by a plurality of sub objects each of whose state is subject to change are connected to a shared server terminal for controlling a state of the update object on each of the plurality of client terminals via a communication network, the shared server terminal comprising: a determining means for determining an update of the state of the update object controlled by the shared server terminal; and when the state of the update object is updated, a notifying means for sending each of the plurality of client terminals a message specifying a type of a change sequence of each of the plurality of sub objects corresponding to the updated content of the state of the update object from the shared server terminal.

In carrying out the invention and according to a fifteen aspect thereof, there is provided an information recording medium for use on a shared server terminal in a three-dimensional virtual reality space sharing system in which a plurality of client terminals for displaying a three-dimensional virtual reality space including an update object constituted by a plurality of sub objects each of whose state is subject to change are connected to a shared server terminal for controlling a state of the update object on each of the plurality of client terminals via a communication network, the information recording medium recording a computer program comprising the processing steps of: determining an update of the state of the update object controlled by the shared server terminal; and when the state of the update object is updated, notifying each of the plurality of client terminals a message specifying a type of a change sequence of each of the plurality of sub objects corresponding to the updated content of the state of the update object from the shared server terminal; wherein the computer program is stored in the information recording medium in a state readable and executable by the shared server terminal.

In carrying out the invention and according to a sixteenth aspect thereof, there is provided an information recording method for use on a shared server terminal in a three-dimensional virtual reality space sharing system in which a plurality of client terminals for displaying a three-dimensional virtual reality space including an update object constituted by a plurality of sub objects each of whose state is subject to change are connected to a shared server terminal for controlling a state of the update object on each of the plurality of client terminals via a communication network, the information recording method recording a computer program comprising of the processing steps of: determining an update of the state of the update object controlled by the shared server terminal; and when the state of the update object is updated, notifying each of the plurality of client terminals a message specifying a type of a change sequence of each of the plurality of sub objects corresponding to the updated content of the state of the update object from the shared server terminal; wherein the computer program is stored in an information recording medium in a state readable and executable by the shared server terminal.

In carrying out the invention and according to a seventeenth aspect thereof, there is provided an information transmission medium for use on a shared server terminal in a three-dimensional virtual reality space sharing system in which a plurality of client terminals for displaying a three-dimensional virtual reality space including an update object constituted by a plurality of sub objects each of whose state is subject to change are connected to a shared server terminal for controlling a state of the update object on each of the plurality of client terminals via a communication network, the information transmission medium transmitting a computer program comprising the processing steps of: determining an update of the state of the update object controlled by the shared server terminal; and when the state of the update object is updated, notifying each of the plurality of client terminals a message specifying a type of a change sequence of each of the plurality of sub objects corresponding to the updated content of the state of the update object from the shared server terminal; wherein the computer program is transmitted to the shared server terminal in a state receivable and executable by the same.

In carrying out the invention and according to an eighteenth aspect thereof, there is provided an information transmission method for use on a shared server terminal in a three-dimensional virtual reality space sharing system in which a plurality of client terminals for displaying a three-dimensional virtual reality space including an update object constituted by a plurality of sub objects each of whose state is subject to change are connected to a shared server terminal for controlling a state of the update object on each of the plurality of client terminals via a communication network, the information transmission method transmitting a computer program comprising the processing steps of: determining an update of the state of the update object controlled by the shared server terminal; and when the state of the update object is updated, notifying each of the plurality of client terminals a message specifying a type of a change sequence of each of the plurality of sub objects corresponding to the updated content of the state of the update object from the shared server terminal; wherein the computer program is transmitted to the shared server terminal in a state receivable and executable by the same.

According to the present invention, in the three-dimensional virtual reality sharing method, the system, the information recording medium, the information recording method, the information transmission medium, and the information transmission method, the change sequence of the plurality of sub objects corresponding to the updated content of the state of the update object is stored in each client terminal and the changes sequences in the plurality of client terminals are started in synchronization.

Further, according to the present invention, in the information processing method, the client terminal, the information recording medium, the information recording method, the information transmission medium, and the information transmission method, the change sequence of the plurality of sub objects corresponding to the update content of the state of the update object is stored in a client terminal and started in synchronization with the change sequences stored in other client terminals.

Further, according to the present invention, in the information processing method, the server terminal, the information recording medium, the information recording method, the information transmission medium, and the information transmission method, if a message indicating update of the state of the update object is entered from a specific client terminal via the global communication network, this message is transmitted to other client terminals via the global communication network and, in synchronization with the change sequence of the plurality of sub objects in the specific client terminal, the change sequences of the plurality of sub objects in the other client terminals are started.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 9 B is a diagram describing a display example of the message list;

FIG. 29 is a diagram describing locations in which basic objects and update objects are stored;

FIG. 33 is a diagram describing the environment in which the software operates;

FIG. 39 is a diagram illustrating a display example on the shared server terminal 11B-1 of FIG. 32;

FIG. 43 B is a diagram illustrating another display example in the cyberspace system built via the related art LAN;

FIG. 43 C is a diagram illustrating still another display example in the cyberspace system built via the related art LAN; and FIG. 44 is diagram illustrating principles of operations of expressing related art avatar walking behavior.

DETAILED DESCRIPTION OF PREFERRED EMBODIMENTS

Figure 1:
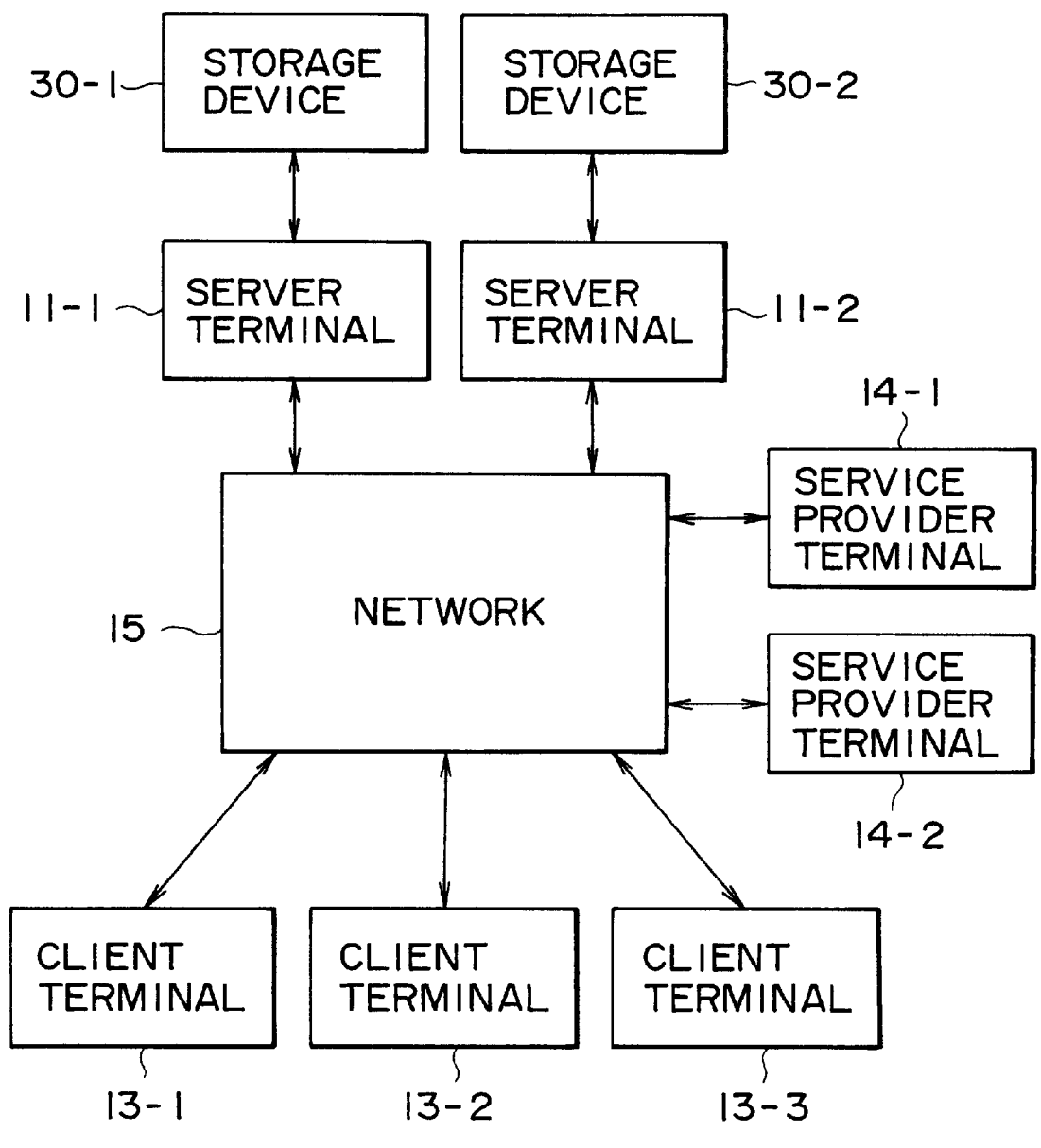
FIG. 1 is a block diagram illustrating an example of the constitution of a cyberspace system practiced as one preferred embodiment of the present invention.

This invention will be described in further detail by way of example with reference to the accompanying drawings.

The basic idea and concept of a virtual society is described by Hiroaki Kitano, Sony Computer Science Laboratories, as follows in his home page "Kitano Virtual Society (V1.0) (http://www.csl,sony.co jp/person/kitano/VS/concept.j.html. 1995)":

"In the beginning of the 21st century, a virtual society would emerge in a network spanning all the world. People in every part of the world will make a society in which millions or hundred millions of people live in a shared space created in the network. A society that will emerge beyond the current Internet, CATV, and the so-called information super highway is a virtual society that I conceive. In the virtual society, people can not only perform generally the same social activities as those in the real world—enjoy shopping, have a chat, play games, do work, and the like—but also perform things that are possible only in the virtual society (for example, moving from Tokyo to Paris in an instant). Such a "society" would be implemented only by state-of-the-art technologies such as cyberspace constructing technologies that support a broadband network, high-quality three-dimensional presentation capability and bidirectional communications of voice, music and moving picture signals, and a large-scale distributed system that allows a lot of people to share the constructed space."

For further details, look at the above mentioned home page (URL=http://www.csl.sony.co.jp/person/kitano/VS/concept.j.html).

The three-dimensional virtual reality space that implements the above-mentioned virtual society is a cyberspace system. The actual examples of the infrastructures for constructing this cyberspace system includes, at this point of time, the Internet, which is a world-wide computer network connected by a communications protocol called TCP/IP (Transmission Control Protocol/Internet Protocol) and the intranet implemented by applying the Internet technologies such as the WWW (World Wide Web) to the in-house LAN (Local Area Network). Further, use of a broadband communication network based on FTTH (Fiber To The Home) in the future is proposed in which the main line system and the subscriber system are all constituted by fiber optics.

Meanwhile, for an information providing system available on the Internet, the WWW developed by CERN (European Center for Nuclear Research) in Switzerland is known. This technology allows a user to browse information including text, image and voice for example in the hyper text form. Based on HTTP (Hyper Text Transfer Protocol), the information stored in a WWW server terminal is sent asynchronously to terminals such as personal computers.

The WWW a server is constituted by server software called an HTTP demon and an HTML file in which hyper text information is stored. The hyper text information is described in a description language called HTML (Hyper Text Markup Language). In the description of a hyper text by HTML, a logical structure of a document is expressed in a format specification called a tag enclosed by "<" and ">". Description of linking to other information is made based on link information called an anchor. A method in which a location at which required information is stored by the anchor is URL (Uniform Resource Locator).

A protocol for transferring a file described in HTML on the TCP/IP network is HTTP. This protocol has a capability of transferring a request for information from a client to the WWW server and the requested hyper text information stored in the HTML file to the client.

Used by many as an environment for using the WWW is a client software such as Netscape Navigator (trademark) called a WWW browser.

It should be noted that demon denotes a program for executing control and processing in the background when performing a job in the UNIX environment.

Recently, a language for describing three-dimensional graphics data, called VRML (Virtual Reality Modeling Language) and a VRML viewer for drawing a virtual reality space described in this VRML on a personal computer or a workstation have been developed. VRML allows one to extend the WWW, set hyper text links to objects drawn by three-dimensional graphics, and follow these links to sequentially access WWW server terminals. The specifications of VRML version 1.0 were made public in May 26, 1995. Then, in Nov. 9, 1995, a revised version in which errors and ambiguous expressions are corrected was made public. The specifications are available from URL=http://www.oki.com./vrml/vrml10c.html.

Storing three-dimensional information described in the above-mentioned VRML in a WWW server terminal allows the construction of a virtual space expressed in three-dimensional graphics on the Internet. Further, use of the VRML viewer by using personal computers and the like interconnected by the Internet can implement the display of a virtual space based on three-dimensional graphics and the walk-through capability.

In what follows, examples in which the Internet is used for a network will be described. It will be apparent to those skilled in the art that FTTH may be used instead of the Internet to implement the virtual space.

It should be noted that Cyberspace is a coinage by William Gibson, a US science fiction writer, and was used in his "Neuromancer" (1984) that made him famous. Strictly speaking, however, the word Cyberspace first appeared in his "Burning Chrome" (1982). In these novels, there are scenes in which the hero attaches a special electrode on his forehead to connect himself to a computer to directly reflect on his brain a virtual three-dimensional space obtained by visually reconfiguring data on a computer network spanning all over the world. This virtual three-dimensional space was called Cyberspace. Recently, the term has come to be used as denoting a system in which a virtual three-dimensional space is used by a plurality of users via a network.

Now, referring to FIG. 1, there is shown an example of the constitution of a cyberspace system practiced as one preferred embodiment of the present invention. As shown, a given number (in this case, two) of server terminals 11-1 and 11-2 have storage devices 30-1 and 30-2 respectively and are adapted to provide a virtual reality space via a network 15 (a global communication network) represented by the Internet for example. In addition, a given number (in this case, three) of client terminals 13-1 through 13-3 are installed to receive the virtual reality space and specific services (information) using the same from the server terminals 11-1 and 11-2 via the network 15.

Further, in the above-mentioned embodiment, a given number (in this case, two) of service provider terminals 14-1 and 14-2 are installed to receive the virtual reality space from the server terminals 11-1 and 11-2 via the network 15 and provide specific services to the client terminals 13-1 through 13-3.

Figure 2:
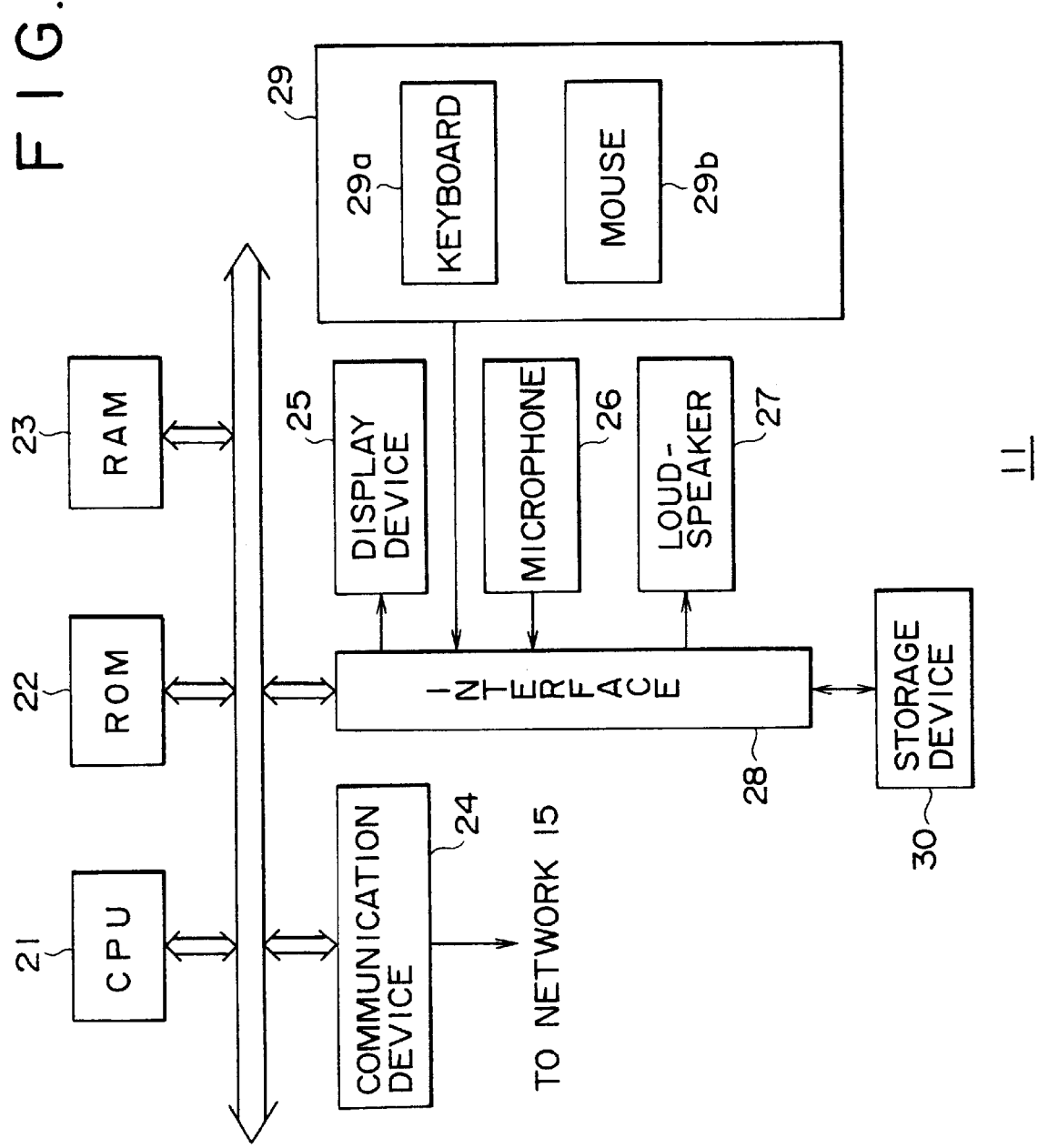
FIG. 2 is a block diagram illustrating an example of the constitution of a server terminal 11 of FIG. 1.

FIG. 2 shows an example of the constitution of the server terminal 11 (namely, 11-1 and 11-2). As shown, the server terminal 11 has a CPU 21. The CPU 21 executes a variety processing operations as instructed by a program stored in a ROM 22. A RAM 23 appropriately stores data and a program necessary for the CPU 21 to execute the variety of processing operations. A communication device 24 transfers specific data with the network 15 (the Internet).

A display device 25 has a CRT (Cathode Ray Tube) or an LCD (Liquid Crystal Display) for example and is connected to interface 28 to monitor images of the virtual reality space provided by the server terminal 11. The interface 28 is also connected with a microphone 26 and a speaker 27 to supply a specific voice signal to the client terminal 13 and the service provider terminal 14 and monitor a voice signal coming from these terminals.

The server terminal 11 has an input device 29 on which a variety of input operations are performed via the interface 28. This input device has at least a keyboard 29a and a mouse 29b.

Figure 3:
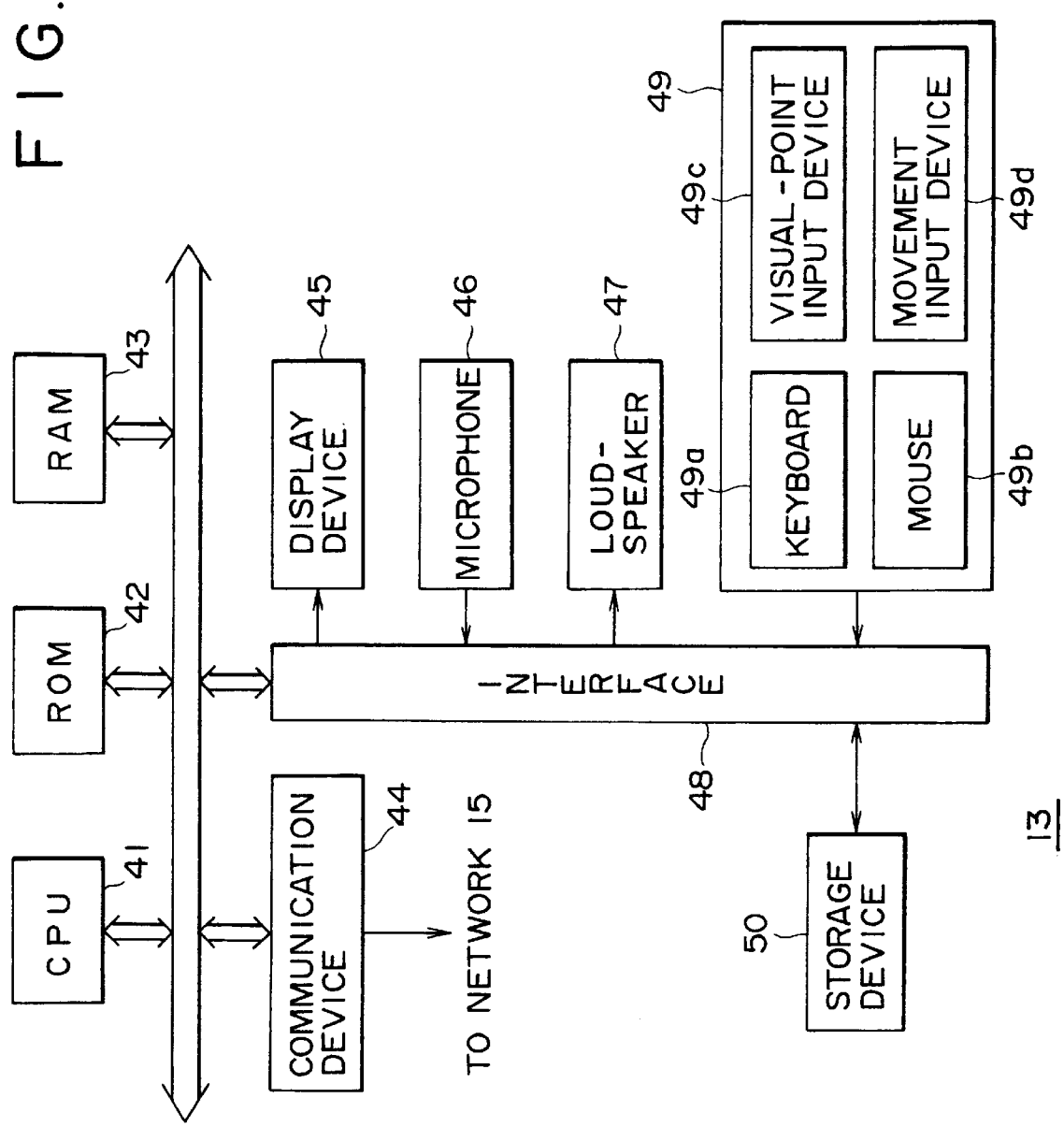
FIG. 3 is a block diagram illustrating an example of the constitution of a client terminal 13 of FIG. 1.

FIG. 3 shows an example of the constitution of the client terminal 13 (namely, 13-1 through 13-3). The client terminal 13 has a CPU 41 which executes a variety of processing operations according to a program stored in a ROM 42. A RAM 43 appropriately stores data and a program necessary for the CPU 41 to executes the variety of processing operations. A communication device 44 transfers data to the server terminal 11 via the network 15 (the Internet).

A display device 45 has a CRT or an LCD to display three-dimensional images created by computer graphics (CG) or taken by an ordinary video camera. A microphone 46 is used to output a voice signal to the shared server terminal 11. A speaker 47 outputs the voice signal coming from the server terminal 11. An input device 49 is operated to perform a variety of input operations.

A keyboard 49a of the input device 49 is operated when entering specific characters and symbols. A mouse 49b is operated when entering specific positional information. A viewpoint input device 49c is operated when changing the state of the avatar (object) as an update object of the client terminal 13. That is, the viewpoint input device 49c is used to enter the viewpoint of the avatar of the client terminal 13, thereby moving the viewpoint of the avatar vertically, horizontally or in the depth direction and zooming a specific image. In addition, the movement input device 49d is used to move the avatar in the forward and backward direction or the right and left direction at a specific speed.

It is apparent that the operations done through the viewpoint and movement input devices may also be done through the above-mentioned keyboard 49a and the mouse 49b.

Interface 48 constitutes the data interface with a display device 45, a microphone 46, a speaker 47, and an input device 49. A storage device 50 composed of a hard disc, an optical disc, and magneto-optical disc stores data and programs.

Figure 4:
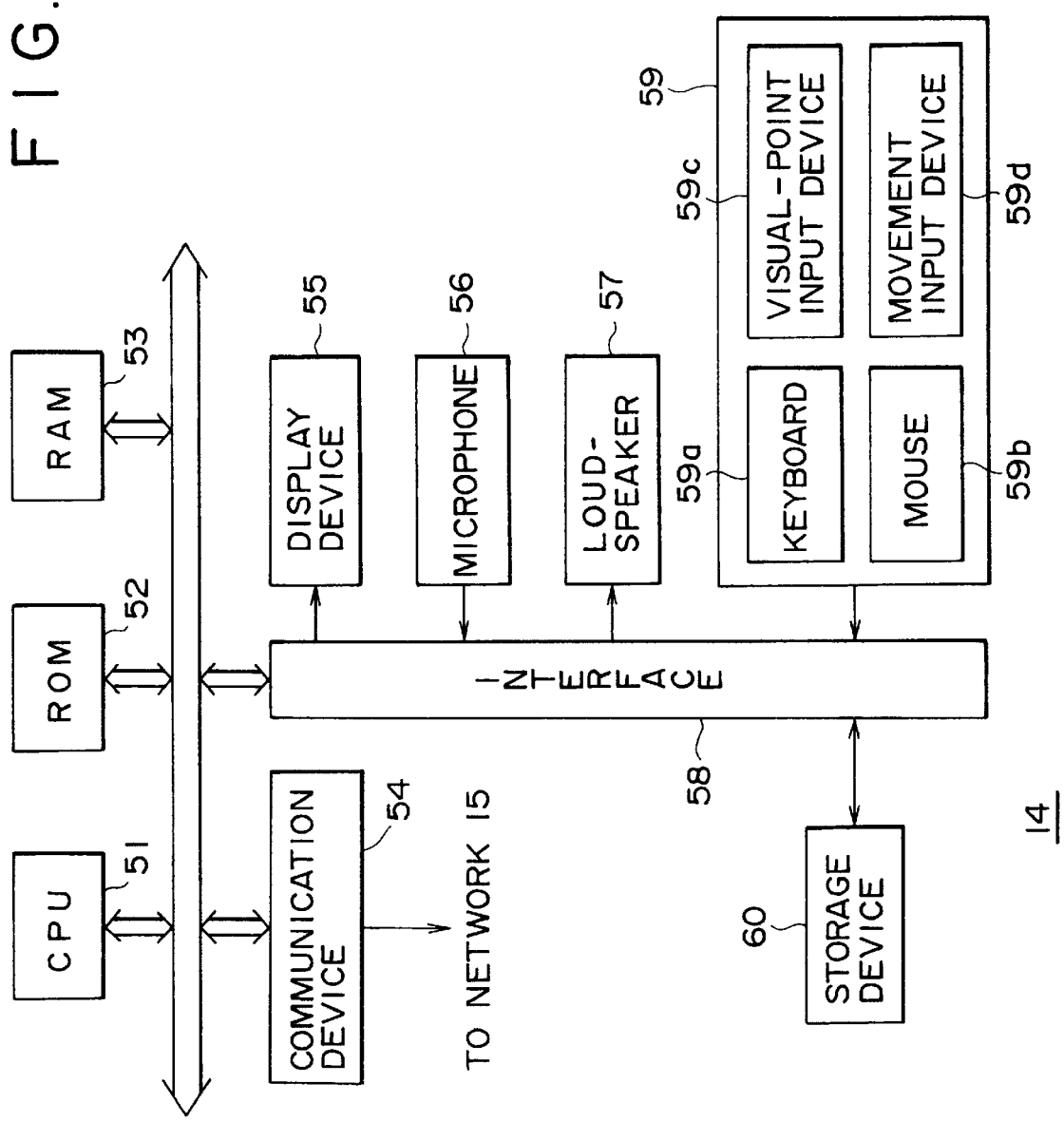
FIG. 4 is a block diagram illustrating an example of the constitution of a service provider terminal 14 of FIG. 1.

FIG. 4 shows an example of the constitution of the service provider terminal 14 (namely, 14-1 and 14-2). The components including a CPU 51 through a storage device 60 are generally the same as the components including the CPU 41 through the storage device 50 of FIG. 3 and therefore the description of the CPU 51 through the storage device 60 is omitted.

Figure 5:
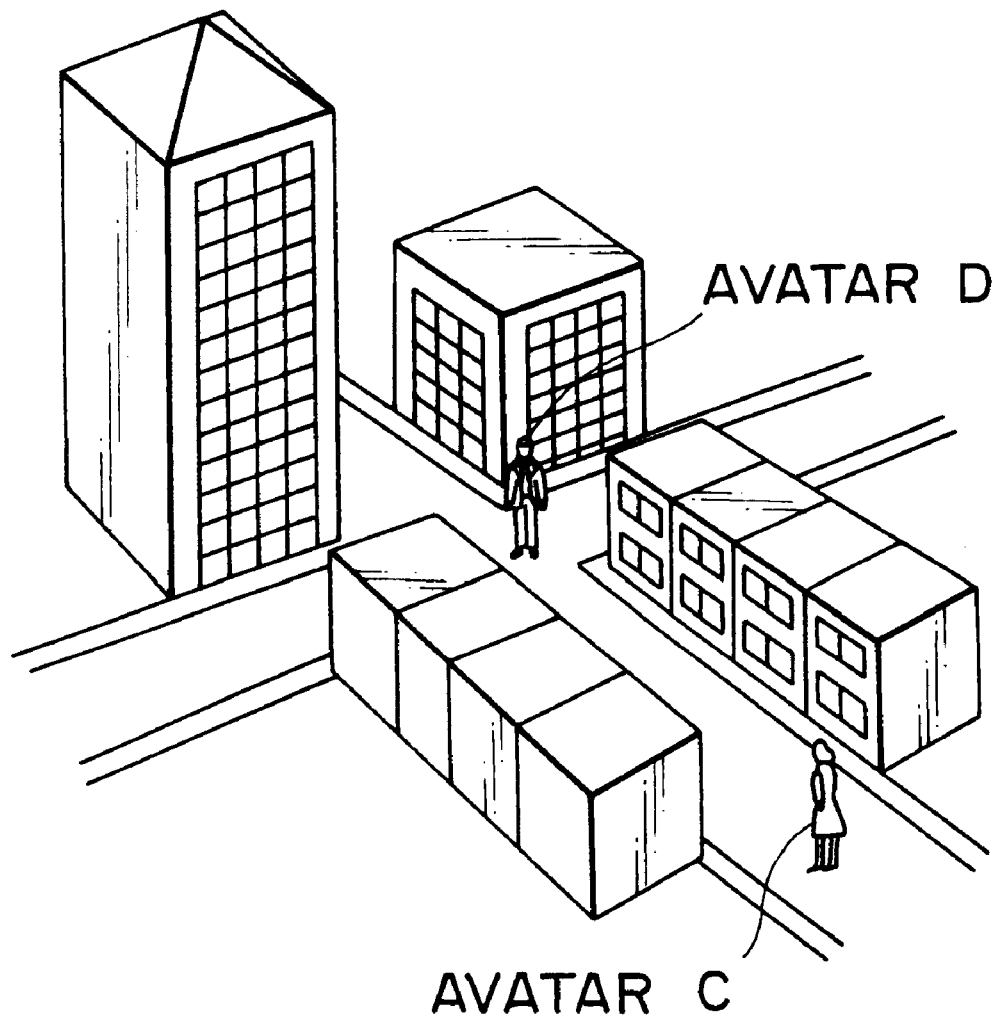
FIG. 5 is a diagram describing a virtual reality space formed by the cyberspace system of FIG. 1.

FIG. 5 schematically shows the three-dimensional virtual reality space (hereinafter appropriately referred to simply as the virtual reality space) provided by the server terminal 11 of FIG. 1. As shown, this virtual reality space constitutes a town, in which avatar (update object) C (the avatar object of the client terminal 13-1 for example) and avatar (update object) D (the avatar object of the client terminal 13-2 for example) move around.

Figure 6:
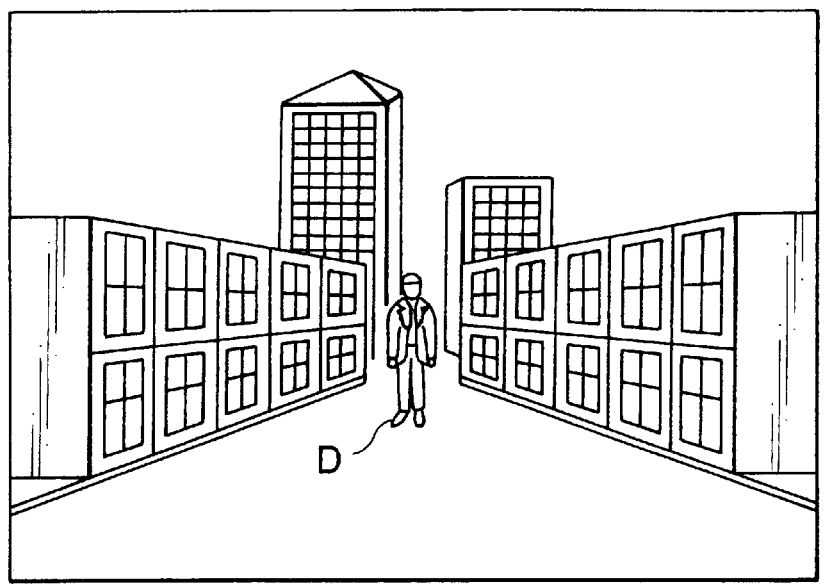
FIG. 6 is a diagram describing a view field seen from avatar C.

Avatar C sees an image as shown in FIG. 6 for example from the position and viewpoint in the virtual reality space. Namely, an image as shown in FIG. 6 is provided to the display device 25 of the client terminal 13-1 from the server terminal 11 to be displayed. Then, when the viewpoint and position of avatar C are changed (updated) by operating a viewpoint input device 49c and a movement input device 49d (or the keyboard 49a and the mouse 49b), the three-dimensional image forming the virtual reality space supplied from the server terminal 11 is changed accordingly.

Figure 7:
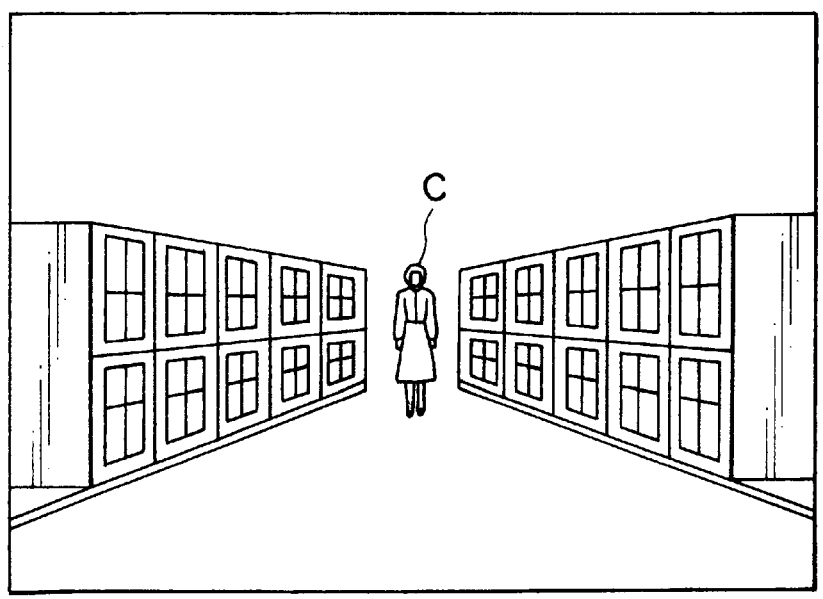
FIG. 7 is a diagram describing a view field seen from avatar D.

Likewise, an image as shown in FIG. 7 is displayed on the display device 45 of the client terminal 13-2 to which avatar D corresponds. This displayed image is also changed by moving the viewpoint and position of avatar D.

It should be noted that, in FIG. 5, avatar C is looking in the direction of avatar D, so that avatar D is displayed in the image (the virtual reality space) on the display device 45 of the client terminal 13-1 as shown in FIG. 6.

Figure 11:
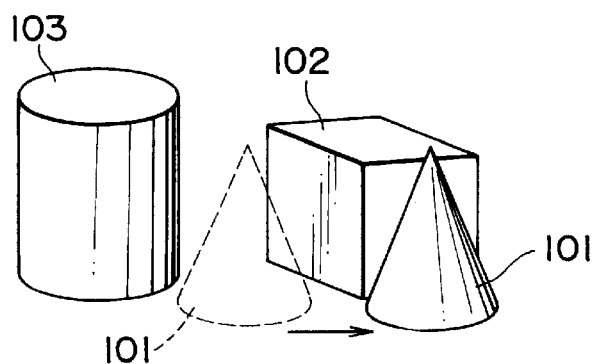
FIG. 11 is a diagram illustrating a display example of a client terminal 13-2.

Likewise, in FIG. 5, avatar D is looking in the direction of avatar C, so that avatar C is displayed in the image (the virtual reality space) on the display device 45 of the client terminal 13-2 as shown in FIG. 11.

Figure 8:
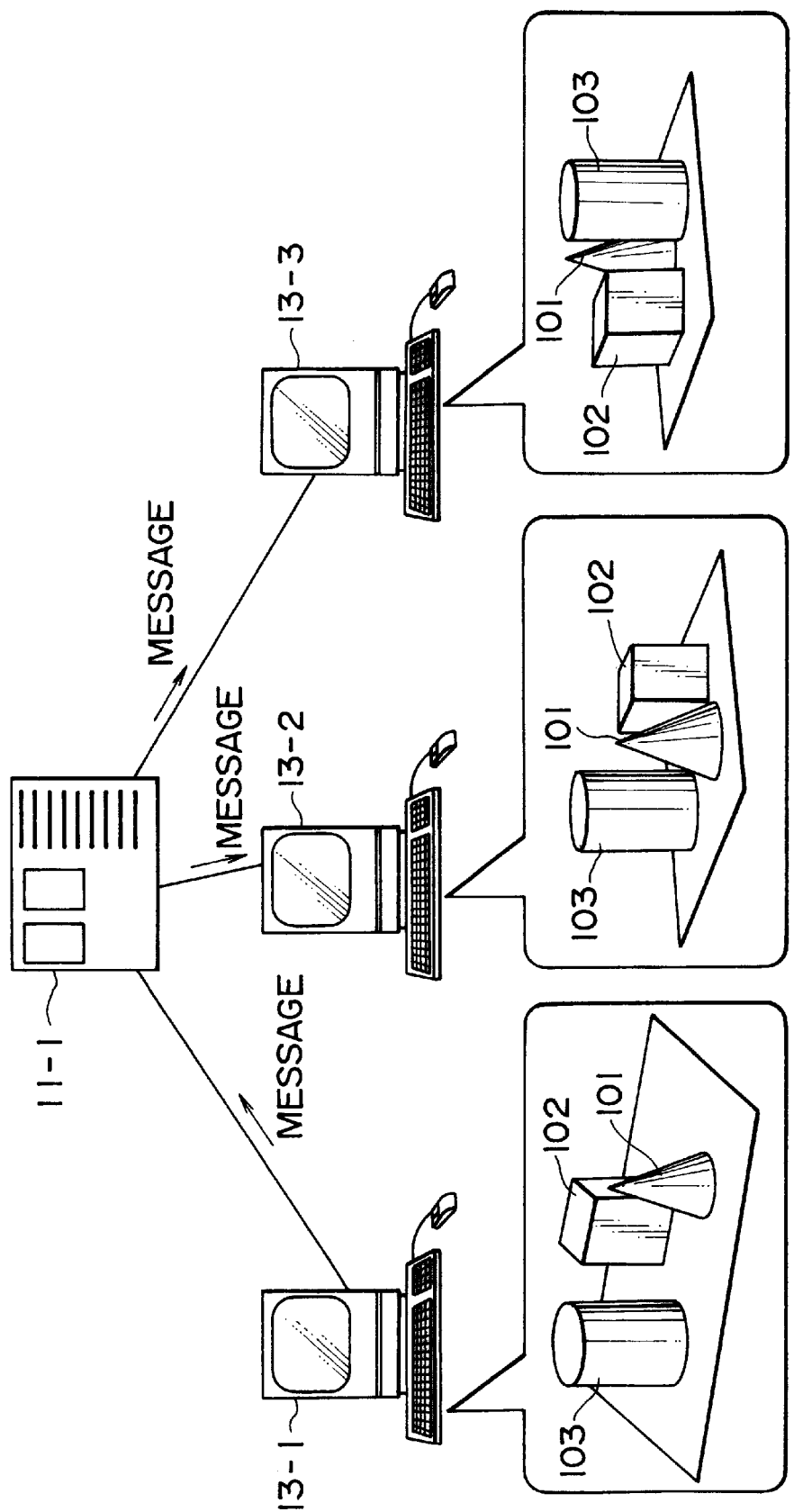
FIG. 8 is a diagram describing message transmission in the cyberspace system.

In what follows, operations necessary for moving (updating) a specific object (an update object of which state is subject to change) will be described. For simplicity, it is assumed, as shown in FIG. 8, that images of the virtual reality space seen from the viewpoints of the avatars of the client terminals 13-1 through 13-3 are displayed on the same respectively. In this example, a conical object 101, a quadrangular prism object 102, and a cylindrical object 103 (an update object) are displayed. It is also assumed that the client terminal 13-1 operates the conical object 101, the client terminal 13-2 operates the quadrangular prism object 102, and the client terminal 13-3 operates the cylindrical object 103 by means of the movement input device 49d (or the mouse 49b) to move the objects.

Figure 9B:
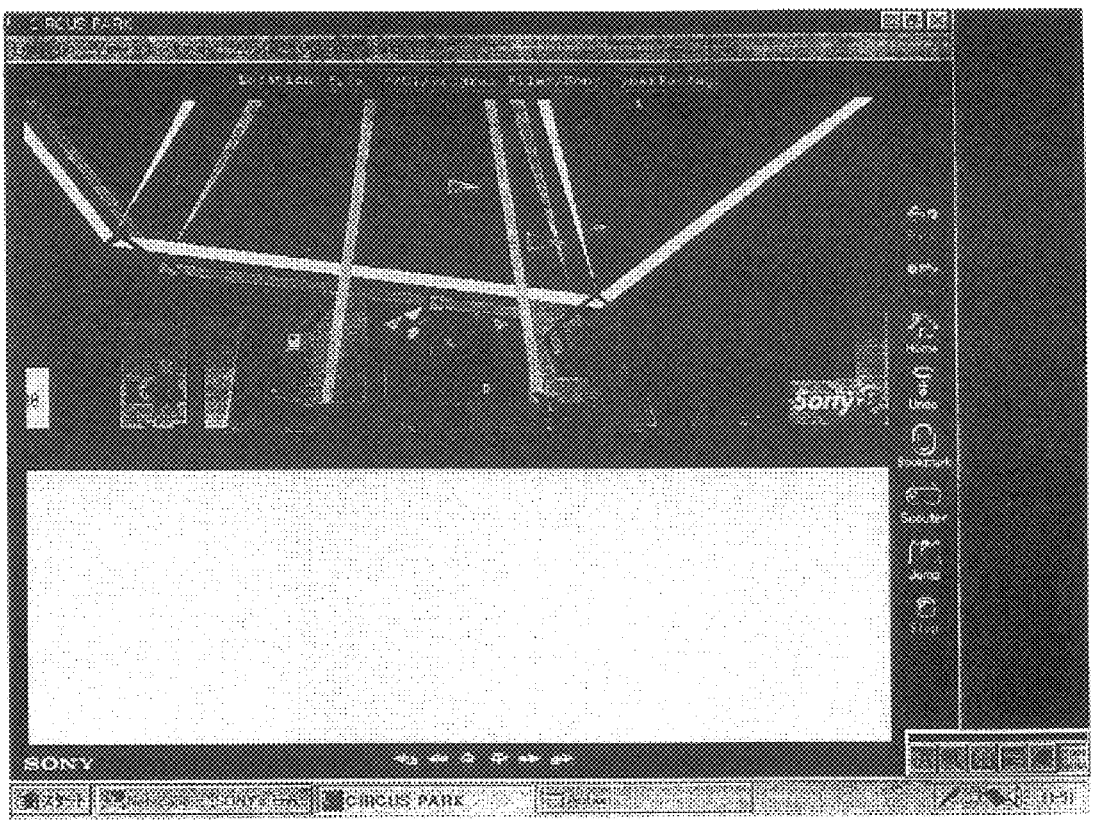
FIG. 9 A is a diagram describing a display example of a message list.

In the above-mentioned case, in the client terminals 13-1 through 13-3, a message table (namely, a change sequence table) as shown in FIG. 9 A is stored in the ROM 42 or the RAM 43. In the embodiment of FIG. 9 A, a movement message is registered as message number 1. This movement message specifies an object ID for identifying an object to be moved, a direction of the movement of the object, a velocity at which the object is moved, and a period in which the object is kept moved as specification items (parameters).

A stop message numbered 2 is for stopping a moving object, specifying an object ID for identifying an object to be stopped.

An avatar movement message numbered 3 is for moving an avatar, specifying an object ID for identifying an avatar to be moved, a direction of the movement of the avatar, and distance of the movement of the avatar. One avatar object is composed of a total of five sub objects; a body including a head, a right arm, a left arm, right leg, and left leg. To change the positions of the arm and leg sub objects of an avatar as the same moves about (namely, to move the avatar while making the right and left arms swing and the right and left legs alternate), the number of fluctuations (around the joint with the body) of the arms and legs per unit time is also specified as a parameter.

A complex operation start message numbered 4 specifies an object ID for identifying an object that performs a complex operation. A complex operation stop message numbered 5 specifies an object ID for identifying an object of which complex operation is stopped.

A message numbered 6 specifies a parade start. This parade start message is implemented in a three-dimensional virtual space of CIRCUS PARK to be described later. For example, this message starts a parade in which clowns, sea dogs, a bear riding on bicycle and the like go in a procession as shown in FIG. 9 B. In this case, the object of the entire parade is composed of sub objects such as the clowns, sea dogs, the bear riding on bicycle and the like. And the sub object of a clown for example is further composed of a total of five sub objects; a body including a head, a right arm, a left arm, a right leg, and a left leg. To make this clown walk as it proceeds while swinging its arms and legs forward and back, in addition to at least a direction in which the entire clown moves, a velocity at which the entire clown moves, and a period in which the entire clown continues moving, update information is required including the number of fluctuations per unit time of the sub objects of right arm, left arm, right leg, and left leg around the joint to the body. In this case, the fluctuation angles of the objects of right arm, left arm, right leg, and left leg are preset in certain ranges.

Therefore, in addition to a direction in which the entire parade processes, a velocity at which the entire parade processes, and the period in which the entire parade continues processing, the message numbered 6 specifies a heading sub object ID1, a clown for example, a second sub object ID2, a sea dog, a last sub object IDn, the bear riding on bicycle, the number of fluctuation times per unit time around the above-mentioned joint of hand sub objects (right and left) of each larger sub object, and the number of fluctuation times per unit time around the above-mentioned joint of leg sub objects (right and left) of each larger sub object. In this case, it will be apparent that the different numbers of fluctuation times may be set to the hand and leg sub objects of different larger sub objects of clowns, sea dogs, and the bear, thereby expressing complex proceeding behaviors as the parade in its entirety.

For a simple example, it is assumed that, in the client terminal 13-1, the conical object 101 (an update object) is moved from the position of dotted line to the position of solid line. When the movement input device 49d or the mouse 49b of the client terminal 13-1 is operated to instruct the CPU 41 to move the conical object, the CPU 41 generates the movement message of number 1. Namely, the object ID of the conical object 101 is set as the ID of the object to be moved. In addition, specific values are set for the direction, velocity, and period of movement according to the inputs (the operation of the input devices).

For example, as will be described, if the setting is made such that, when the mouse 49b is moved up with the left button kept pressed, the object moves forward at a velocity corresponding to the distance of the movement of the mouse 49b, the direction (in this case, upward), the velocity (in this case, the distance of the movement of the mouse 49b), and the period (in which the mouse has been operated) are detected by the CPU 41 to be set in memory.

Figure 10:
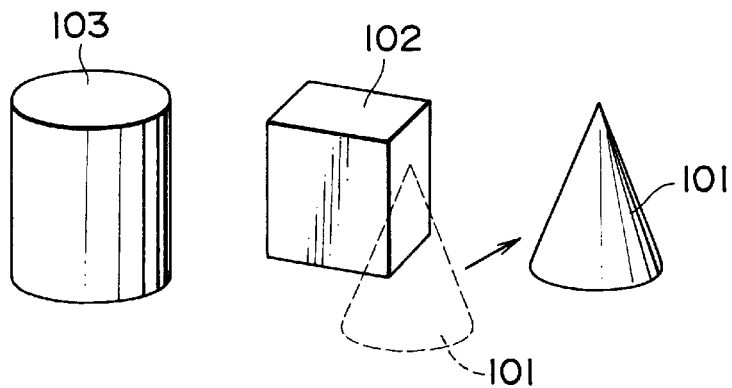
FIG. 10 is a diagram illustrating a display example of a client terminal 13-1.

Then, the CPU 41 executes the message that was created by itself Namely, image data are generated such that the conical object 101 moves to the position from the position of dotted line to the position of solid line as shown in FIG. 10, which is outputted to the display device 45 to be displayed.

Further, the CPU 41 of the client terminal 13-1 controls the communication device 44 to transmit the generated movement message to the server terminal 11-1 via the network 15. Receiving the movement message via the communication device 24, the CPU 21 of the server terminal 11-1 outputs the received movement message to the client terminals 13-2 and 13-3 from the communication device 24 simultaneously.

Figure 12:
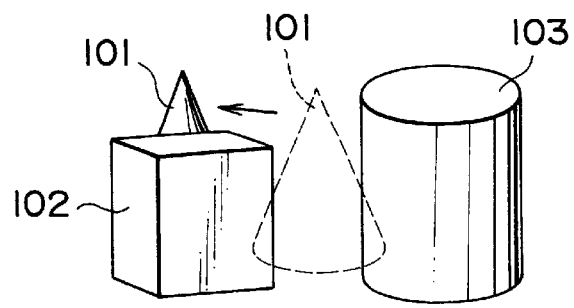
FIG. 12 is a diagram illustrating a display example of a client terminal 13-3.

Receiving the movement message via the communication device 44, the CPU 41 of the client terminal 13-2 executes the processing specified in the received movement message. To be more specific, from this movement message, the CPU 41 identifies the conical object 101 as the object to be moved, reads, from this movement message, the movement direction, velocity and period in the virtual reality space, generates data of an image for moving the conical object 101 in the virtual reality space, and displays the generated image data on he display device 45. The similar processing is performed on the client terminal 13-3. Consequently, the conical object 101 appears moving on the display devices 45 of the client terminals 13-2 and 13-3 in synchronization as shown in FIGS. 11 and 12.

Namely, in the above-mentioned case, the image for moving the conical object 101 is locally generated on each of the client terminals 13-1 through 13-3 to be displayed, rather than that the server 11-1 generates the image for moving the conical object 101 to supply the same to the client terminals 13-1 through 13-3. Consequently, the volume of communication between the client terminals 13-1 through 13-3 and the server terminal 11-1 can be minimized.

It should be noted that, since the message is received via the network 15, the display on the client terminals 13-2 and 13-3 is delayed slightly behind the display on the client terminal 13-1. However, the client terminal 13-1 transmits the message immediately after generating the same, the display on all client terminals is driven generally in synchronization in practice. The server terminal 11 transmits the message to the client terminals 13-2 and 13-3 generally at the same time, so that it is assumed that the display on the client terminals 13-2 and 13-3 is driven generally in synchronization.

Figure 13:
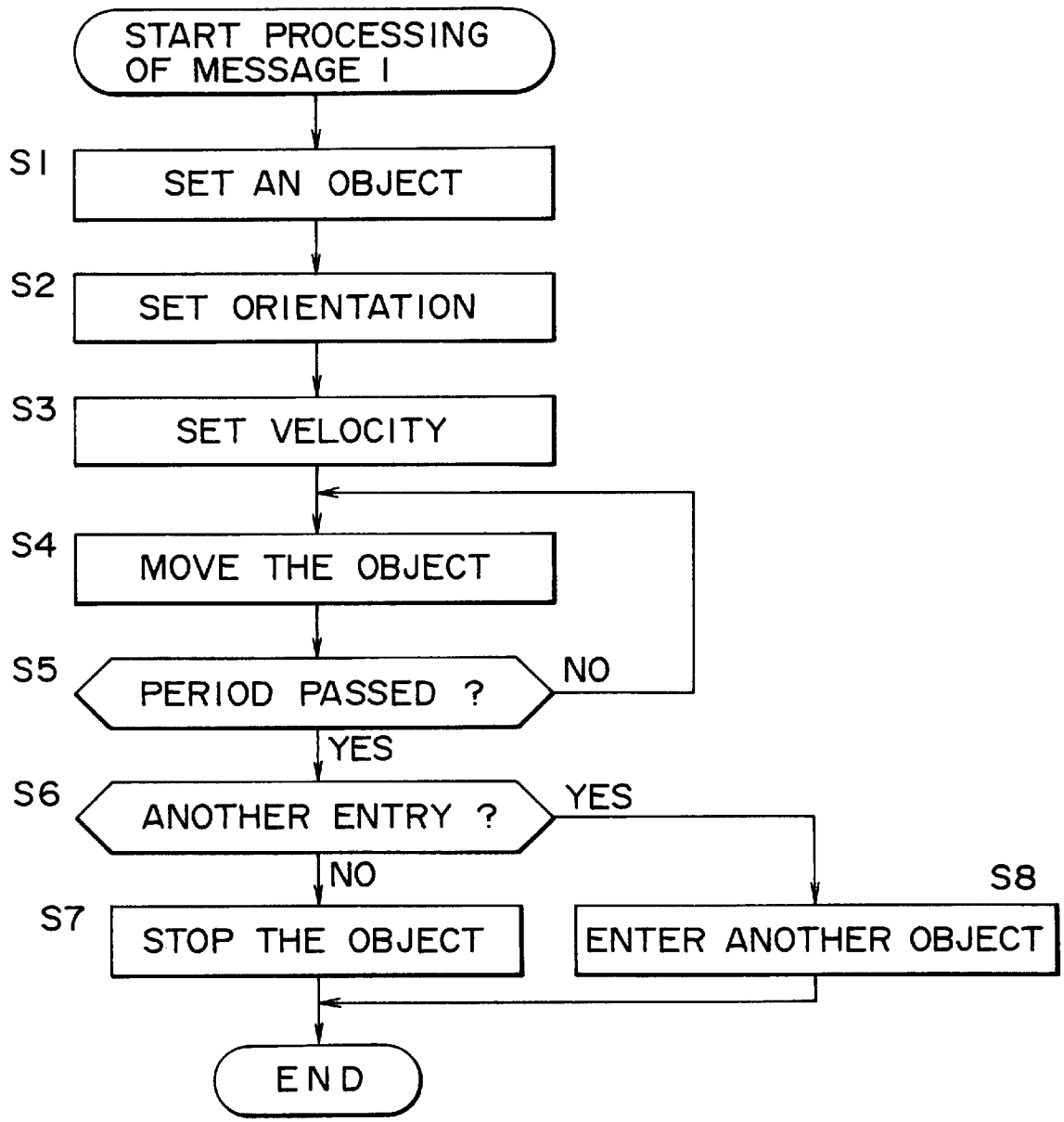
FIG. 13 is a flowchart describing the processing of message 1.

FIG. 13 shows the processing to be performed when the client terminals 13-1 through 13-1 receive the message 1.

To be more specific, in the first step S1, the object to be moved is read from the object ID of the movement message number 1 and the object thus read is set. Then, in steps S2 and S3, the direction and velocity specified by the parameters of the movement message are read and set. Then, in step S4, the image data are generated which move the object set in step S1 in the direction set in step 2 at the velocity set in step S3. The generated image data are outputted to the display device 45 to be displayed.

Then, in step S5, it is determined whether the period specified in the movement message has passed or not. If the period has not passed, then, back in step S4, the processing for moving the object is continued. Thus, the movement (update) of the object is continued until the period specified in the movement message passes.

If the period specified in the movement message has been found passed in step S5, then, in step S6, it is determined whether another message has been entered or not. If there is any other message, then, in step S7, the object kept moving so far is stopped. If another message has been found in step S6, then, in step S8, the processing of the new message is performed. This allows to move the conical object 101 for example during a specific period, followed by the execution of next processing.

If a movement message is entered again as a next message, the object is moved for a further specific period.

Figure 14:
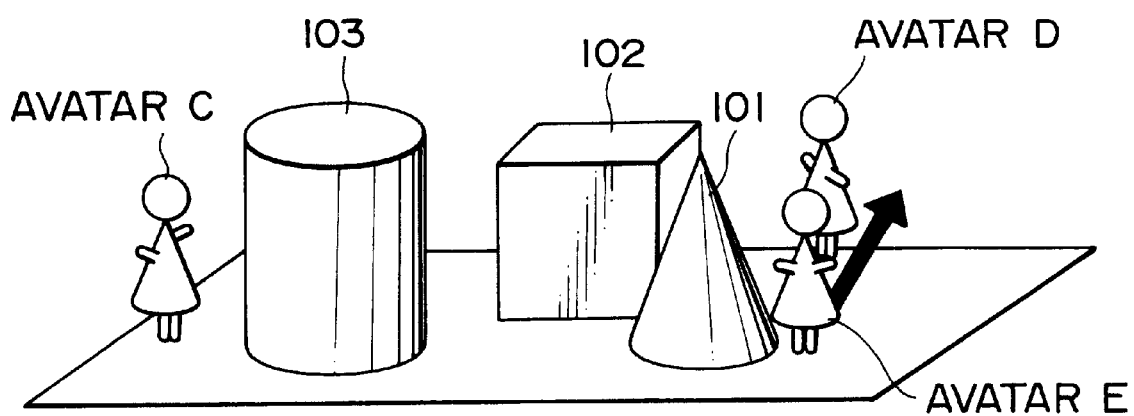
FIG. 14 is a diagram illustrating avatar movement in the virtual reality space.

In what follows, the movement of an avatar in a more complex manner will be described. As shown in FIG. 14, it is assumed that the virtual reality space in which the conical object 101, the quadrangular prism object 102, and the cylindrical object 103 exist contains avatars C through E corresponding to the client terminals 13-1 through 13-3 respectively.

Now, it is assumed that, in the client terminal 13-3, an operation is made on the mouse 49b to move the avatar E in the direction indicated by the arrow in FIG. 14. At this moment, in response to this operation, the CPU 41 of the client terminal 13-3 generates an avatar movement message of number 3 shown in FIG. 9. Namely, as an avatar (an update object) to be moved, the object ID for the avatar E is set. Also, the direction in which the avatar is moved and the distance of the movement are set corresponding to the inputs from the input device 49. Further, for the specifications of the arms (sub objects) and legs (sub objects) of the avatar E, the number of fluctuation times per unit time is set as required. Unless especially specified, a default is set for the number of fluctuation times.

Figure 15:
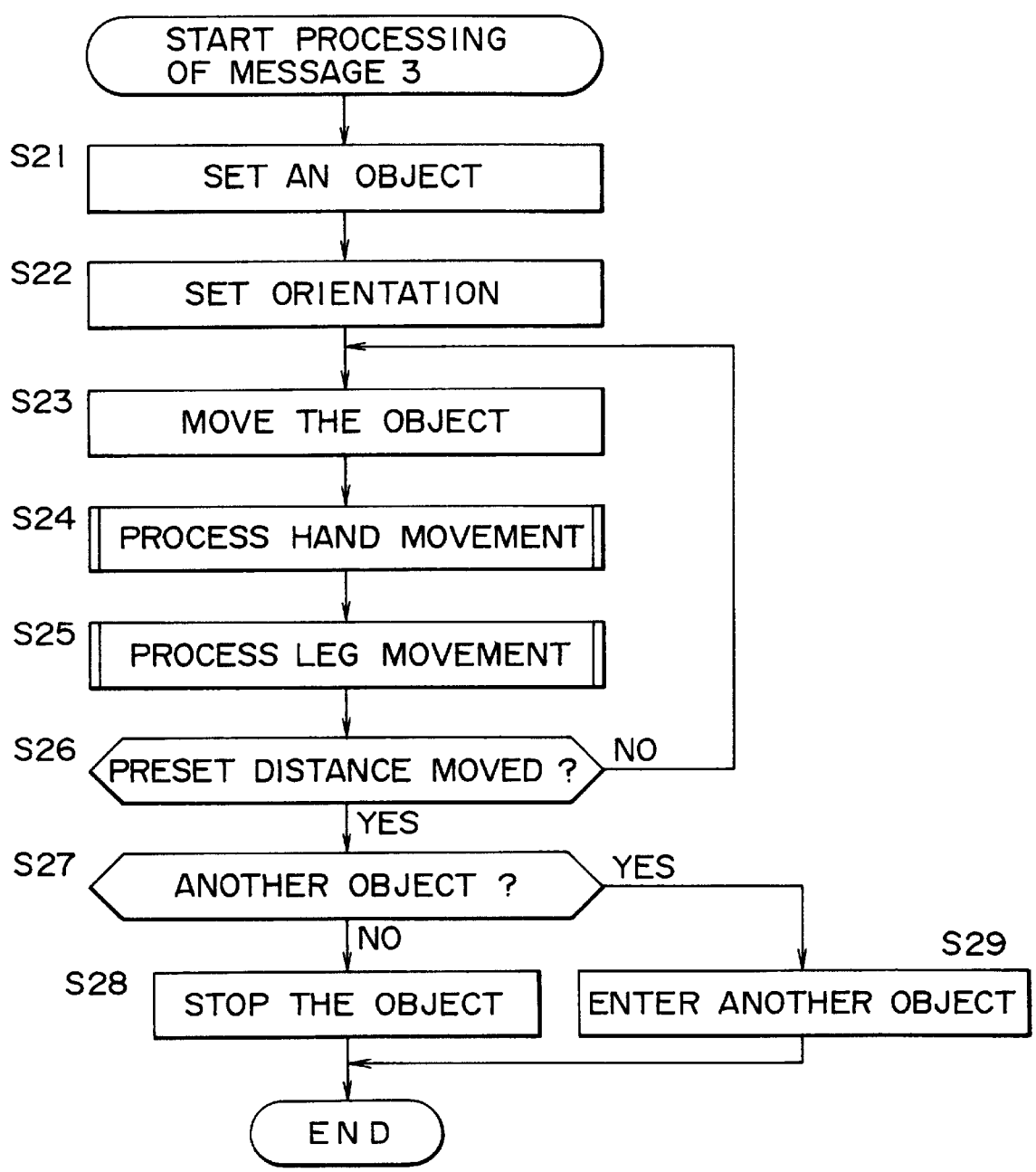
FIG. 15 is a flowchart describing the processing of message 3.

The above-mentioned avatar movement message is executed on the client terminal 13-3 and, at the same time, transmitted to the client terminals 13-1 and 13-2 via the server terminal 11-1 at the same time to be executed as shown in the flowchart of FIG. 15.

To be more specific, the client terminals 13-1 through 13-3 start a program shown in FIG. 15 at the same time. In step S21, the object ID is read from the avatar movement message and the object ID thus read is set. In step S22, the movement direction is set.

Further, in step S23 (an update sequence), the image data in the case in which the object set in step S21 is moved in the direction set in step S22 are generated. The generated image data are outputted to the display device 45 to be displayed.

Thus, the avatar E moves on the display devices of the client terminals 13-1 through 13-3 in synchronization.

In addition, in steps S24 and S25, the movement processing operations of the arms and legs, independent objects, are performed.

Figure 16:
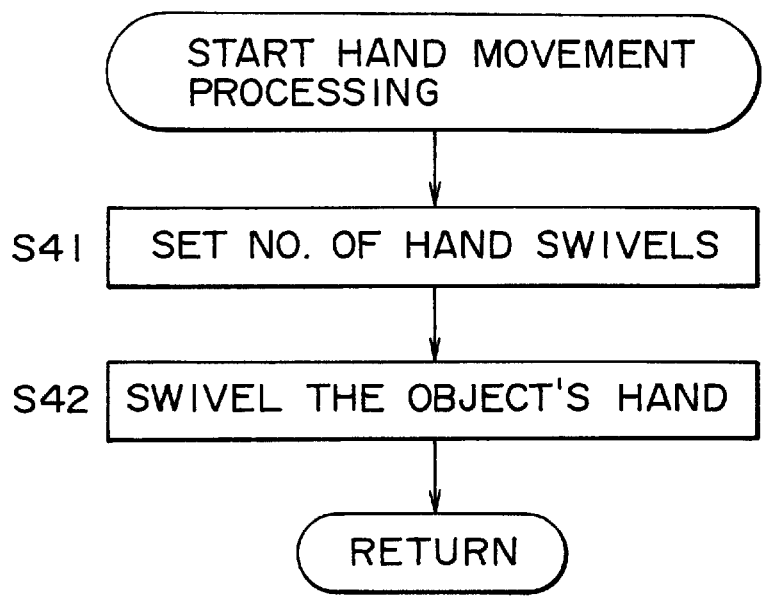
FIG. 16 is a flowchart describing details of the processing of arm movement in step S24 of FIG. 15.

Details of the processing of arm fluctuating movement (an update sequence) are shown in the flowchart of FIG. 16. First, in step S41, the number of times the arm fluctuates is read from the specifications of the avatar movement message and the number thus read is set. Then, in step S42, the image for fluctuating the arms of the object (in this case, the arms of the avatar E) by the number of times set in step S41 is generated. The generated image is outputted to the display device 45 to be displayed.

Thus, when the avatar E is moved in step S23 of FIG. 15, the image in which the arms of the avatar E (in this case, a part of the plurality of objects constituting the avatar E) fluctuate back and forth is displayed.

Figure 17:
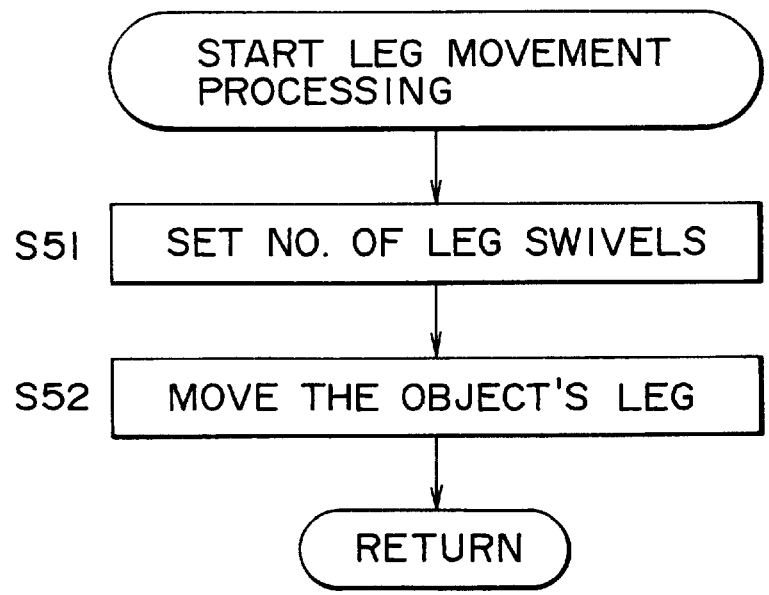
FIG. 17 is a flowchart describing details of the processing of leg movement in step S25 of FIG. 15.

Details of the processing of leg fluctuating movement (an update sequence) are shown in the flowchart of FIG. 17. In step S51, the number of times the leg fluctuates is read from the specifications of the avatar movement message and the number thus read is set. Then, in step S52, the CPU 41 generates the image data for fluctuating the legs of the object (the avatar E) by the number of times set in step S51. The generated image data are outputted to the display device 45 to be displayed.

Thus, when the avatar E is moved in step S23 of FIG. 15, the image in which the hands are fluctuated back and forth in step S24 and the legs are fluctuated alternately in step S25 is displayed.

By setting the number of fluctuation times per unit time of the arms and legs to specific values, different avatars can be made to move their arms and legs differently from those of other avatars. For example, if a tall avatar and a short avatar are walking at a same velocity, setting the number of fluctuation times of the legs of the tall avatar to a smaller value than that of the short avatar can make the walking behavior more natural.

For the number of fluctuation times of arms and legs, defaults (an update sequence) are prepared. Therefore, if no command for the number of fluctuation times of arms and legs has been entered from the input device 49 of the client terminal 13, or a command (an update sequence) for simply moving a specific avatar in a specific direction has been entered, the avatar is displayed with its arms and legs moving in a generally natural manner.

Then, in step S26 of FIG. 15 from step S25, it is determined whether the moving (walking) avatar has moved by the distance set according to the specification in the avatar movement message. If the avatar is found not having walked the specified distance, then, back in step S23, the processing is repeated; namely, the avatar is made continue walking.

In step S26, if the avatar is found having walked the specified distance, then, in step S27, it is determined whether a next message has entered or not. If no new message is found, then, in step S28, the processing to stop the moving avatar is performed. This processing can be performed by generating the stop message numbered 2 of FIG. 9 for example to execute the same, stopping the avatar. However, a setup can also be made such that the walking avatar can be automatically stopped if there is no new message when the same has walked the specified distance (or the specified period).

In step S27, if the new message is found, then, in step S29, the processing specified in the new message is performed. For example, if the new message is the stop message numbered 2, the stop processing is performed in step S29, thereby stopping the walking avatar.

Thus, the avatar can be moved with ease with a relatively small amount of communication and in a generally natural manner.

It should be noted that the server terminal 11-1 controls the clock of the three-dimensional virtual reality space and, when a predetermined time comes, transmits a parade start message numbered 6 to each of the client terminals 13-1 through 13-3. This also allows the above-mentioned parade of the message numbered 6 to be implemented only by using message communication volume in the same processing shown in FIGS. 15 through 17.

Based on the above-mentioned principles of operations, more complex behaviors can also be implemented with relatively small amount of communication.

Figure 18:
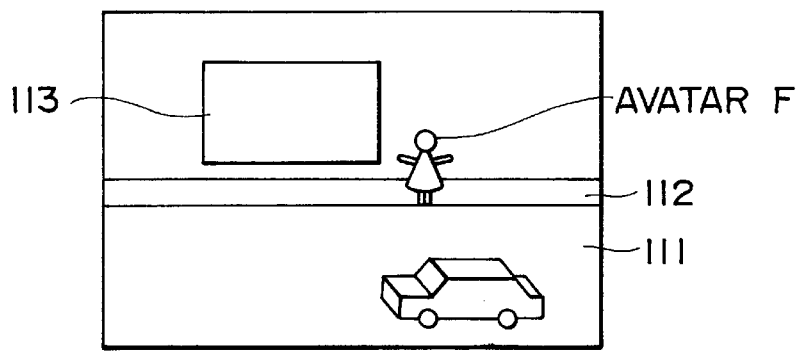
FIG. 18 is a diagram illustrating another display example on a client terminal.

For example, as shown in FIG. 18, it is assumed that a sidewalk 112 is provided along a road 111 with a billboard 113 installed in the proximity of the sidewalk 112 in a virtual reality space. The billboard 113 is set up such that the same displays a predetermined advertisement when an avatar (avatar F in FIG. 18) comes within a predetermined range.

In this case, the server terminal 11-1 receives the positional data of the avatars from the client terminals 13-1 through 13-3 respectively to calculate the distance between each avatar and the billboard 113. When the distance is found smaller than a predetermined level, the server terminal 11-1 generates the complex movement start message numbered 4 and outputs the generated message to the client terminals 13-1 through 13-3. Upon receiving this complex movement start message, the CPU 41 of each of the client terminals 13-1 through 13-3 executes the processing (an update sequence) indicated in the flowchart of FIG. 19.

To be more specific, first in step S61, the billboard 113 of FIG. 18 is turned on. Then, in step S62, predetermined characters and graphics for example are displayed on the billboard 113 according to a predetermined sequence. Then, in step S63, it is determined whether the complex movement stop message numbered 5 has been entered or not. If the complex movement stop message has not been found, then, back in step S62, the display on the billboard 113 is continued.

The server terminal 11-1 always monitors the distance between avatar F in the proximity of the billboard 113 an the billboard 113. When this distance becomes greater than the preset level, the server terminal 11-1 generates the complex movement stop message numbered 5 to output the same to the client terminals 13-1 through 13-3.

Figure 19:
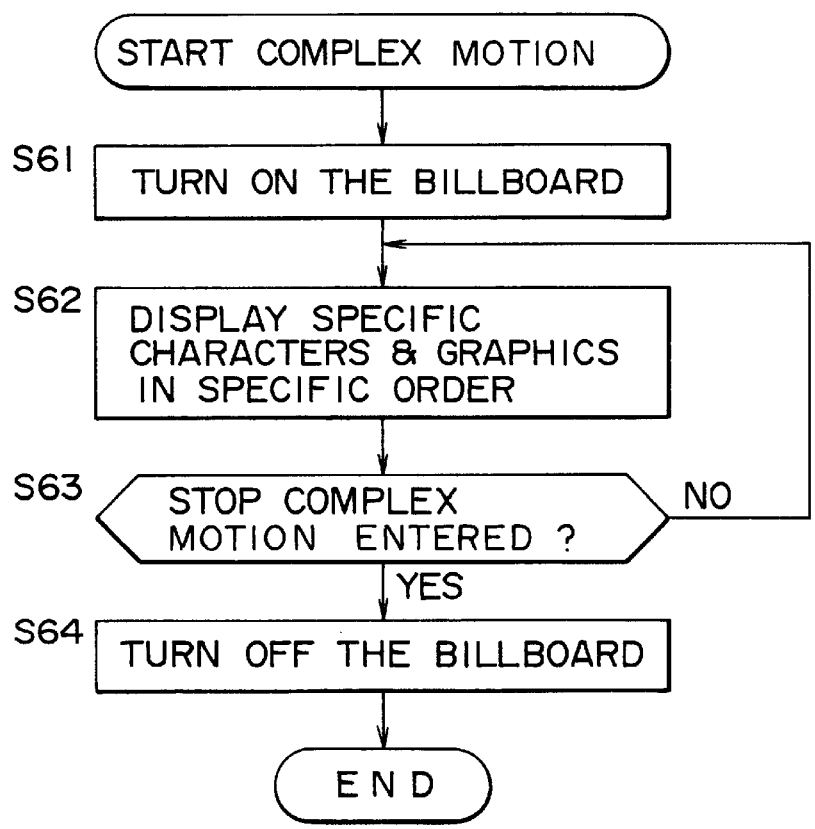
FIG. 19 is a flowchart describing the processing in which complex movement is started.

In step S63 of FIG. 19, upon reception of this message, the CPU 41 of the client terminal 13 goes to step S64 to turn off the billboard 113. Namely, the complex movement performed on the billboard 113 is stopped.

Thus, even for complex movements (update sequences), simply registering the same in the client terminals 13-1 through 13-3 in advance allows the client terminals 13-1 through 13-3 to display complex movement images simply by outputting a message for indicating their start to the client terminals 13-1 through 13-3.

In the above-mentioned embodiment, the two server terminals and the three client terminals are connected via the network. It will be apparent to those skilled in the art that the number of terminals and networks is not limited to these values.

It should be noted that displaying avatars C through F in addition to the above-mentioned conical object 101, the quadrangular prism object 102, and the cylindrical object 103 also requires objects that provide a background. The basic states of the background objects are not subject to change, so that these objects are referred to as basic objects as contrasted with the update objects of which states are subject to change. A background image formed by basic objects is supplied from the server terminal 11 to the client terminal 13 via the Internet. Therefore, the update objects are displayed superimposed on the background image (basic objects).

Meanwhile, in the above-mentioned related art Habitat, an animation in which an avatar moves while fluctuating its arms and legs on a two-dimensional background is displayed when the cursor is moved to a target position to which an avatar is to be moved, the mouse button is kept pressed on that position to display a mouse command (a pop-up menu), and "GO" command in the pop-up menu is clicked. However, this is the display in which the avatar created by two-dimensional graphics is superimposed on the background image created by two-dimensional graphics, namely the display based on the animation created by a series of celluloid pictures in which bit map data representing different directions of the arms and legs are alternately read out as the avatar moves along.

Namely, in Habitat, a two-dimensional virtual reality space can be viewed only from a position viewing over the entire space including one's own avatar from the viewpoint of a third person. Therefore, it is impossible for Habitat to change viewpoints or represent a depth.

On the contrary, in the above-mentioned embodiment of the present invention, the update sequences of the avatar's arms and legs (each sub object) may be defined in advance such that the update sequences interlock with each other. This allows the avatar to perform a variety of behaviors which are minutely different from each other according to the attributes of the avatar simply by giving a message "walk" for example to the avatar (for example, a male avatar is made walk with a big stride while a female avatar with a small, feminine stride).

It should be noted that the data of each object are defined as a VRML file or an E-VRML file, details of which will be described later.

In the above-mentioned embodiment of the present invention, each client terminal 13 moves its object. It is also possible to display on each client terminal the image of a virtual reality space seen from the viewpoint of each corresponding avatar. When the viewpoint is moved on each client terminal, the background image changes corresponding to the viewpoint. If an avatar of another client terminal is found within the view field range seen from that viewpoint, that avatar is displayed. Therefore, the avatar display state is a result of the composition of a movement command from that client terminal to that avatar. This makes control of the display more complex.

Figure 20:
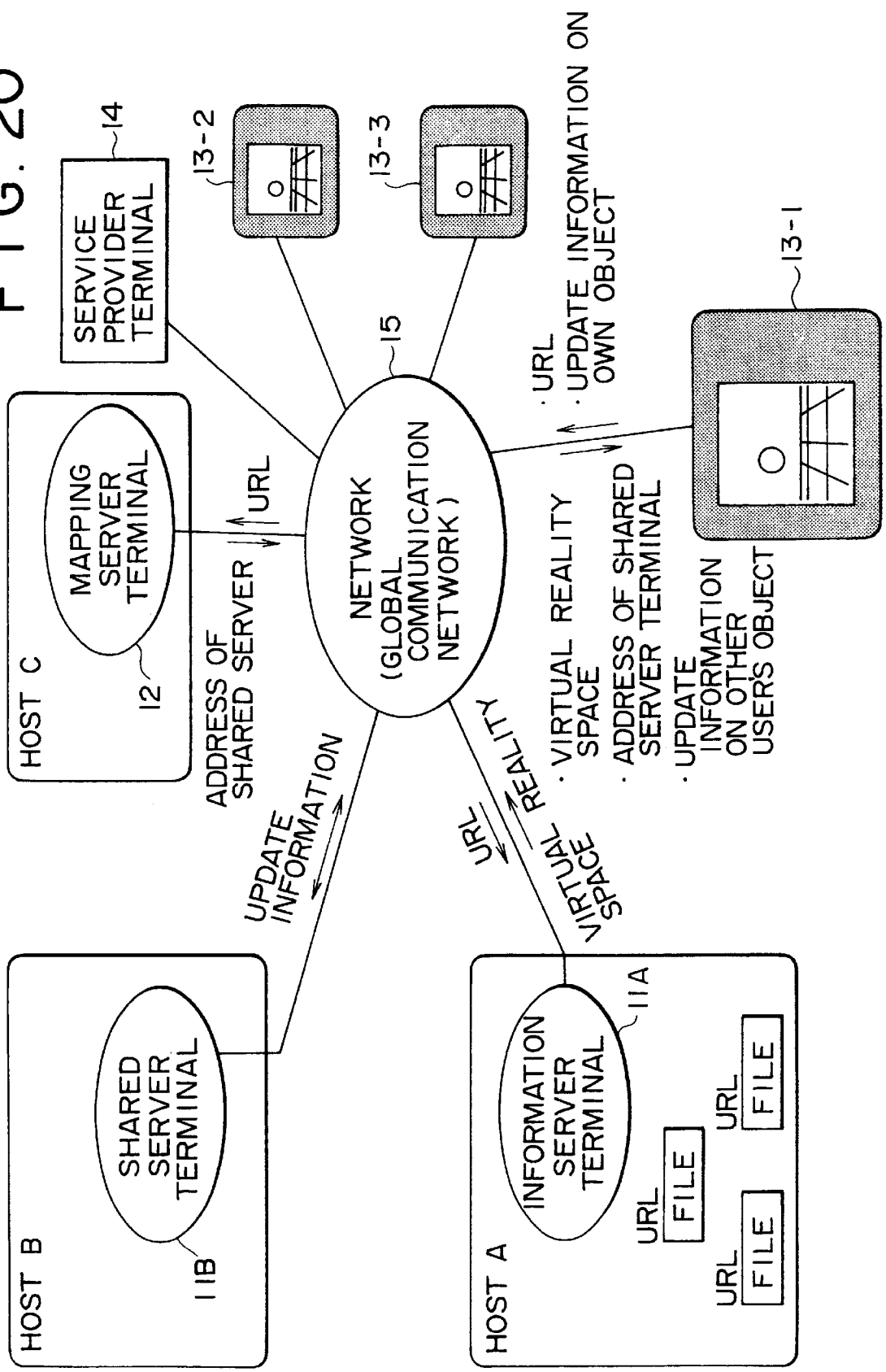
FIG. 20 is a block diagram illustrating an example of the constitution of the cyberspace system practiced as another preferred embodiment of the present invention.

FIG. 20 shows a more concrete example of the constitution of a cyberspace system based on the Internet. In this preferred embodiment, one of the above-mentioned server terminals 11-1 and 11-2 (for example, the server terminal 11-1) is used as an information server terminal and the other (the server terminal 11-2) is used as a shared server terminal. In what follows, therefore, the server terminal 11-1 denotes the information server terminal 11A while the server terminal 11-2 denotes the shared server terminal 11B.

A host A constitutes a system of the WWW (World Wide Web) for example. Namely, the host A has information (or a file) to be described later. And, each piece of information (or each file) is related with a URL (Uniform Resource Locator) for uniformly specify that information. Specifying a URL allows access to the information corresponding to it.

To be more specific, the host A stores three-dimensional image data for providing three-dimensional virtual reality spaces (hereinafter appropriately referred to simply as virtual reality spaces) such as virtual streets in Tokyo, New York, and other locations for example. It should be noted that these three-dimensional image data do not change in their basic state; that is, these data include static data consisting of only basic objects such as a building and a road to be shared by a plurality of users. If the basic state changes, it only reflects an autonomous change in the state of a merry-go-round or a neon. The static data are considered to be data that are not subject to update. The host A has an information server terminal 11A (a basic server terminal). The information server terminal 11A is adapted, when the same receives a URL via the network 15, to provide the information corresponding to the received URL, namely a corresponding virtual reality space (in this case, a space consisting of only basic objects).

It should be noted that, in FIG. 20, there is only one host, namely the host A, which has an information server terminal for providing the virtual reality space (consisting of only basic objects) of a specific area. It is apparent that such a host may be installed in plural.

A host B has a shared server terminal 11B. The shared server terminal 11B controls update objects that constitute a virtual reality space when put in it. The update objects are avatars for example representing users of the client terminals. Thus, the shared server terminal 11B allows a plurality of users to share the same virtual reality space. It should be noted, however, that the host B controls only the update objects located in a virtual reality space for only a specific area (for example, Tokyo) of the virtual reality spaces controlled by the host A. That is, the host B is dedicated to the virtual reality space of a specific area. Also, it should be noted that the network 15 is connected with, in addition to the host B, a host, not shown, having a shared server terminal for controlling update objects located in virtual reality spaces of other areas such as New York and London, stored in the host A.

A host C, like the host A, constitutes a WWW system for example and stores data including IP (Internet Protocol) addresses for addressing hosts (shared server terminals) that control update objects like the host B. Therefore, the shared server terminal addresses stored in the host C are uniformly related with URLs as with the case of the host A as mentioned above. In addition, the host C has a mapping server terminal 12 (a control server terminal). Receiving a URL via the network 15, the mapping server terminal 12 provides the IP address of the shared server terminal corresponding to the received URL via the network 15. It should be noted that FIG. 20 shows only one host, namely the host C, which has the mapping server terminal 12 for providing shared server terminal addresses. It will be apparent that the host C can be installed in plural.

The client terminal 13 (13-1, 13-2 or 13-3) receives a virtual reality space from the information server terminal 11A via the network 15 to share the received virtual reality space with other client terminals (including the service provider terminal 14), under the control of the shared server terminal 11B. Further, the client terminal 13 is also adapted to receive specific services (information) using the virtual reality space from the service provider terminal 14.

The service provider terminal 14, like the client terminal 13, receives a virtual reality space to share the same with the client terminal 13 (if there is another service provider terminal, it also shares this space). Therefore, as far as the capability of this portion is concerned, the service provider terminal 14 is the same as the client terminal 13.

Further, the service provider terminal 14 is adapted to provide specific services to the client terminal 13. It should be noted that FIG. 20 shows only one service provider terminal 14. It will be apparent that the service provider terminal may be installed in plural.

Figure 21:
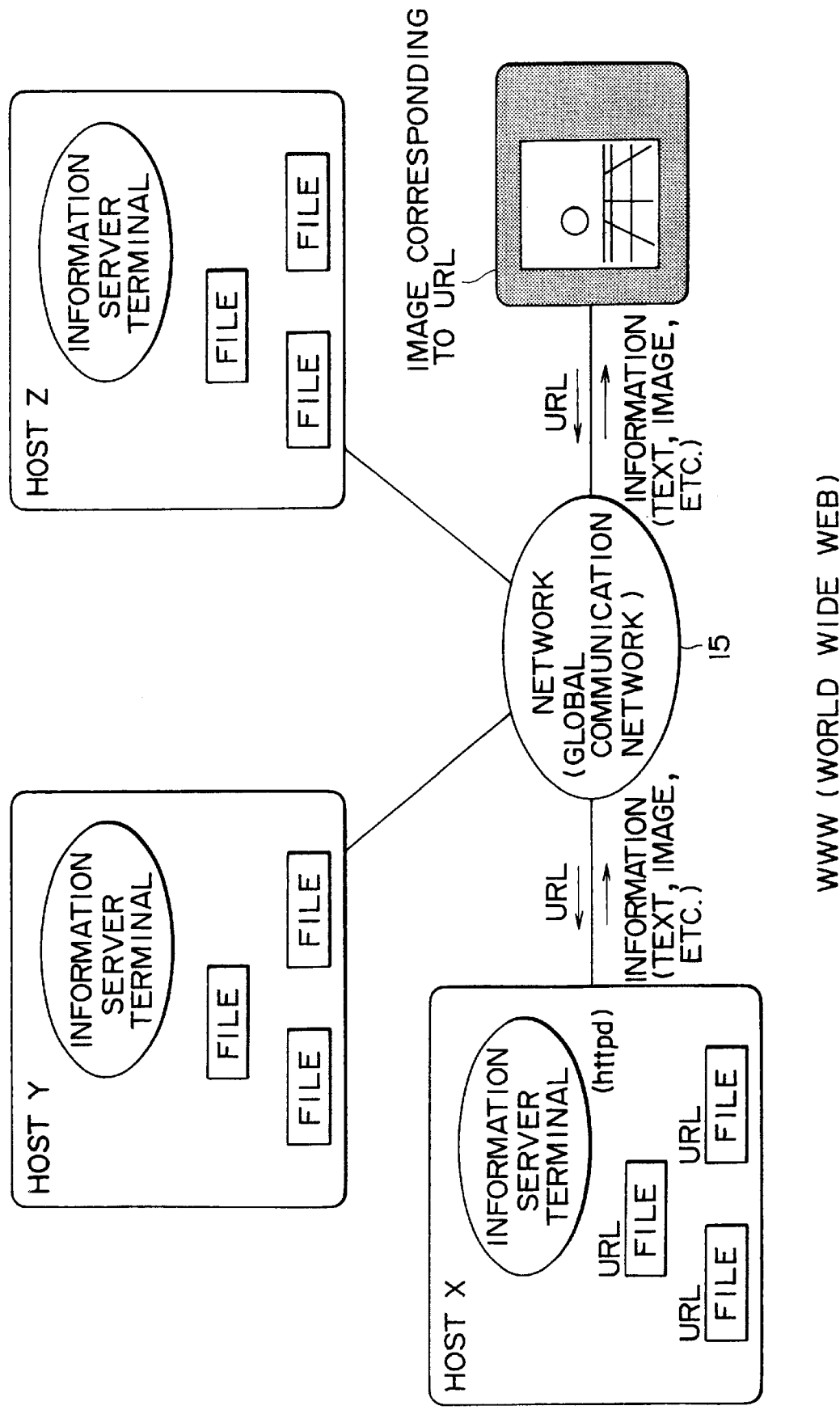
FIG. 21 is a diagram describing the WWW (World Wide Web)

The following briefly describes a WWW system constituted by the host A and the host C. Referring to FIG. 21, the WWW is one of the systems for providing information from hosts X, Y, and Z to unspecified users (client terminals) via the network 15 (the Internet in the case of the WWW). The information that can be provided in this system include not only texts but also graphics, images (including still images and moving pictures), voices, three-dimensional images, and hyper texts which combines all these information.

Figures 22, 23:
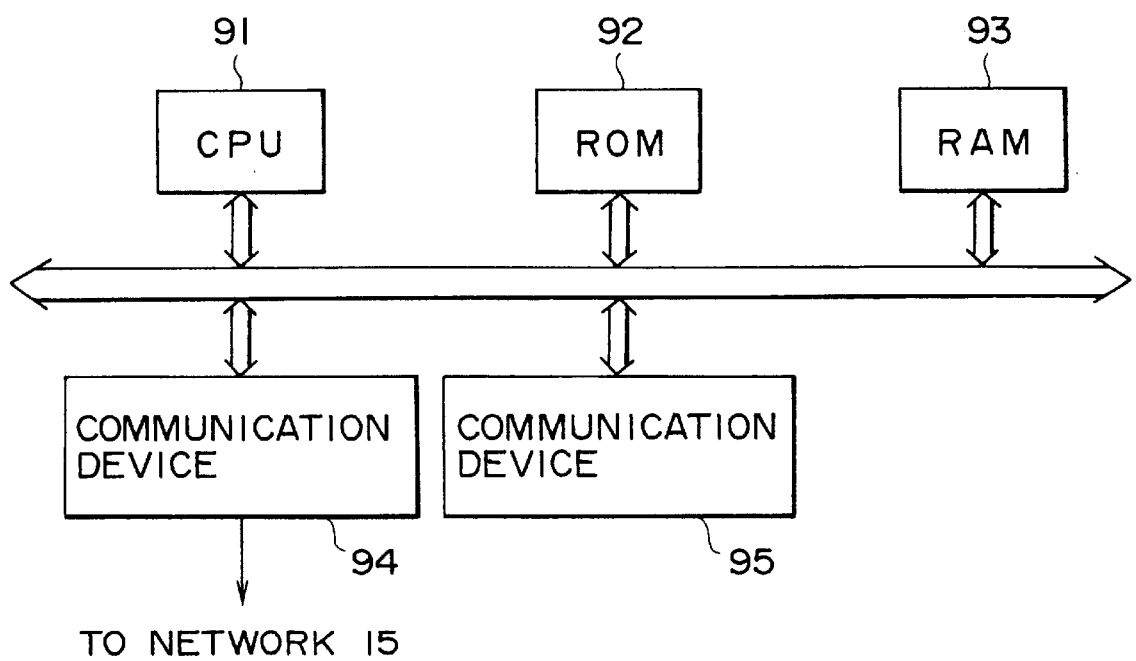
FIG. 22 is a diagram illustrating an example of URL.
FIG. 23 is a block diagram illustrating an example of the constitution of a mapping server terminal.

In the WWW, a URL, or a form for uniformly represent these pieces of information is determined. Specifying a specific URL, each user can obtain the information corresponding to the specified URL. As shown in FIG. 22, each URL is composed of a protocol type for representing a service type (http in the preferred embodiment of FIG. 22, which is equivalent to a command for retrieving a file corresponding to a file name to be described later and send the retrieved file), a host name indicating a destination of the URL (in the embodiment of FIG. 22, www.csl.sony.co.jp), and a file name of data to be sent (in the embodiment of FIG. 22, index.html) for example.

Each user operates the client terminal to enter a URL for desired information. When the URL is entered, the client terminal references a host name, for example, contained in the URL. A link with a host (in the embodiment of FIG. 21, the host X for example connected to the Internet) addressed by the host name is established. Then, at the client terminal, the URL is sent to the linked host, namely the host X, via the Internet, requesting the host X for sending the information specified in the URL. In the host X, an HTTP demon (httpd) is operating on the information server terminal (the WWW server terminal). Receiving the URL, the information server terminal sends back the information specified in the URL to the client terminal via the Internet.

The client terminal receives the information from the information server terminal to display the received information on its monitor as required. Thus, the user can get the desired information.

Therefore, only storing in the host such data for describing elements (objects) for constituting a virtual reality space as shapes of basic objects (for example, a rectangular prism and a cone) and locations and attributes (color and texture for example) of these basic objects allows to provide the virtual reality space (consisting of only basic objects in this case) to unspecified users. Namely, as long as the Internet is used for the network 15 and the WWW is used, virtual reality spaces can be provided to unspecified users worldwide with ease and at a low cost because the Internet itself already spans almost all over the world and the description of the elements constituting each virtual reality space to be stored in hosts does not require to make changes to information servers (WWW server terminals) constituting the WWW. It should be noted that the service for providing the description of the elements constituting a virtual reality space is upward compatible with existing services provided by the WWW.

Storing in a specific host (a mapping server terminal) the IP addresses of other hosts as information also allows to provide the host IP addresses to unspecified users worldwide with ease.

It should be noted that it is difficult for a plurality of users to share the same virtual reality space if only the description (the data of three-dimensional image for providing the virtual reality space of a specific area) of elements constituting the virtual reality space is stored in a host constituting the WWW. Namely, in the WWW, the information corresponding to a URL is only provided to a user and therefore no control for information transfer is performed. Hence, it is difficult to transfer between users the above-mentioned change information of update objects by using the WWW without changing its design. Therefore, in the cyberspace system of FIG. 20, the host B having the shared server terminal 11B and the host C having the mapping server 12 are installed to allow a plurality of users to share the same virtual reality space, details of which will be described later.

FIG. 23 shows an example of the constitution of the mapping server terminal 12 operating on the host C of FIG. 20. Components CPU 91 through communication device 94 are generally the same in constitution as those of FIG. 2, so that the description of the components of FIG. 23 is omitted in general. A storage device 95 stores addresses, along with URLs, for identifying shared server terminals that control update objects (in the embodiment of FIG. 20, only the shared server terminal 11B is shown; actually, other shared server terminals, not shown, are connected to the network 15).

The following describes the operations of the client terminal 13 (or the service provider terminal 14), the information server terminal 11A, the mapping server terminal 12, and the shared server terminal 11B with reference to the flowcharts of FIGS. 24 through 27.

Figure 24:
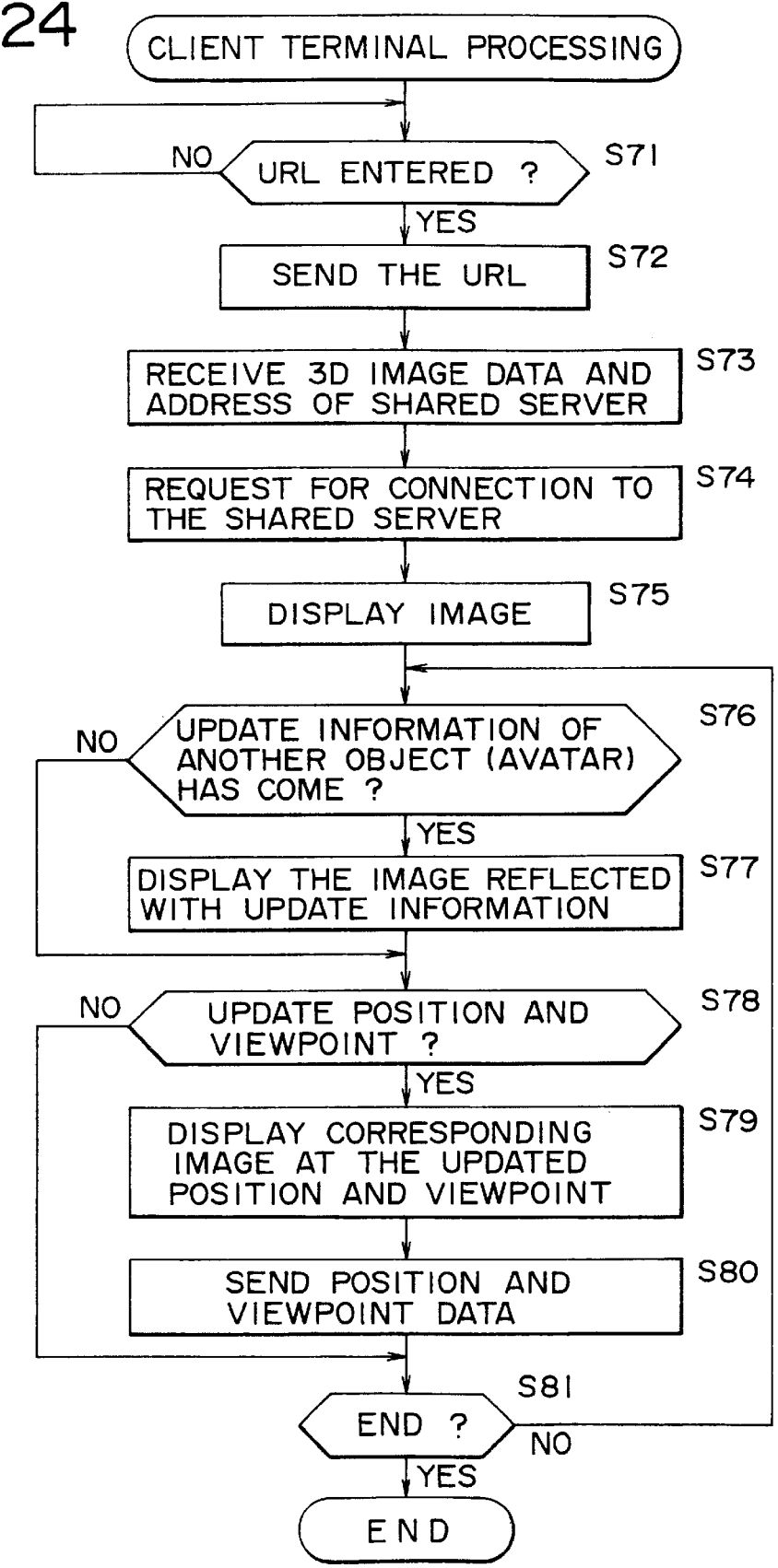
FIG. 24 is a flowchart describing the operations of the client terminal 13 (the service provider terminal 14)

Now, referring to FIG. 24, there is shown an example of processing by the client terminal 13 (or the service provider terminal 14). In step S71, the CPU 41 checks whether a virtual reality space URL has been entered or not. If no virtual reality space URL has been found, the processing remains in step S71. If a virtual reality space URL has been found in step S71, namely, if a virtual reality space URL corresponding to a desired virtual reality space entered by the user by operating the keyboard 49a has been received by the CPU 41 via interface 48, the process goes to step S72. In step S72, a WWW system is constituted as described with reference to FIG. 21 and the virtual reality space URL is transmitted from the communication device 44 via the network 15 to the information server terminal of a specific host (in this case, the information server terminal 11A of the host A for example) that has the information server terminal, thereby establishing a link.

Further, in step S21, an address acquisition URL related to the virtual reality space URL is read from the storage device 50 to be transmitted from the communication device 44 via the network 15 to the mapping server terminal of a specific host (in this case, mapping server terminal 12 of the host C for example) that constitutes the WWW system, thereby establishing a link.

Then, the process goes to step S73. In step S73, data (three-dimensional image data) of the virtual reality space or the IP address of the shared server terminal 11B corresponding to the virtual reality space URL received in step S72 or the address acquisition URL is received by the communication device 44.

Namely, in step S72, the virtual reality space URL is transmitted to the information server terminal 11A. When this virtual reality space URL is received by the information server terminal 11A, the data of the corresponding virtual reality space are transmitted to the client terminal 13 via the network 15 in step S92 of FIG. 25 to be described. Thus, in step S73, the data of the virtual reality space transmitted from the information server terminal 11A are received. It should be noted that the received virtual reality space data are transferred to the RAM 43 to be stored there (or first stored in the storage device 50 to be transferred to the RAM 43.

Also, in step S72, the address acquisition URL is transmitted to the mapping server terminal 12. When the address acquisition URL is received by the mapping server terminal 12, the IP address of the shared server terminal corresponding to the URL is transmitted to the client terminal 13 via the network 15 in step S102 of FIG. 26 to be described. Thus, in step S73, the IP address of the shared server terminal 11B transmitted from the mapping server 12 is received.

As described above, the address acquisition URL related to the entered virtual reality space URL corresponds to the IP address of the shared server terminal that controls the update object placed in the virtual reality space corresponding to that virtual reality space URL. Therefore, for example, if the entered virtual reality space URL corresponds to a virtual reality space of Tokyo and the shared server terminal 11B owned by the host B controls the update objects placed in the Tokyo virtual reality space, the IP address of the shared server terminal 11B is received in step S73. Consequently, the user can automatically get the location (the IP address) of the shared server terminal that controls the virtual reality space of a desired area even if the user does not know which shared server terminal controls the update objects in a virtual reality space in which area.

It should be noted that, in steps S72 and S73, the processing of transmitting the virtual reality space URL and the address acquisition URL and receiving the virtual reality space data and the IP address is actually performed by transmitting the virtual reality space URL, receiving the data of the corresponding virtual reality space, transmitting the address acquisition URL, and then receiving the corresponding IP address in this order by way of example.

When the virtual reality space data and the shared server terminal IP address are received in step S73, the process goes to step S74. In step S74, a connection request is transmitted from the communication device 44 via the network 15 to the shared server terminal (in this case, the shared server terminal 11B for example) corresponding to the IP address (the shared server terminal IP address) received in step S73. This establishes a link between the client terminal 13 and the shared server terminal 11B. Further, in step S73, after the establishment of the link, the avatar (namely, the update object) representing oneself stored in the storage device 50 is transmitted from the communication device 44 to the shared server terminal 11B.

When the shared server terminal 11B receives the user's avatar, the same is then transmitted to the client terminals of other users existing in the same virtual reality space (in this case, that of Tokyo as mentioned above). Then, on the client terminals of other users, the transmitted avatar is placed in the virtual reality space, thus implementing the sharing of the same virtual reality space among a plurality of users.

Figure 36:
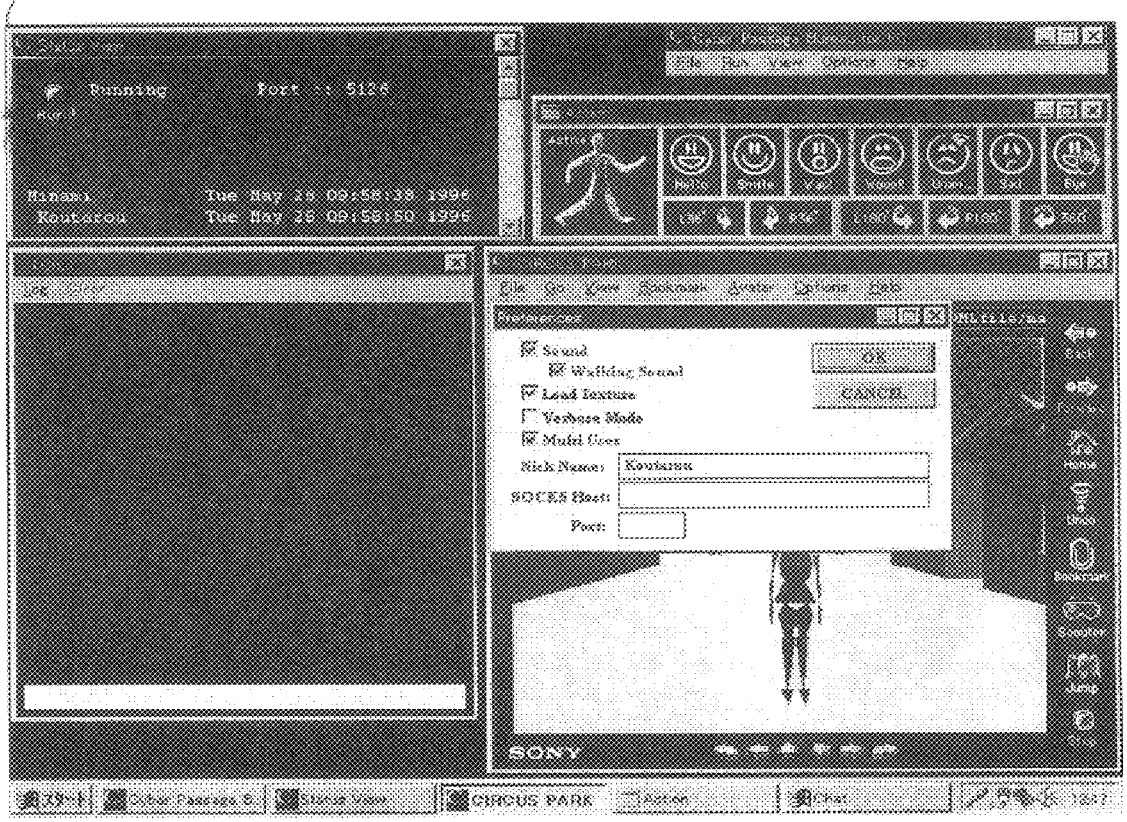
FIG. 36 is a diagram illustrating still another display example on the shared server terminal 11B-1 of FIG. 32.
Figure 37:
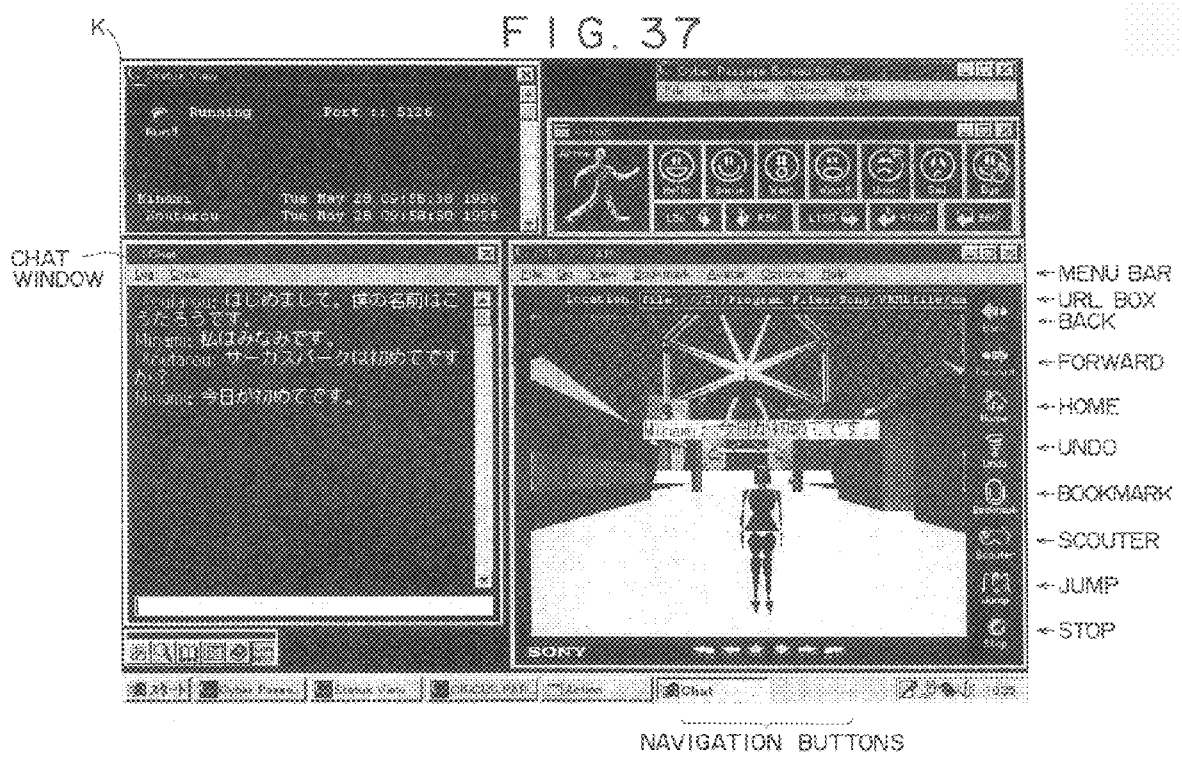
FIG. 37 is a diagram illustrating yet another display example on the shared server terminal 11B-1 of FIG. 32.

It should be noted that, rather than providing the user's avatar from the client terminal 11B to the shared server terminal 11B, a predetermined avatar may also be allocated from the shared server terminal 11B to each user who accessed the same. Also, in the client terminal 13, the avatar of the user himself who uses this terminal can be placed and displayed in the virtual reality space as shown in FIGS. 36 and 37; in the real world, however, the user cannot see himself, so that it is desirable for the user's avatar not be displayed on that user's client terminal in order to make the virtual reality space as real as possible.

When the processing of step S74 has been completed, the process goes to step S75. In step S75, the data of the virtual reality space that can be seen when the same is seen from specific viewpoint and position are read from the RAM 43 by the CPU 41 to be supplied to the display device 45. Thus, the specific virtual reality space is shown on the display device 45.

Then, in step S76, the communication device 44 determines whether update information of another user's avatar has been sent from the shared server terminal 11B.

As described above, the user can update the position or viewpoint of his own avatar by operating the viewpoint input device 49c, the movement input device 49d or mouse 49b. If the update of the position or viewpoint of the avatar is instructed by using this capability, the CPU 41 receives the instruction via the interface 48. According to the instruction, the CPU 41 performs processing for outputting positional data or viewpoint data corresponding to the updated position or viewpoint as update information to the shared server terminal 11B. In other words, the CPU 41 controls the communication device 44 to transmit the update information to the shared server terminal 11B.

Figure 27:
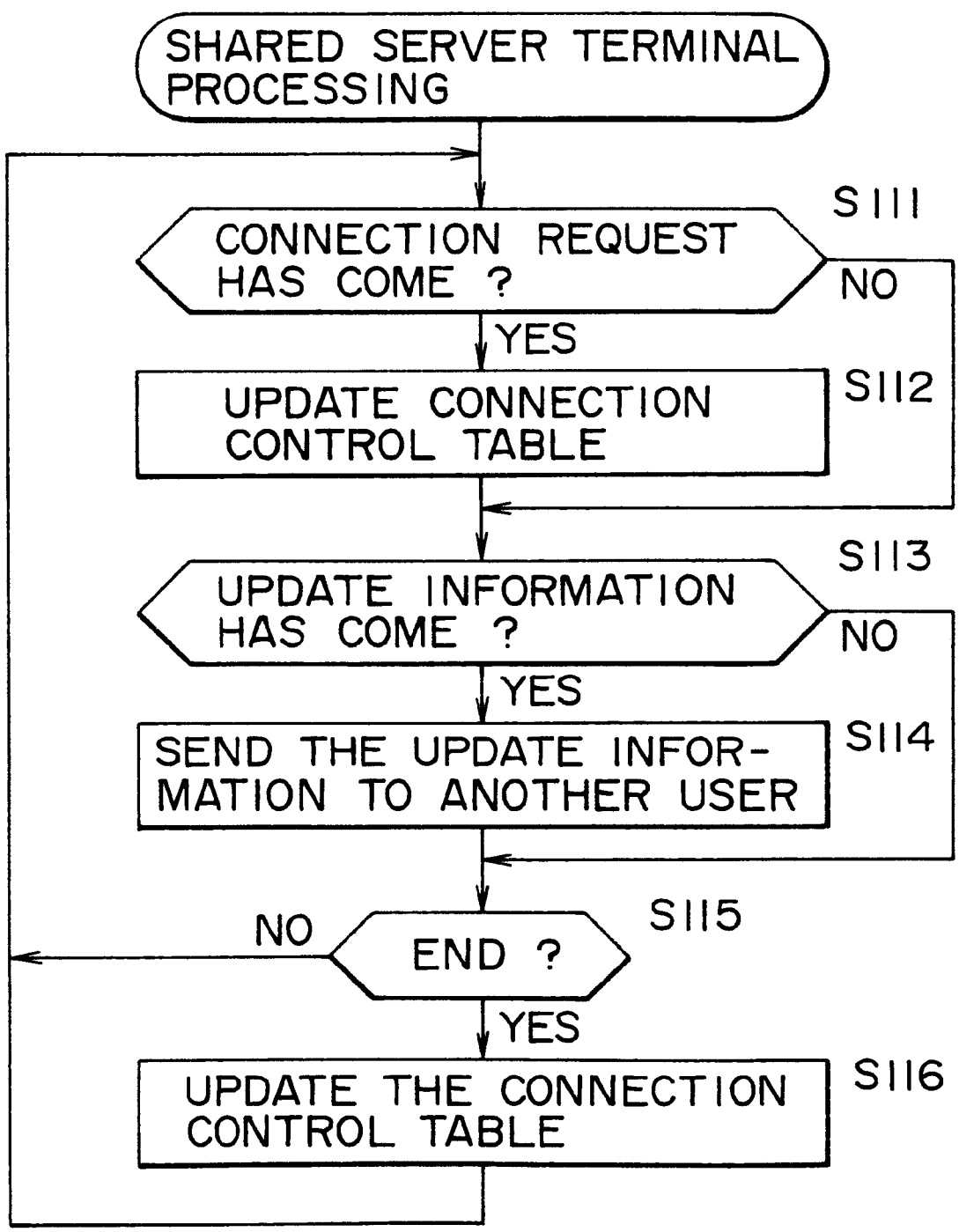
FIG. 27 is a flowchart describing the operations of a shared server terminal 11B.

Receiving the update information from the client terminal, the shared server terminal 11B outputs the update information to other client terminals in step S114 of FIG. 27 to be described. It should be noted the shared server terminal 11B is adapted to transmit the avatar received from the client terminal that requested for access to client terminals of other users, this avatar being transmitted also as update information.

When the update information has come as mentioned above, it is determined in step S76 that update information of the avatar of another user has come from the shared server terminal 11B. In this case, this update information is received by the communication device 44 to be outputted to the CPU 41. The CPU 41 updates the display on the display device 45 according to the update information in step S77. That is, if the CPU 41 receives the positional data or viewpoint data from another client terminal as update information, the CPU 41 moves or changes (for example, the orientation of the avatar) the avatar of that user according to the received positional data or viewpoint data. In addition, if the CPU 41 receives the avatar from another client terminal, the CPU 41 places the received avatar in the currently displayed virtual reality space at a specific position. It should be noted that, when the shared server terminal 11B transmits an avatar as update information, the shared server terminal also transmits the positional data and viewpoint data of the avatar along with the update information. The avatar is displayed on the display device 45 according to these positional data and viewpoint data.

When the above-mentioned processing has come to an end, the process goes to step S78.

Meanwhile, if, in step S76, no update information of the avatar of another user has come from the shared server terminal 11B, the process goes to step S78, skipping step S77. In step S78, the CPU 41 determines whether the position or viewpoint of the avatar of the user of the client terminal 13 has been updated or not by operating the viewpoint input device 49c or the movement input device 49d.

In step S78, if the CPU 41 determines that the avatar position or viewpoint has been updated, namely, if the viewpoint input device 49c or the movement input device 49d has been operated by the user, the process goes to step S79. In step S79, the CPU 41 reads data of the virtual reality space corresponding to the position and viewpoint of the avatar of the user based on the entered positional data and viewpoint data, makes calculations for correction as required, and generates the image data corresponding to the correct position and viewpoint. Then, the CPU 41 outputs the generated image data to the display device 45. Thus, the image (virtual reality space) corresponding to the viewpoint and position entered from the viewpoint input device 49c and the movement input device 49d is displayed on the display device 45.

Further, in step S80, the CPU 41 controls the communication device 44 to transmit the viewpoint data or the positional data entered from the viewpoint input device 49c or the movement input device 49d to the shared server terminal 11, upon which process goes to step S81.

Here, as described above, the update information coming from the client terminal 13 is received by the shared server terminal 11B to be outputted to other client terminals. Thus, the avatar of the user of the client terminal 13 is displayed on the other client terminals.

On the other hand, in step S78, if CPU 41 determines that the avatar's position or viewpoint has not been updated, the process goes to step S81 by skipping steps S79 and S80. In step S81, the CPU 41 determines whether the end of the update data input operation has been instructed by operating a predetermined key on the keyboard; if the end has not been instructed, the process goes back to step S76 to repeat the processing.

Figure 25:
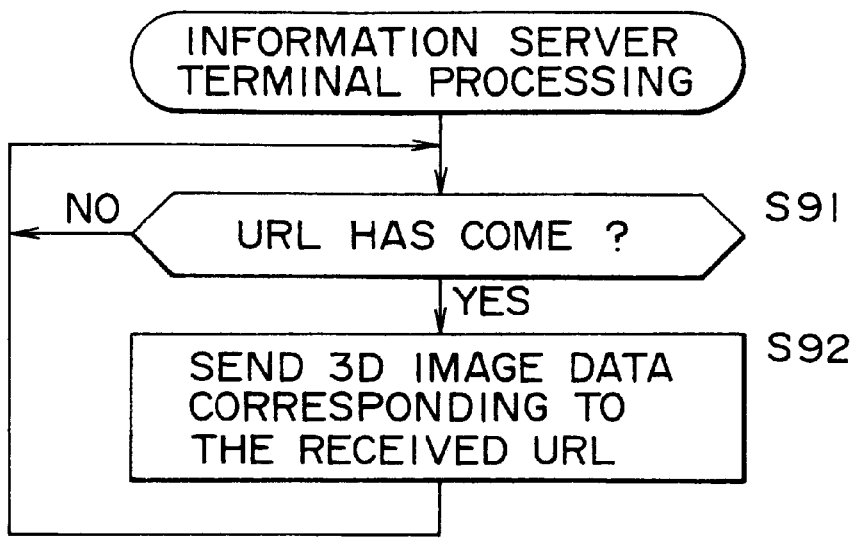
FIG. 25 is a flowchart describing the operations of an information server terminal 11A.

Referring to the flowchart of FIG. 25, there is shown an example of the processing by the information server terminal 11A. First, in the information server terminal 11A, the communication device 24 determines in step S91, whether a virtual reality space URL has come from the client terminal 13 via the network 15. If, in step S91, the communication device 24 determines that no virtual reality space URL has come, the process goes back to step S91. If the virtual reality space URL has come, the same is received by the communication device 24, upon which the process goes to step S92. In step S92, the data of the virtual reality space related to the virtual reality space URL received by the communication device 24 are read by the CPU 21 to be transmitted via the network 15 to the client terminal 13 that transmitted the virtual reality space URL. Then, the process goes back to step S91 to repeat the above-mentioned processing.

Figure 26:
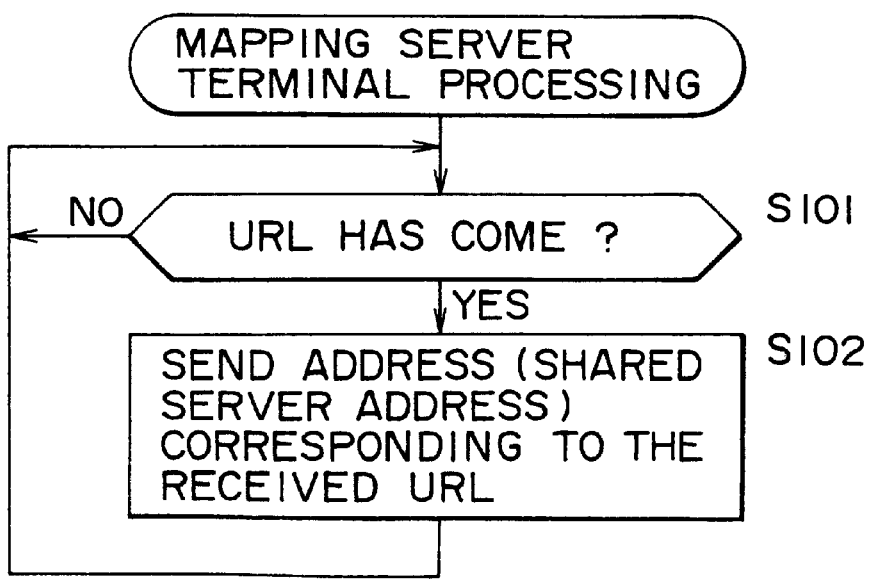
FIG. 26 is a flowchart describing the operations of a mapping server terminal 12.

FIG. 26 shows an example of the processing by the mapping server terminal 12. In the mapping server terminal 12, the communication device 24 determines in step S101, whether an address acquisition URL has come from the client terminal 13 via the network 15. If no address acquisition URL has come, the process goes back to step S101. If the address acquisition URL has come, the same is received by the communication device 24, upon which the process goes to step S102. In step S102, the IP address (the IP address of the shared server terminal) related to the address acquisition URL received by the communication device 24 is read from the storage device 30 by the CPU 21 to be transmitted via the network 15 to the client terminal 13 that transmitted the address acquisition URL. Then, the process goes back to step S101 to repeat the above-mentioned processing.

FIG. 27 shows an example of the processing by the shared server terminal 11B. In the shared server terminal 11B, the communication device 24 determines, in step S111, whether a connection request has come from the client terminal 13 via the network 15. If no connection request has come in step S111, the process goes to step S113 by skipping step S112. If the connection request has come in step S111, that is, if the client terminal 13 has the connection request to the shared server terminal 11B in step S74 of FIG. 24, the communication link with the client terminal 13 is established by the communication device 24, upon which the process goes to step S112.

In step S112, a connection control table stored in the RAM 23 is updated by the CPU 21. Namely, it is necessary for the shared server terminal 11B to recognize the client terminal 13 with which the shared server terminal 11B is linked, in order to transmit update information coming from the client terminal 13 to other client terminals. To do so, when the communication link with client terminals has been established, the shared server terminal 11B registers the information for identifying the linked client terminals in the connection control table. That is, the connection control table provides a list of the client terminals currently linked to the shared server terminal 11B. The information for identifying the client terminals include the source IP address transmitted from each client terminal as the header of TCP/IP packet and a nickname of the avatar set by the user of each client terminal.

Then, the process goes to step S113, in which the communication device 24 determines whether the update information has come from the client terminal 13. If, in step S113, no update information has been found, the process goes to step S115 by skipping step S114. If the update information has been found in step S113, namely, if the client terminal 13 has transmitted, in step S80 of FIG. 24, positional data and viewpoint data as the update information to the shared server terminal 11B (or, in step S74 of FIG. 24, the client terminal 13 has transmitted the avatar as the update information to the shared server terminal 11B after transmission of the connection request), the update information is received by the communication device 24, upon which the process goes to step S114. In step S114, the CPU 21 references the connection control table stored in the RAM 23 to transmit the update information received by the communication device 24 to other client terminals than the client terminal which transmitted that update information. At this moment, the source IP address of each client terminal controlled by the connection control table is used.

It should be noted that the above-mentioned update information is received by the client terminal 13 in step S76 of FIG. 24 as described above. At this moment, the IP address of the source of each client terminal controlled by the connection control table is used.

Then, the process goes to step S115, in which the CPU 21 determines whether the end of processing has been instructed by the client terminal 13. If the end of processing has not been instructed, the process goes back to S111 by skipping step S116. If the end of processing has been instructed, the process goes to step S116. In step S116, the link with the client terminal 13 from which the instruction has come is disconnected by the communication device 24. Further, from the connection control table, the information associated with the client terminal 13 is deleted by the CPU 21, upon which the process goes back to step S111.

It should be noted that the update information is appropriately transmitted as a message (FIG. 9) as described above.

Thus, the control of the update objects is performed by the shared server terminal 11B and the control (or provision) of the basic objects is performed by the information server terminal 11A constituting the WWW of the Internet used world-wide, thereby easily providing virtual reality spaces that can be shared by unspecified users world-wide. It should be noted that the specifications of the existing WWW system need not be modified to achieve the above-mentioned objective.

Provision of the virtual reality space data by use of the WWW system need not create any new web browser because the transfer of these data can be made using related art web browsers such as the Netscape Navigator (trademark) offered by Netscape Communications, Inc. for example.

Moreover, because the IP address of the shared server terminal 11B is provided by the mapping server terminal 12, the user can share a virtual reality space with other users without knowing the address of the shared server terminal 11B.

Figure 28:
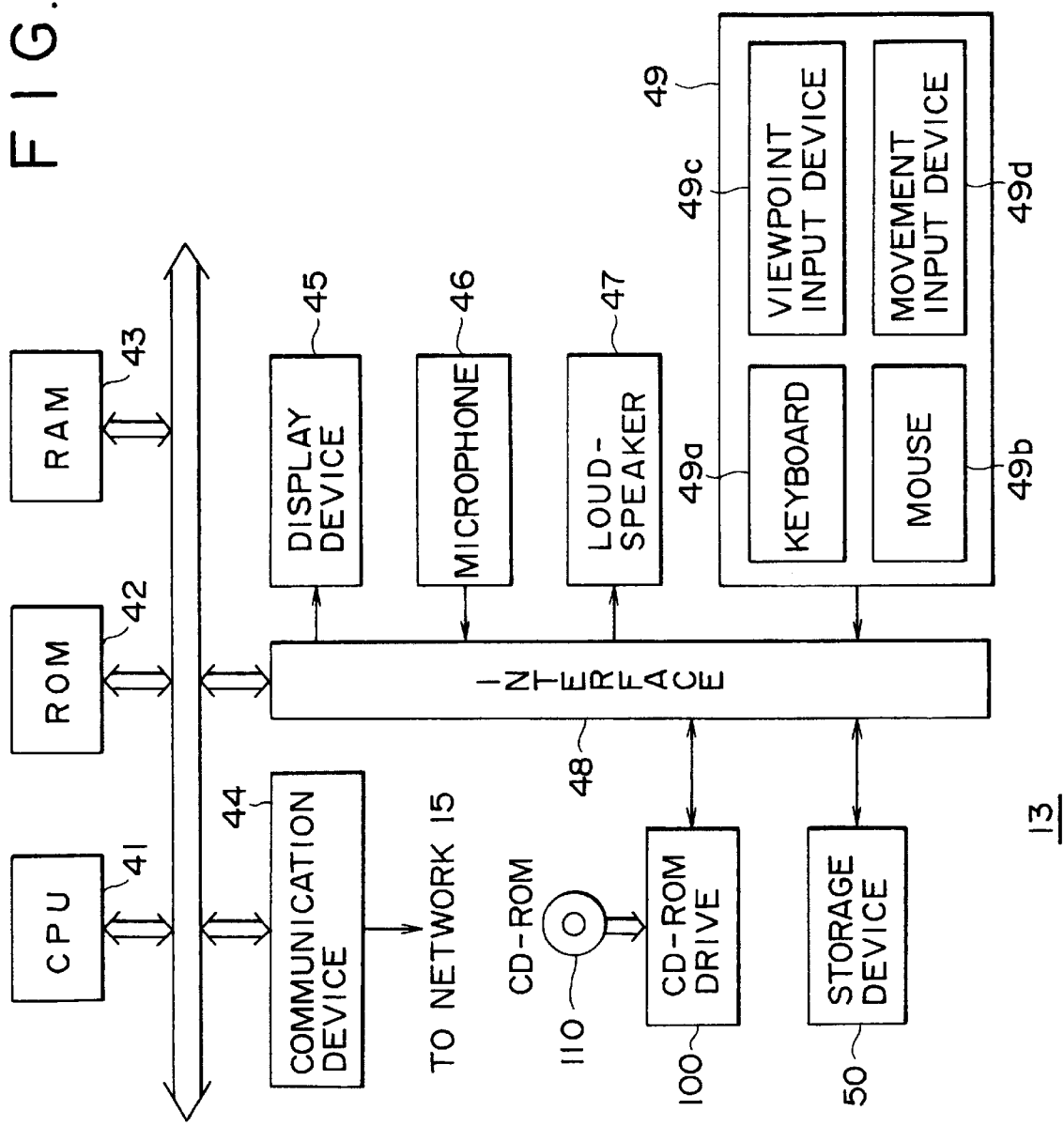
FIG. 28 is a block diagram illustrating the client terminal 13 practiced as another preferred embodiment of the present invention.

In the above-mentioned preferred embodiments of the invention, the basic objects are supplied to each client terminal 13 via the network 15; however, it is also possible to store the basic objects in an information recording medium such as a CD-ROM and distribute the same to each user in advance. In this case, each client terminal 13 is constituted as shown in FIG. 28. To be more specific, in the embodiment of FIG. 28, a CD-ROM drive 100 is connected to the interface 48 to drive a CD-ROM 101 in which a virtual reality composed of basic objects is stored. The other part of the constitution is the same as that of FIG. 3.

Thus, provision of the data of basic objects from the CD-ROM 101 eliminates the time for transferring the data via the network 15, increasing processing speed.

Alternatively, the data of basic objects supplied from the information server terminal 11A may be stored in the storage device 50 only for the first time to be subsequently read for use.

Namely, as shown in FIG. 29, the basic object data can be stored in the storage device 30 of the information server terminal 11A (for the cases 1 through 3), the storage device 50 of the client terminal 13 (for the cases 4 through 6) or the CD-ROM 101 of the client terminal 13 (for the cases 7 through 9).

Figure 30:
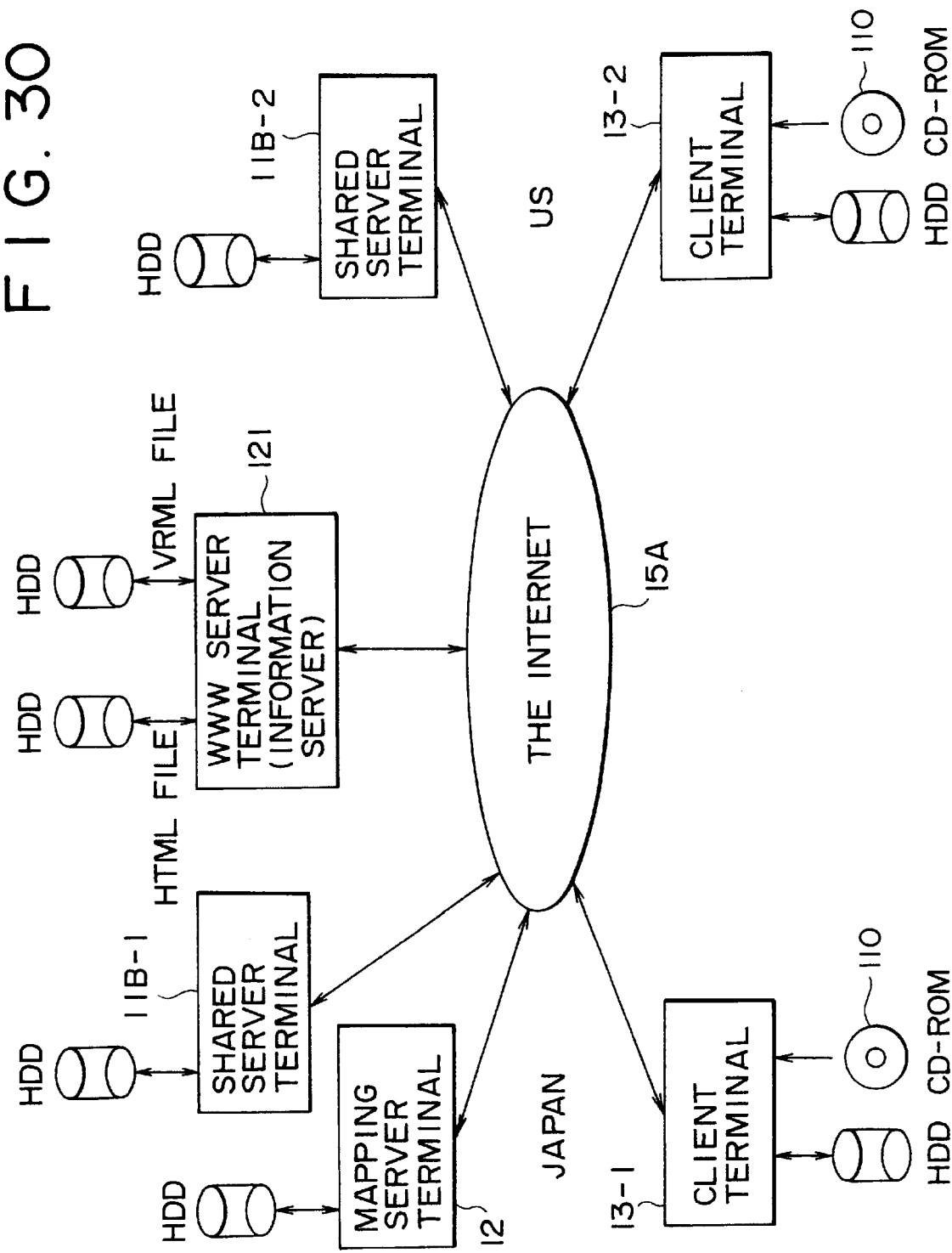
FIG. 30 is a diagram describing the arrangement of basic objects and update objects.

On the other hand, the update object data can be stored in the storage device 30 of the information server terminal 11A (for the case 1) or the storage device 30 of the shared server terminal 11B (for the cases 2 through 9). In the case in which the update object data are stored in the shared server terminal 11B, that shared server terminal may be the shared server terminal 11B-1 in Japan (for the case 2, 5 or 8) or the shared server terminal 11B-2 in the US (for the case 3, 6 or 9) as shown in FIG. 30 for example. In this instance, the URL of the update object data is stored on the mapping server terminal 12.

If the update object data are stored on the information server terminal 11A, the URL of the update object data is the default URL controlled by the information server terminal 11A (in the case of 1). Or if the shared server terminal 11B is specified by the user manually, the URL of update object data is the specified URL (in the case of 4 or 7).

Referring to FIG. 30, the data in each of the above-mentioned cases of FIG. 29 flows as follows. In the case 1, the basic object data are read from a VRML file (to be described later in detail) stored in an HDD (Hard Disk Drive), storage device of a WWW server terminal 121 operating as the information server terminal 11B to be supplied to the client terminal 13-1 for example via the Internet 15A operating as the network 15. The storage device of the WWW server terminal 121 also stores update object data. To be more specific, when the basic object data are read in the WWW server terminal 121, the URL of the corresponding update object data is stored as the default URL in the storage device of the WWW server terminal 121 in advance. From this default URL, the update object data are read to be supplied to the client terminal 13-1.

In the case 2, the basic object data are supplied from the WWW server terminal 121 to the client terminal 13-1 in Japan via the Internet 15A. On the other hand, the update object data are supplied from the shared server terminal 11B-1 in Japan specified by the mapping server terminal 12 to the client terminal 13-1 via the Internet 15A.

In the case 3, the basic object data are supplied from the WWW server terminal 121 to the client terminal 13-2 in the US via the Internet 15A. The update object data are supplied from the shared server terminal 11-2 in the US specified by the mapping server terminal 12 via the Internet 15A.

In the case 4, the basic object data are stored in advance in the storage device 50 of the client terminal 13-1 in Japan for example. The update object data are supplied from the shared server terminal 11-2 in the US for example specified by the client terminal 13-1.

In the case 5, the basic object data are stored in advance in the storage device 50 of the client terminal 13-1. The update object data are supplied from the shared server terminal 11B-1 in Japan specified by the mapping server terminal 12 via the Internet 15A.

In the case 6, the basic object data are stored in advance in the storage device 50 of the client terminal 13-2 in the US. The update object data are supplied from the shared server terminal 11-2 in the US specified by the mapping server terminal 12 to the client terminal 13-2 via the Internet 15A.

In the case 7, the basic object data stored in the CD-ROM 101 are supplied to the client terminal 13-1 in Japan for example via the CD-ROM drive 100. The update object data are supplied from the shared server terminal (for example, the shared server terminal 11-1 or 11-2) specified by the client terminal 13-1.

In the case 8, the basic object data are supplied from the CD-ROM 101 to the client terminal 13-1. The update object data are supplied from the shared server terminal 11B-1 in Japan specified by the mapping server terminal 12 in Japan.

In the case 9, the basic object data are supplied from the CD-ROM 101 to the client terminal 13-2 in the US. The update object data are supplied from the shared server terminal 11-2 in the US specified by the mapping server terminal 12 via the Internet 15A.

In what follows, the software for transferring the above-mentioned virtual reality space data to display the same on the display device. In the WWW system, document data are transferred in a file described in HTML (Hyper Text Markup Language). Therefore, text data are registered as an HTML file.

Figure 31:
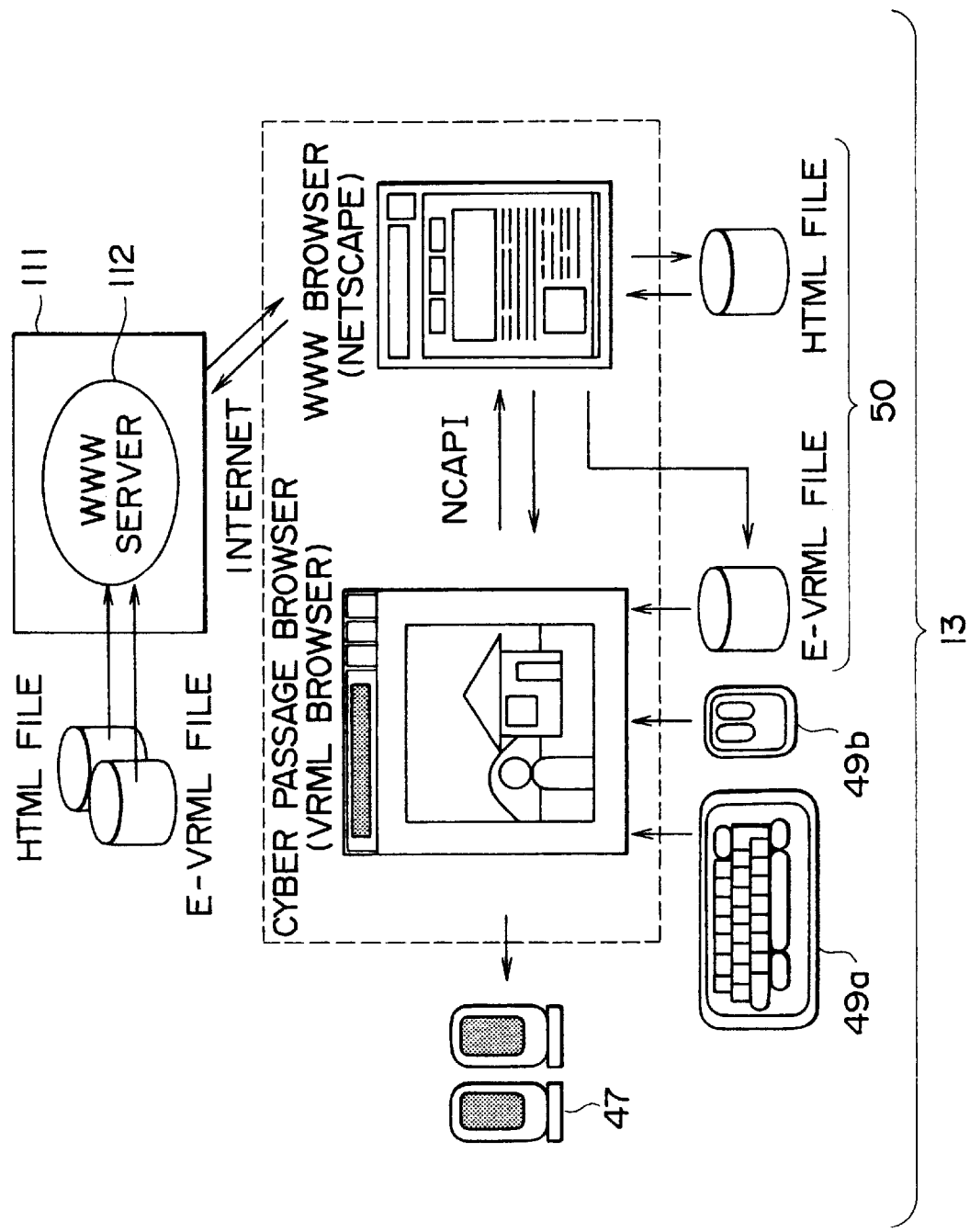
FIG. 31 is a diagram describing software for implementing the cyberspace system.

On the other hand, in the WWW system, three-dimensional graphics data are transferred for use by describing the same in VRML (Virtual Reality Modeling Language) or E-VRML (Enhanced Virtual Reality Modeling Language). Therefore, as shown in FIG. 31 for example, a WWW server terminal 112 of remote host 111 constituting the above-mentioned information server terminal 11A, the shared server terminal 11B or the mapping server terminal 12 stores in its storage device both HTML and E-VRML files.

In an HTML file, linking between different files is performed by URL. In a VRML or E-VRML file, such attributes as WWWAnchor and WWWInline can be specified for objects. WWWAnchor is an attribute for linking a hyper text to an object, a file of link destination being specified by URL. WWWInline is an attribute for describing an external view of a building for example in parts of external wall, roof, window, and door for example. An URL can be related to each of the parts. Thus, also in VRML or E-VRML files, link can be established with other files by means of WWWAnchor or WWWInline.

For application software (a WWW browser) for notifying a WWW server terminal of a URL entered in a client terminal in the WWW system to interpret and display an HTML file coming from the WWW server terminal, Netscape Navigator (register trade name) (hereafter referred to simply as Netscape) of Netscape Communications, Inc. is known. For example, the client terminal 13 also uses Netscape to user the capability for transferring data with the WWW server terminal.

It should be noted, however, that this WWW browser can interpret an HTML file and display the same; but this WWW browser cannot interpret and display a VRML or E-VRML file although it can receive these files. Therefore, a VRML browser is required which can interpret a VRML file and an E-VRML file and draw and display them as a three-dimensional space.

Details of VRML are disclosed in the Japanese translation of "VRML: Browsing & Building Cyberspace," Mark Pesce, 1995, New Readers Publishing, ISBN 1-56205-498-

8, the translation being entitled "Getting to Know VRML: Building and Browsing Three-Dimensional Cyberspace," translated by Kouichi Matsuda, Terunao Gamaike, Shouichi Takeuchi, Yasuaki Honda, Junichi Rekimoto, Masayuki Ishikawa, Takeshi Miyashita and Kazuhiro Hara, published Mar. 25, 1996, Prenticehall Publishing, ISBN4-931356-37-0.

The applicant hereof developed CyberPassage (trademark) as application software that includes this VRML browser.

CyberPassage is composed of the following three software programs:

(1) CyberPassage Browser

This is a VRML browser which is based on VRML 1.0 and prefetches the capabilities (motion and sound) of VRML 2.0 to support E-VRML that provides moving picture capability. In addition, this provides the multi-user capability which can be connected to CyberPassage Bureau. For the script language, TCL/TK is used.

(2) CyberPassage Conductor

This is a VRML authoring system which is based on E-VRML based on VRML 1.0. This tool can not only simply construct a three-dimensional world but also give a behavior, a sound, and an image to the three-dimensional world with ease.

(3) CyberPassage Bureau

This is used for a server terminal system for enabling people to meet each other in a virtual reality space constructed on a network, connected from the CyberPassage Browser.

Figure 32:
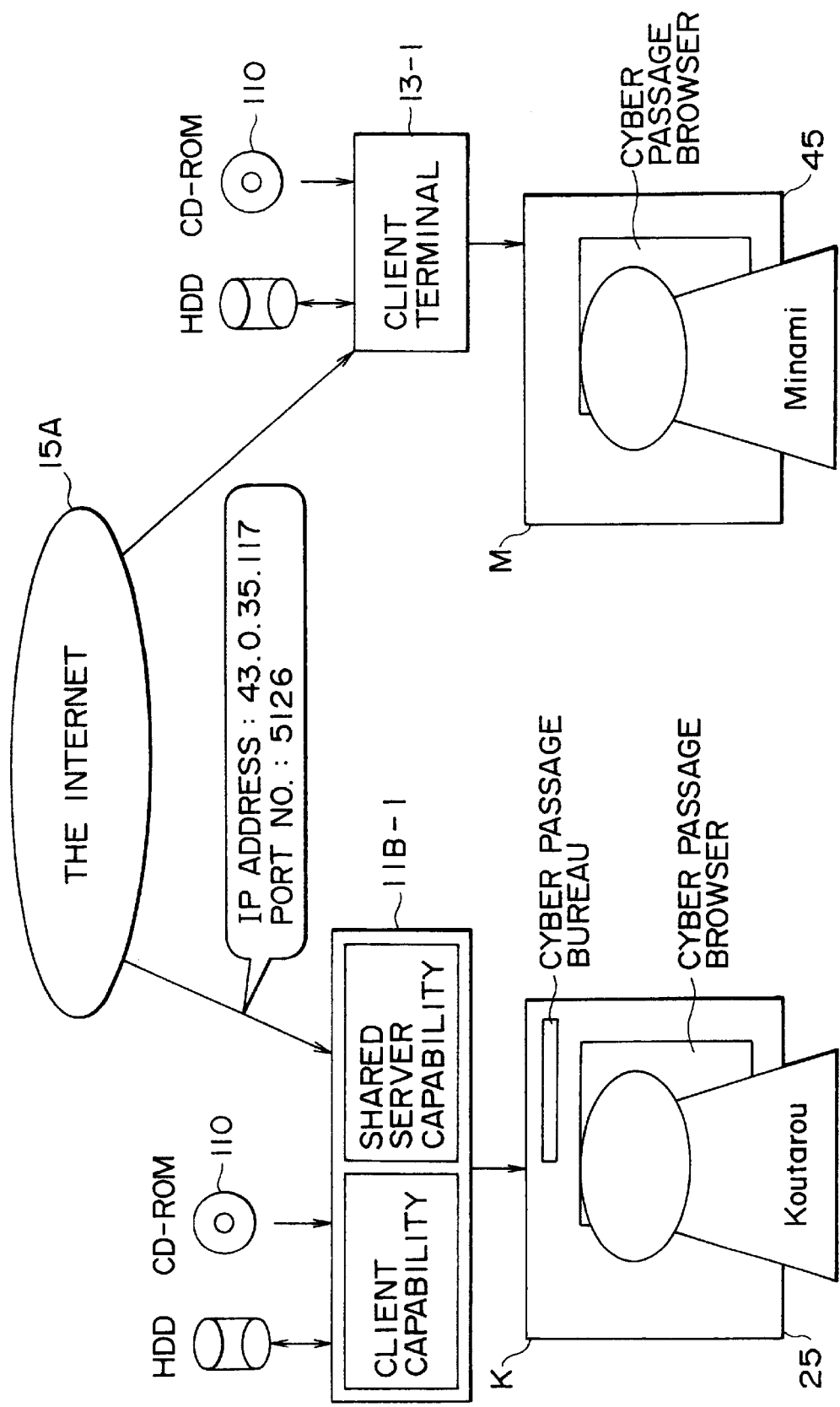
FIG. 32 is a diagram describing software operating on the client terminal 13-1 and the shared server terminal 11B-1.

In the client terminals 13-1 and 13-2 shown in FIG. 30, CyberPassage Browser is installed in advance and executed. In the shared server terminals 11B-1 and 11B-2, CyberPassage Bureau is installed in advance and executed. FIG. 32 shows an example in which CyberPassage Browser is installed from the CD-ROM 101 and executed on the client terminal 13-1 and, in order to implement the shared server terminal capability and the client terminal capability on a single terminal, CyberPassage Bureau and CyberPassage Browser are installed from the CD-ROM 101 in advance and executed.

As shown in FIG. 31, CyberPassage Browser transfers a variety of data with Netscape as a WWW browser based on NCAPI (Netscape Client Application Programming Interface) (trademark).

Receiving an HTML file and a VRML file or E-VRML file from the WWW server terminal 112 via the Internet, Netscape stores the received files in the storage device 50. Netscape processes only the HTML file. The VRML or E-VRML file is processed by CyberPassage Browser.

E-VRML is an enhancement of VRML 1.0 by providing behavior and multimedia (sound and moving picture) and was proposed to the VRML Community, September 1995, as the first achievement of the applicant hereof. The basic model (event model) for describing motions as used in E-VRML is inherited to the Moving Worlds proposal, one the current VRML 2.0 proposals.

In what follows, CyberPassage Browser will be outlined. A sample of this browser is provided in the CD-ROM furnished to the Japanese translation of "VRML: Browsing & Building Cyberspace," Mark Pesce, 1995, New Readers Publishing. After installing this browser, selecting "Manual" from "CyberPassage Folder" of "Program" of the start menu of Windows 95 (trademark) (or in Windows NT (trademark), the Program Manager) displays the instruction manual of the browser.

Operating Environment of CyberPassage Browser:

The operating environment of CyberPassage Browser is as shown in FIG. 33. The minimum operating environment must be at least satisfied. However, Netscape Navigator need not be used if CyberPassage Browser is used as a standalone VRML browser. In particular, on using in the multi-user, it is desirable the recommended operating environment.

Installing CyberPassage Browser:

CyberPassage Browser can be usually installed in the same way as Netscape is installed. To be more specific, vscplb3a.exe placed in the \Sony (trademark) directory of the furnished CD-ROM is used as follows for installation.

(1) Double-click vscplb3a.exe. The installation package is decompressed into the directory indicated by "Unzip To Directory" column. The destination directory may be changed as required.

(2) Click "Unzip" button. And the installation package is decompressed.

(3) "12 files unzipped successfully" appears. Click "OK" button.

(4) When "Welcome" window appeared, click "NEXT" button.

(5) Carefully read "Software License Agreement". If agreed, press "Yes" button; if not, press "No" button.

(6) Check the directory of installation. Default is "Program Files Sony\CyberPassage".

(7) If use of the above-mentioned directory is not wanted, press "Browse" button and select another directory. Then, press "Next" button.

(8) To read "readme" file here, click "Yes" button.

(9) When the installation has been completed, click "OK" button.

Starting CyberPassage Browser:

Before starting CyberPassage Browser, setting of Netscape Navigator must be performed. If CyberPassage Browser is used standalone, this setting need not be performed; just select "CyberPassage Folder . . . CyberPassage" of "Program" of the start menu and start. The following setting may be automatically performed at installation.

(1) From "Options" menu of Netscape Navigator, execute "General Preference" and open "Preference" window. From the upper tab, select "Helper Applications".

(2) Check "File type" column for "x-world/x-vrml". If it is found, go to (4) below.

(3) Click "Create New Type" button. Enter "x-world" in "Mime Type" column and "x-vrml" in "Mime SubType" column. Click "OK" button. Enter "wrl" in "Extensions" column.

(4) Click "Launch the Application:" button. Enter the path name of CyberPassage Browser in the text column below this button. Default is "\Program Files\Sony\CyberPassage\bin\vscp.exe".

(5) Click "OK" button.

Thus, the setting of Netscape Navigator has been completed. Start CyberPassage Browser as follows:

(1) In "File..Open File" menu of Netscape, read "readme.htm" of the sample CD-ROM.

(2) Click the link to the sample world, and CyberPassage is automatically started, loading the sample world from the CD-ROM.

Uninstalling CyberPassage Browser:

Execute "Uninstall" from "CyberPassage Folder" of "Program" of the start menu (or in Windows NT, the Program Manager), and CyberPassage Browser will be uninstalled automatically.

Operating CyberPassage Browser:

CyberPassage Browser may be operated intuitively with the mouse 49b, the keyboard 49a, and the buttons on screen.

Moving around in the three-dimensional space:

In the three-dimensional space provided by VRML, such movements done in real world as forward, backward, rotate right and rotate left for example can be done. CyberPassage Browser implements such movements through the following interface:

By keyboard:

Each of the arrow keys, not shown, on the keyboard 49a generates the following corresponding movement:

rotate right;

rotate left;

move forward; and move backward.

By mouse:

Operate the mouse all with its left button.

(1) Keep the left button of the mouse 49b pressed in the window of CyberPassage and move the mouse:

to the right for rotate right;

to the left for rotate left;

up for forward; and down for backward.

The velocity of movement depends on the displacement of the mouse.

(2) With the Ctrl (Control) key, not shown, on the keyboard 49a, kept pressed, click an object on screen to get to the front of the clicked object.

The following precautions are required:

If a collision with an object occurs, a collision sound is generated and the frame of the screen blinks in red. If this happens, any forward movement is blocked. Moving directions must be changed.

If the user is lost or cannot see anything in the space, click "Home" button on the right of screen, and the user can return to the home position.

Jumping eye:

While navigating through a three-dimensional space, the user may be lost at occasions. If this happens, the user can jump up to have an overhead view around.

(1) Click "Jump" button on the right of screen, and the user enters the jumping eye mode and jumps to a position from which the user can look down the world.

(2) Click "Jump" button again, and the user goes down to the original position.

(3) Alternatively, click any place in the world, and the user gets down to the clicked position.

Selecting an object:

When the mouse cursor is moved around on the screen, the shape of the cursor is transformed into a grabber (hand) on an object. In this state, click the left button of the mouse, and the action of the grabbed object can be called.

Loading a VRML file:

A VRML file can be loaded as follows:

In Netscape, click the link to the VRML file;

From "File..Open File" menu of CyberPassage, select the file having extension "wrl" on disc.

In "File..Open URL" menu of CyberPassage, enter the URL.

Click the object in the virtual space for which "URL" is displayed on the mouse cursor.

Operating toolbar buttons:

Buttons in the toolbar shown in FIG. 37 for example may be used to execute frequently used functions.

| | |
|---|---|
| "Back" | Go back to the world read last. |
| "Forward" | Go to the world after going back to the previous world. |
| "Home" | Move to the home position. |
| "Undo" | Return a moved object to the original position (to be described later). |
| "Bookmark" | Attach a bookmark to the current world or position. |
| "Scouter" | Enter in the scouter mode (to be described later). |
| "Jump" | Enter in the jump eye mode. |

Scouter mode:

Each object placed in a virtual world may have a character string as information by using the E-VRML capability.

(1) Click "Scouter" button on the right of screen, and the user enters the scouter mode.

(2) When the mouse cursor moves onto an object having an information label, the information label is displayed.

(3) Click "Scouter" button again, and the user exits the scouter mode.

Moving an object around:

With "Alt" (Alternate) key, not shown, on the keyboard 49a pressed, press the left button of the mouse 49b on a desired object, and the user can move that object to a desired position with the mouse. This is like moving a coffee cup for example on a desk with the hand in the real world. In the virtual reality, however, objects that can be moved are those having movable attributes. In the sample world, objects may be moved by Digital HandyCam and the like. It should be noted that a moved object may be restored to the position before movement only once by using "Undo" button.

Connecting to a multi-user server terminal:

CyberPassage Browser provides a multi-user capability. The multi-user capability allows the sharing of a same VRML virtual space among a plurality of users. Currently, the applicant hereof is operating CyberPassage Bureau in the Internet on an experimental basis. By loading "Chat Room", the server terminal can be connected to share a same VRML virtual space with other users, walking together, turning off a room light, having a chat, and doing other activities for example.

This capability is started as follows:

(1) Make sure that the user's personal computer is linked to the Internet.

(2) Load the "Chatroom" of the sample world into CyberPassage Browser. This is done by loading "\Sony\readme.htm" from the sample CD-ROM clicking "Chat Room".

(3) Appearance of "Connected to VS Server" in the message window indicates successful connection.

Thus, the connection to the server has been completed. Interaction with other users is of the following two types:

(a) Notifying others of an action:

This is implemented by clicking any of "Hello", "Smile", "Wao!", "Wooo!!", "Umm . . . ", "Sad", "Bye" and so on in the "Action" window (refer to FIG. 39). The actions include rotating the user himself (avatar) right or left 36 degrees, 180 degrees or 360 degrees.

(b) Talking with others:

This capability is implemented by opening the "Chat" window (refer to FIG. 39) in "View..Chat" menu and entering a message from the keyboard 49a into the bottom input column.

Multi-user worlds:

The following three multi-user worlds are provided by the sample CD-ROM. It should be noted that a chat can be made throughout these three worlds commonly.

(1) Chat Room

This is a room in which chat is made mainly. Some objects in this room are shared among multiple users. There are objects which are made gradually transparent every time the left button of the mouse is pressed, used to turn off room lights, and hop up when clicked, by way of example. Also, there are hidden holes and the like.

(2) Play with a ball!!

When a ball in the air is clicked, the ball flies toward the user who clicked the ball. This ball is shared by all users sharing that space to play catch.

(3) Share your drawing

A whiteboard is placed in the virtual space. When it is clicked by the left button, the shared whiteboard is displayed. Dragging with the left button draws a shape on the whiteboard, the result being shared by the users sharing the space.

In addition to CyberPassage Browser, the sample CD-ROM stores CyberPassage Conductor and some sample VRML files. CyberPassage Bureau is not stored in this CD-ROM, however. It can be downloaded via the Internet 15A from Home Page URL=http://vs.sony.co.jp/ provided by the company at which the applicant hereof works. The company also offers, via the Internet, the multi-user world URL=http://japan.park.org/japan/Sony/3DWorld/Circus/.

Use of CyberPassage Bureau allows the users using CyberPassage Browser to enter together a world described in VRML 1.0. To provide a three-dimensional virtual reality space for enabling this capability, a file described in VRML 1.0 must be prepared. Then, CyberPassage Bureau (hereinafter appropriately referred to simply as the bureau) is operated on an appropriate personal computer. Further, a line telling the personal computer on which Bureau is operating is added to the VRML 1.0 file. The resultant VRML file is read into CyberPassage Browser (hereinafter appropriately referred to simply as the browser), the browser is connected to the bureau.

If this connection is successful, the users in the virtual world can see each other and talk each other. Further, writing an appropriate script into the file allows each user to express emotions through a use of action panel.

CyberPassage Browser provides interface for action description through use of TCL. This interface allows each user to provide behaviors to objects in the virtual world and, if desired, make the resultant objects synchronize between browsers. This allows a plurality of users to play a three-dimensional game if means for it are prepared.

To enjoy a multi-user virtual world, three steps are required; preparation of a VRML file, start of CyberPassage Bureau, and connection of CyberPassage Browser.

Preparing a VRML file:

First, a desired VRML. 1.0 file must be prepared. This file is created by oneself or a so-called freeware is used for this file. This file presents a multi-user virtual world.

Starting CyberPassage Bureau:

The operating environment of CyberPassage Bureau is as follows:

| CPU | 486SX or higher |
|---|---|
| OS | Window 95 |
| Memory | 12 M or higher |

Figure 34:
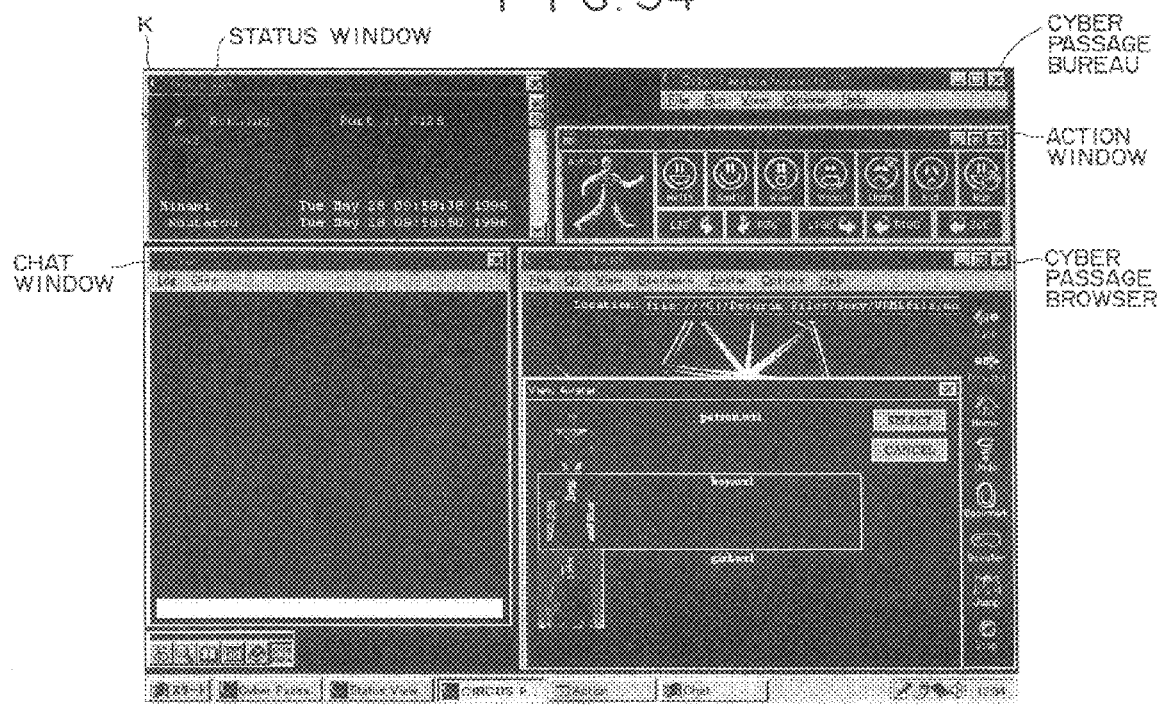
FIG. 34 is a diagram illustrating a display example on the shared server terminal 11B-1 of FIG. 32.

CyberPassage Bureau can be started only by executing the downloaded file. When this CyberPassage Bureau is executed, only a menu bar indicating menus is displayed as shown in FIG. 34. Just after starting, CyberPassage Bureau is in stopped state. Selecting "status" by pulling down "View" menu displays the status window that indicates the current CyberPassage Bureau state. At the same time, a port number waiting for connection is also shown.

Immediately after starting, CyberPassage Bureau is set such that it waits for connection at TCP port No. 5126. To change this port number, pull down "options" menu and select "port". When entry of a new port number is prompted, enter a port number 5000 or higher. If the user does not know which port number to enter, default value (5126) can be used.

To start CyberPassage Bureau from the stopped state, pull down "run" menu and select "start". The server terminal comes to be connected at the specified port. At this moment, the state shown in "status" window becomes "running" as shown in FIG. 34.

Thus, after completion of the bureau preparations, when CyberPassage Browser comes to connect to CyberPassage Bureau, it tells the position of the browser to another browser or transfers information such as conversation and behavior.

The "status" window of CyberPassage Bureau is updated every time connection is made by the user, so that using this window allows the user to make sure of the users existing in that virtual world.

Connection of CyberPassage Browser:

Connection of the CyberPassage Browser requires the following two steps. First, instruct CyberPassage Browser to which bureau it is to be connected. This is done by writing an "info" node to the VRML file. Second, copy the user's avatar file to an appropriate direction so that the user can be seen from the other users.

Adding to a VRML file:

When writing a line specifying the bureau to be connected to the VRML file, a name of the personal computer on which the bureau is operating and the port number must be specified in the following format:

DEF VsServer Into {string"server name:port number"}

The server terminal name is a machine name as used in the Internet on which the bureau is operating (for example, fred.research.sony.com) or its IP address (for example, 123.231.12.1). The port number is one set in the bureau.

Consequently, the above-mentioned format becomes as follows for example:

DEF VsServer Info {string"fred.research.sony.com:5126"}

In the example of FIG. 32, the IP address of the shared server terminal 11-1 is 43.0.35.117, so that the above-mentioned format becomes as follows:

DEF VsServer Info {string"43.0.35.117:5126"}

This is added below the line shown below of the prepared VRML file:

VRML V1.0 ascii

Copying an avatar file:

When CyberPassage Browser gets connected to Cyber-Passage Bureau, the former notifies the latter of its avatar. When a specific avatar meets another, the bureau notifies the other browsers of the meeting information to make the specific avatar be displayed on the other browsers. For this reason, it is required to copy the VRML file of the specific avatar to an appropriate place in advance.

FIG. 34 shows an example of display for selecting an avatar. In this example, a desired avatar can be selected as own avatar from "person.wrl", "boy.wrl" or "girl.wrl".

When the selected avatar file is copied to the same directory in which own VRML file is stored, the browser searches the directory for the "{person,boy,girl}.wrl" file as the avatar file when the browser loads the VRML file.

Thus, to share a specific VRML file, CyberPassage Bureau may only be operated, the VsServer Info node be added to the VRML file, and "{person.boy.girl}wrl" be copied to the same file in which the VRML file is stored. Then, when the VRML file is set up such that the same can be loaded from other users, any user who reads the file through CyberPassage gets connected to the bureau.

Figure 35:
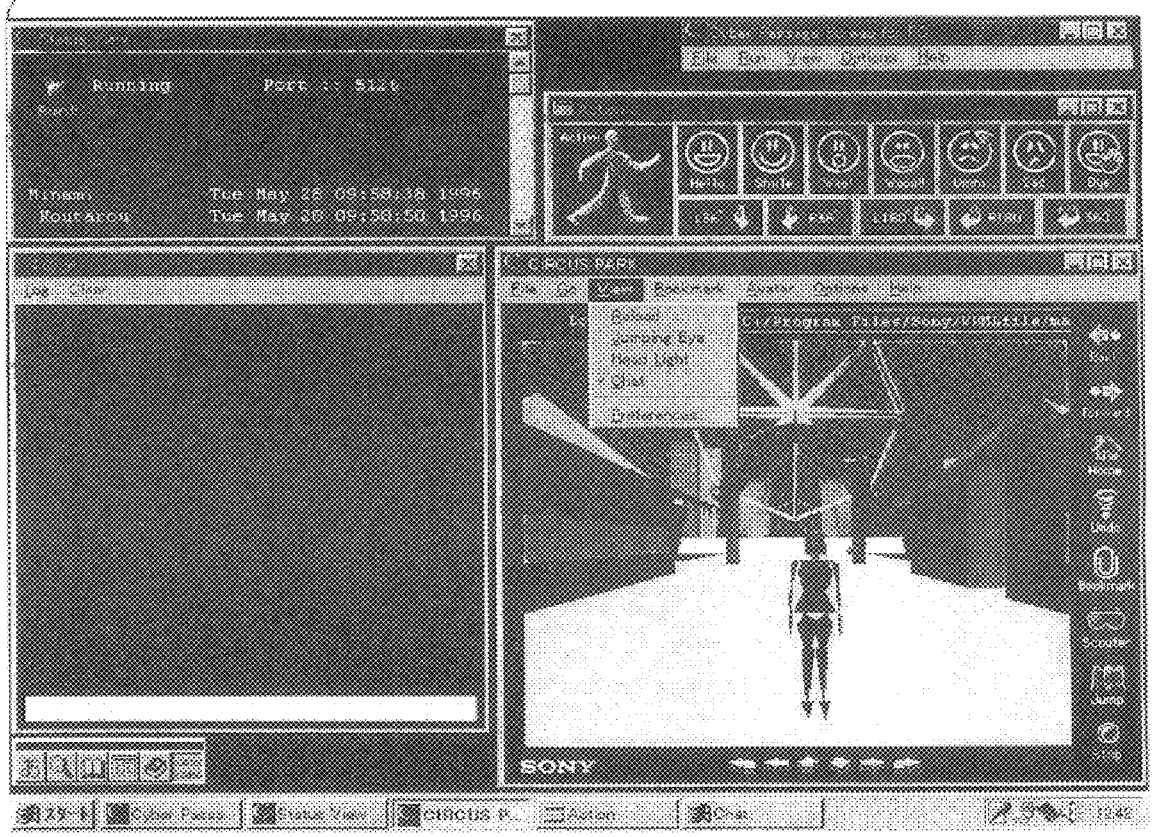
FIG. 35 is a diagram illustrating another display example on the shared server terminal 11B-1 of FIG. 32.

As shown in FIG. 32, it is assumed that the shared server terminal 11B-1 uses an avatar nicknamed Koutarou and the client terminal 13-1 uses an avatar nicknamed Minami to walk through one of the multi-user worlds, CIRCUS PARK. In doing so, the shared server terminal 11B-1 selects a male avatar "boy.wrl" as shown in FIG. 34 for example. As shown in FIG. 35, when "View" menu is pulled down and "Preferences" is selected, a screen as shown in FIG. 36 is displayed. On this screen, the user specifies "Koutarou" as the name (Nick Name) of the avatar selected in FIG. 34.

Figure 38:
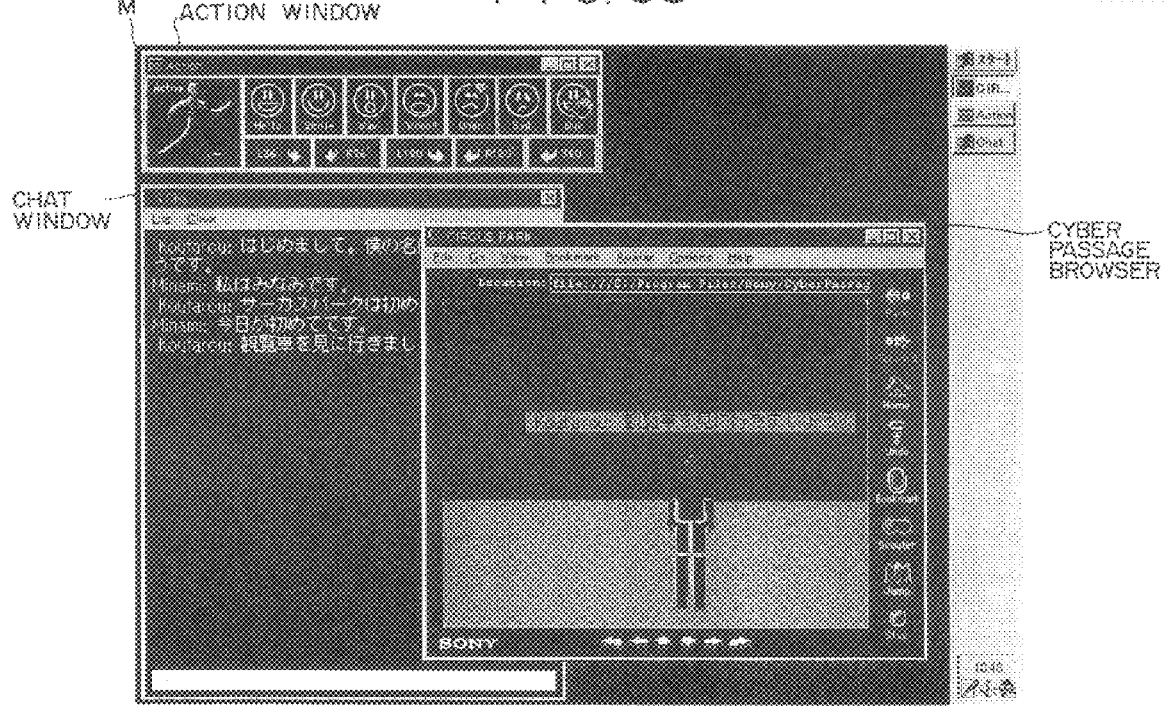
FIG. 38.is a diagram illustrating a display example on the client terminal 13-1 of FIG. 32.

Likewise, the user of the client terminal 13-1 selects "girl.wrl" as own avatar for example, specifies "Minami" as its nickname, and enters CIRCUS PARK. When avatar Koutarou of the shared server terminal 11B-1 and avatar Minami of the client terminal 13-1 move to positions close enough to each other, avatar Minami is displayed on the display device 25 of the shared server terminal 11B-1 as shown in FIG. 35. Likewise, avatar Koutarou is displayed on the display device 45 of the client terminal 13-1 as shown in FIG. 38 to be described later.

It should be noted that, in FIGS. 32 and 34 through 37, "K" is assigned to the display screen of the display device 25 that avatar Koutarou sees and "M" is assigned to the display screen of the display device 45 that avatar Minami sees.

As shown in the figures, each display device displays only the three-dimensional virtual reality space (including the image of the other avatar) as viewed from own avatar, and own avatar itself is not displayed.

Thus, when a plurality of avatars approach each other close enough in a specific space (namely, when own avatar is displayed on the display device of the other user's display device), a chat can be performed by selecting "Chat" from "View" menu shown in FIG. 37 for example. FIG. 37 shows an example of display on the display device 25 of the shared server terminal 11B-1 when avatars Koutarou and Minami are having a chat.

As shown in FIG. 37, the messages entered so far from the keyboards of the terminals concerned are shown in the "Chat" window. Characters entered by the user are once displayed in the display area at the bottom of the "Chat" window; when the Enter key, not shown, of the keyboard 49a is pressed, the entered message (character string) is transmitted to the other user. For example, when message "Yes, it's my first visit today" has come from avatar Minami (the client terminal 13-1) to the shared server terminal 11B-1, this message is displayed in a balloon above avatar Minami in the CyberPassage Bureau window on the display device 25 of the shared server terminal 11B-1 and, at the same time, displayed in the "Chat" windows after the past messages.

FIG. 38 shows an example of display on the display device 45 of the client terminal 13-1 when message "Let's go see the merry-go-round" has been entered from the shared server terminal 11B-1. In this case, too, the message is displayed in a balloon above avatar Koutarou in the "CIRCUS PARK" window and, at the same time, displayed in the "Chat" window after the past messages.

An example of display of FIG. 39 shows the case in which "Hello" button has been pressed on the client terminal 13-1. At this time, as shown in FIG. 39, an image in which avatar Minami raises its right hand is displayed on the shared server terminal 11B-1 and, at the same time, voice message "Hello" is heard from the speaker 27.

Figure 40:
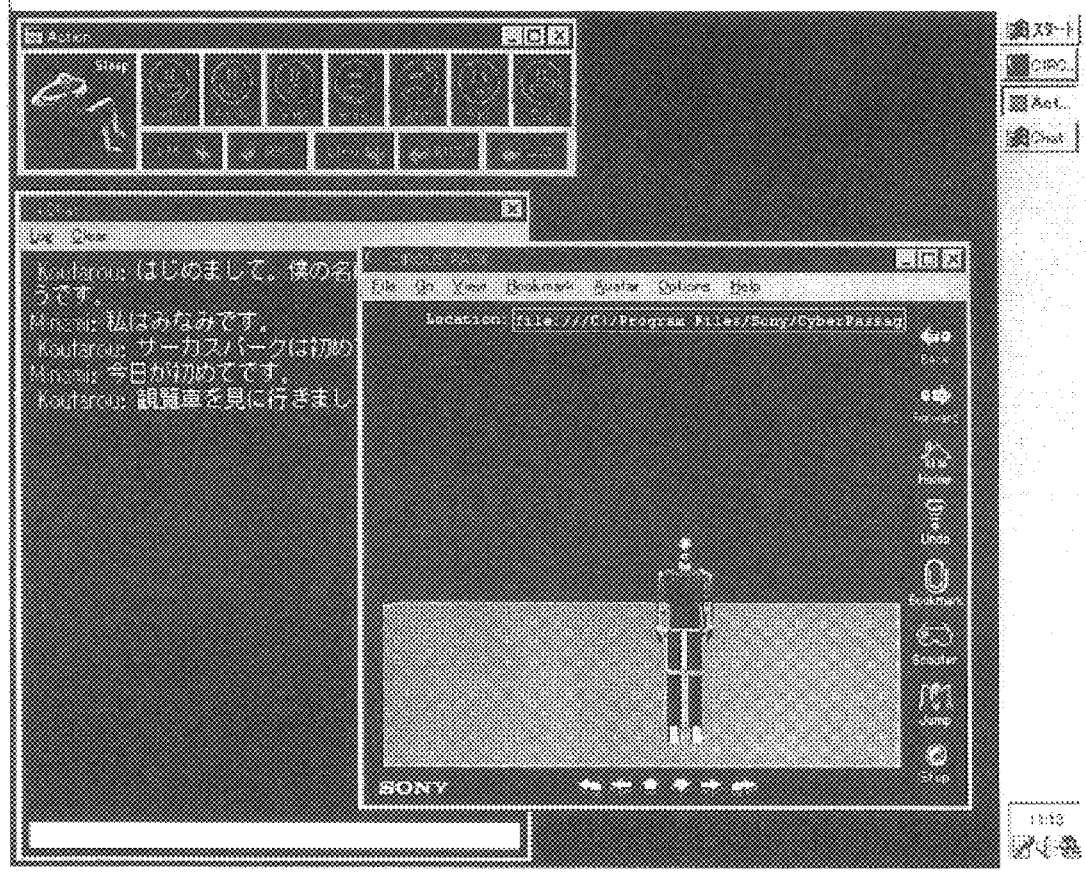
FIG. 40 is a diagram illustrating a display example on the client terminal 13-1 of FIG. 32.
Figure 41:
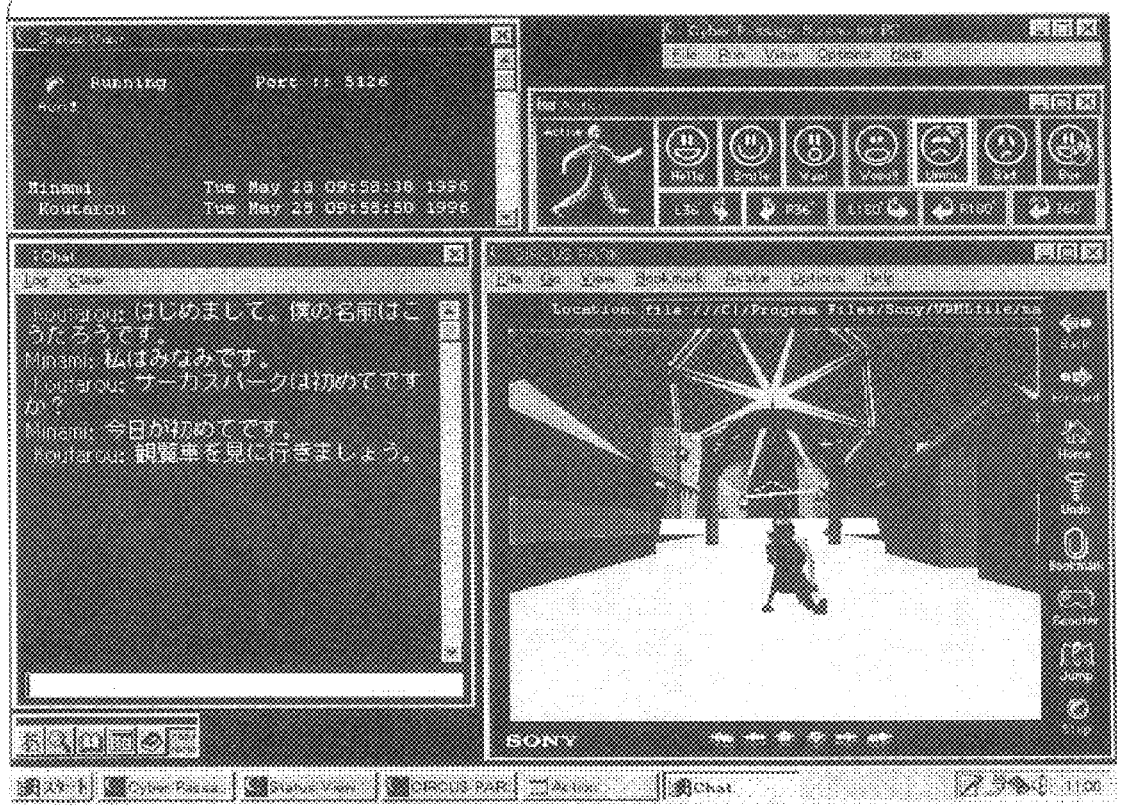
FIG. 41 is a diagram illustrating another display example on the shared server terminal 11B-1 of FIG. 32.
Figure 42:
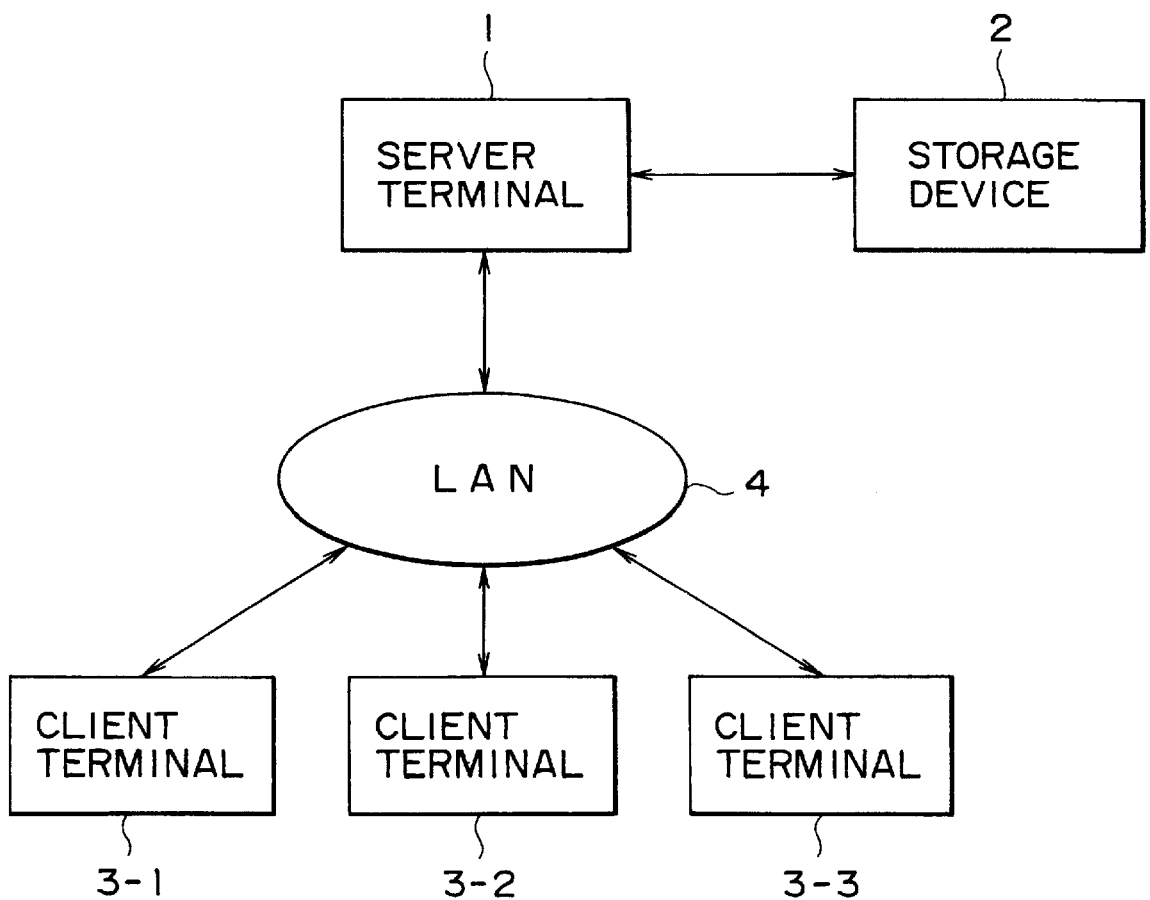
FIG. 42 is block diagram illustrating an example of the constitution of a cyberspace system build via the related art LAN.
Figure 43A:
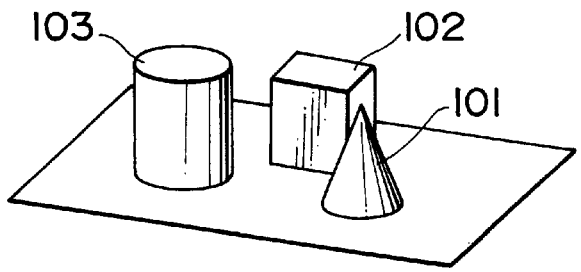
FIG. 43 A is a diagram illustrating a display example in the cyberspace system built via the related art LAN.
Figure 43B:
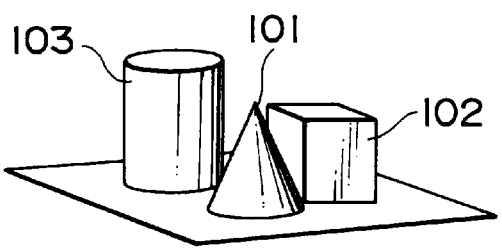
Figure 43C:
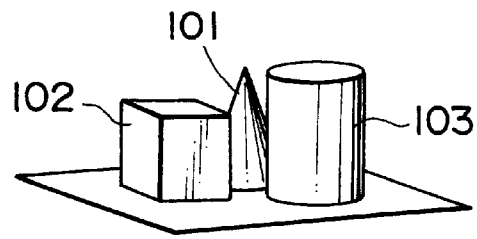

When the user leaves his terminal, his avatar may be put in the sleep state. For example, to put avatar Minami in the sleep state, "Active" button, one of the action buttons in the action windows shown in FIG. 38, is clicked on the client terminal 13-1 to change the shape of this button to "Sleep" button as shown in FIG. 40. Avatar Minami enters the sleep state. In the sleep state, avatar Minami displayed on the displayed device 25 of the shared server terminal 11B-1 is sitting on the ground as shown in FIG. 41. The user of the shared server terminal 11B-1 can know from this state (namely, the user avatar Minami has left the client terminal 13-1) that avatar Minami is in the sleep state. When "Sleep" button is clicked in the sleep state, the button returns to "Active" button again.

Thus, the users can enjoy themselves walking through the Circus Park as a three-dimensional virtual reality space.

The present invention is applied to embody the parade, the movement of avatars, and avatar behaviors by the action window buttons implemented in the above-mentioned Circus Park.

The present invention has been described by taking for example the case in which the Internet is used for the network 15 and the WWW system is used. It will be apparent to those skilled in the art that a global communications network other than the Internet may be used for the network 15 and a communications system other than the WWW system may be used to achieve the above-mentioned objects of the invention.

As described above, according to the present invention, in the three-dimensional virtual reality sharing method, the system, the information recording medium, the information recording method, the information transmission medium, and the information transmission method, the change sequence of the plurality of sub objects corresponding to the updated content of the state of the update object is stored in each client terminal and the changes sequences on the plurality of client terminals are started in synchronization. The above-mentioned novel setup allows the behaviors of an object having a complex shape composed of a plurality of sub objects to be shared in the same three-dimensional virtual reality space on the plurality of client terminals, thereby significantly enhancing the display speed of images.

Further, according to the present invention, in the information processing method, the client terminal, the information recording medium, the information recording method, the information transmission medium, and the information transmission method, the change sequence of the plurality of sub objects corresponding to the update content of the state of the update object is stored in a client terminal and started in synchronization with the change sequences stored in other client terminals. The above-mentioned novel setup implements a client terminal that can share the same three-dimensional virtual reality space with other client terminals.

Further, according to the present invention, in the information processing method, the server terminal, the information recording medium, the information recording method, the information transmission medium, and the information transmission method, if a message indicating update of the state of the update object is entered from a specific client terminal via the global communication network, this message is transmitted to other client terminals via the global communication network and, in synchronization with the change sequence of the plurality of sub objects in the specific client terminal, the change sequences of the plurality of sub objects in the other client terminals are started. The above-mentioned novel setup allows implements a server terminal that can provide the same three-dimensional virtual reality space to the plurality of client terminals.

While the preferred embodiments of the present invention have been described using specific terms, such description is for illustrative purposes only, and it is to be understood that changes and variations may be made without departing from the spirit or scope of the appended claims.

What is claimed is:

1. A method of sharing a three-dimensional virtual reality space, comprising the steps of:
   connecting a plurality of client terminals for displaying a three dimensional virtual reality space including an update object formed of at least two sub objects located in a predefined relationship with respect to each other and each having a state independently subject to change by a shared server terminal for controlling the state of the update object on each of the plurality of client terminals via a communication network;
   registering in each of the plurality of client terminals a change sequence table for defining a relationship between a sequence of changing the state of each of the plurality of sub objects according to a change to the state of the update object and a message for specifying a type of the change sequence;
   simultaneously notifying each of the plurality of client terminals of the message corresponding to the updated content of the state of the update object from the shared server terminal when the state of the update object controlled by the shared server terminal is updated; and
   synchronously changing on each of the plurality of client terminals the state of each of the plurality of sub objects based on the change sequence specified by the message to reflect the change in the displayed three-dimensional virtual reality space.

2. The method of claim 1 further including the step of each of the plurality of client terminals notifying the shared server terminal of the message corresponding to the updated content if the state of the update object is updated according to an operation performed by a user of each of the plurality of client terminals.

3. The method of claim 2 wherein the notifying step includes the step of updating the content of the state of update object modes including displacement and rotation.

4. The method of claim 3 wherein the changing step includes the step of providing a combination of operations of the plurality of sub objects corresponding to the message.

5. The method of claim 4 further including the step of the server terminal notifying each of the plurality of client terminals of the message corresponding to the updated content of the update object in a predetermined timing.

6. The method of claim 5 further including the step of the communication network transferring the message between the plurality of client terminals and the shared server terminal based on a communication protocol, Transmission Control Protocol/Internet Protocol (TCP/IP).

7. The method of claim 6 further including the step of writing three-dimensional graphics data for representing the update object in Virtual Reality Modeling Language (VRML).

8. The method of claim 3 wherein the changing steps includes the steps of changing at least one of: a direction of displacement, a velocity of displacement, a period of displacement, and a distance of displacement, and changing at least one of: a direction of rotation, a velocity of rotation, a period of rotation and a distance of rotation, of each of the plurality of sub objects.

9. The method of claim 8 further including the step of the server terminal notifying each of the plurality of client terminals of the message corresponding to the updated content of the update object in a predetermined timing.

10. The method of claim 9 further including the step of the communication network transferring the message between the plurality of client terminals and the shared server terminal based on a communication protocol, Transmission Control Protocol/Internet Protocol (TCP/IP).

11. The method of claim 10 further including the step of writing three-dimensional graphics data for representing the update object in Virtual Reality Modeling Language (VRML).

12. The method of claim 1, wherein the notifying step includes the step of updating the content of the state of update object modes including displacement and rotation.

13. The method of claim 12 wherein the changing step includes the step of providing a combination of operations of the plurality of sub objects corresponding to the message.

14. The method of claim 13 further including the step of the server terminal notifying each of the plurality of client terminals of the message corresponding to the updated content of the update object in a predetermined timing.

15. The method of claim 14 further including the step of the communication network transferring the message between the plurality of client terminals and the shared server terminal based on a communication protocol, Transmission Control Protocol/Internet Protocol (TCP/IP).

16. The method of claim 15 further including the step of writing three-dimensional graphics data for representing the update object in Virtual Reality Modeling Language (VRML).

17. The method of claim 12 wherein the changing steps includes the steps of changing at least one of a direction of displacement, a velocity of displacement, a period of displacement, and a distance of displacement, and changing at least one of: a direction of rotation, a velocity of rotation, a period of rotation and a distance of rotation, of each of the plurality of sub objects.

18. The method of claim 17 further including the step of the server terminal notifying each of the plurality of client terminals of the message corresponding to the updated content of the update object in a predetermined timing.

19. The method of claim 18 further including the step of the communication network transferring the message between the plurality of client terminals and the shared server terminal based on a communication protocol, Transmission Control Protocol/Internet Protocol (TCP/IP).

20. The method of claim 19 further including the step of writing three-dimensional graphics data for representing the update object in Virtual Reality Modeling Language (VRML).

21. The method of claim 1, wherein the changing step includes the step of providing a combination of operations of the plurality of sub objects corresponding to the message.

22. The method of claim 21 further including the step of the server terminal notifying each of the plurality of client terminals of the message corresponding to the updated content of the update object in a predetermined timing.

23. The method of claim 22 further including the step of the communication network transferring the message between the plurality of client terminals and the shared server terminal based on a communication protocol, Transmission Control Protocol/Internet Protocol (TCP/IP).

24. The method of claim 23 further including the step of writing three-dimensional graphics data for representing the update object in Virtual Reality Modeling Language (VRML).

25. The method of claim 1, wherein the changing steps includes the steps of changing at least one of: a direction of displacement, a velocity of displacement, a period of displacement, and a distance of displacement, and changing at least one of: a direction of rotation, a velocity of rotation, a period of rotation and a distance of rotation, of each of the plurality of sub objects.

26. The method of claim 25 further including the step of the server terminal notifying each of the plurality of client terminals of the message corresponding to the updated content of the update object in a predetermined timing.

27. The method of claim 26 further including the step of the communication network transferring the message between the plurality of client terminals and the shared server terminal based on a communication protocol, Transmission Control Protocol/Internet Protocol (TCP/IP).

28. The method of claim 27 further including the step of writing three-dimensional graphics data for representing the update object in Virtual Reality Modeling Language (VRML).

29. The method of claim 1 further including the step of the server terminal notifying each of the plurality of client terminals of the message corresponding to the updated content of the update object in a predetermined timing.

30. The method of claim 29 further including the step of the communication network transferring the message between the plurality of client terminals and the shared server terminal based on a communication protocol, Transmission Control Protocol/Internet Protocol (TCP/IP).

31. The method of claim 30 further including the step of writing three-dimensional graphics data for representing the update object in Virtual Reality Modeling Language (VRML).

32. The method of claim 1 further including the step of the communication network transferring the message between the plurality of client terminals and the shared server terminal based on a communication protocol, Transmission Control Protocol/Internet Protocol (TCP/IP).

33. The method of claim 32 further including the step of writing three-dimensional graphics data for representing the update object in Virtual Reality Modeling Language (VRML).

34. The method of claim 1 further including the step of writing three-dimensional graphics data for representing the update object in Virtual Reality Modeling Language (VRML).

35. A system of sharing a three-dimensional virtual reality space, comprising:
- a plurality of client terminals for displaying a three-dimensional virtual reality space including an update object formed of at least two sub objects located in a predefined relationship with respect to each other and each having a state independently subject to change;
- a shared server terminal for controlling a state of the update object on each of the plurality of client terminals;
- a communication network for connecting each of the plurality of client terminals to the shared server terminal; and
- a change sequence table for defining a relationship between a change sequence of the state of each of the sub objects corresponding to the update content of the state of the update object and a message for specifying a type of the change sequence, the change sequence table being stored in each of the plurality of client terminals;
- wherein the shared server terminal simultaneously notifies each of the plurality of client terminals of the message corresponding to the updated content of the state of the update object when the state of the update object controlled by the shared server terminal is updated, and
- wherein each of the client terminals synchronously changes the state of each of the plurality of sub objects based on the change sequence specified by the message to reflect the change in the displayed three-dimensional virtual reality space.

36. An information recording method for recording a computer program on a computer readable medium for use in a three-dimensional virtual reality space sharing system comprising the steps of:
- connecting a plurality of client terminals for displaying a three-dimensional virtual reality space including an update object formed of at least two sub objects located in a predefined relationship with respect to each other and each having a state independently subject to change by a shared server terminal for controlling a state of the update object on each of the plurality of client terminals via a communication network;
- initially storing in each of the plurality of client terminals a change sequence table for defining a relationship between a sequence for changing the state of each of the plurality of sub objects according to a change in the state of the update object and for providing a message for specifying a type of the change sequence;
- simultaneously notifying each of the plurality of client terminals, when the state of the update object controlled by the shared server terminal is updated, of the message having the updated content of the state of the update object from the shared server terminal; and
- synchronously changing, on each of the plurality of client terminals, the state of each of the plurality of sub objects based on the change sequence specified by the message to reflect the change in the displayed three-dimensional virtual reality space;
- wherein the computer program is readable and executable by at least one of the terminals of the shared server terminal and the plurality of client terminals.

37. An information recording method for use in a three-dimensional virtual reality sharing system to record a computer program in an information recording medium, the computer program comprising the steps of:
- connecting a plurality of client terminals for displaying a three-dimensional virtual reality space including an update object formed of at least two of sub objects located in a predefined relationship with respect to each other and each having a state independently subject to change by a shared server terminal for controlling a state of the update object on each of the plurality of client terminals via a communication network;
- initially storing in each of the plurality of client terminals a change sequence table for defining a relationship between a sequence for changing the state of each of the plurality of sub objects according to a change in the state of the update object and for providing a message for specifying a type of the change sequence;
- simultaneously notifying each of the plurality of client terminals, when the state of the update object controlled by the shared server terminal is updated, of the message corresponding to the updated content of the state of the update object from the shared server terminal; and synchronously changing, on each of the plurality of client terminals, the state of each of the plurality of sub objects based on the change sequence specified by the message to reflect the change in the displayed three-dimensional virtual reality space;

wherein the computer program is readable and executable by at least one of the terminals of the shared server terminal and the plurality of client terminals.

38. An information transmission method for transmitting a computer program on a computer readable medium for use in a three-dimensional virtual reality space sharing system comprising the processing steps of:

connecting a plurality of client terminals for displaying a three-dimensional virtual reality space including an update object formed of at least two sub objects located in a predefined relationship with respect to each other and each having a state independently subject to change by a shared server terminal for controlling a state of the update object on each of the plurality of client terminals via a communication network;

initially storing in each of the plurality of client terminals a change sequence table for defining a relationship between a sequence for changing the state of each of the plurality of sub objects according to a change in the state of the update object and for providing a message for specifying a type of the change sequence;

simultaneously notifying each of the plurality of client terminals, when the state of the update object controlled by the shared server terminal is updated, of the message corresponding to the updated content of the state of the update object from the shared server terminal; and synchronously changing, on each of the plurality of client terminals, the state of each of the plurality of sub objects based on the change sequence specified by the message to reflect the change in the displayed three-dimensional virtual reality space;

wherein the computer program is readable and executable by at least one of the terminals of the shared server terminal and the plurality of client terminals and the executable computer program is transmitted to at least one of the terminals consisting of the shared server terminal and the plurality of client terminals.

39. An information transmission method for transmitting a computer program on a computer readable medium for use in a three-dimensional virtual reality space sharing system comprising the steps of:

connecting a plurality of client terminals for displaying a three-dimensional virtual reality space including an update object formed of at least two sub objects each having a state independently subject to change by a shared server terminal for controlling a state of the update object on each of the plurality of client terminals via a communication network;

initially storing in each of the plurality of client terminals a change sequence table for defining a relationship between a sequence for changing the state of each of the plurality of sub objects according to a change in the state of the update object and for providing a message for specifying a type of the change sequence;

simultaneously notifying each of the plurality of client terminals, when the state of the update object controlled by the shared server terminal is updated, of the message corresponding to the updated content of the state of the update object from the shared server terminal; and synchronously changing, on each of the plurality of client terminals, the state of each of the plurality of sub objects based on the change sequence specified by the message to reflect the change in the displayed three-dimensional virtual reality space;

wherein the computer program is readable and executable by at least one of the terminals of the shared server terminal and the plurality of client terminals and the executable computer program is transmitted to at least one of the terminals consisting of the shared server terminal and the plurality of client terminals.

40. An information processing method for a client terminal in a three-dimensional virtual reality space sharing system in which a plurality of client terminals for displaying a three-dimensional virtual reality space, including an update object formed of at least two sub objects located in a predefined relationship with respect to each other and each having a state independently subject to change, are connected to a shared server terminal for controlling the state of the update object on each of the plurality of client terminals via a communication network, the information processing method comprising the steps of:

initially storing in each of the plurality of client terminals a change sequence table for defining a relationship between a sequence for changing the state of each of the plurality of sub objects according to a change in the state of the update object and for providing a message for specifying a type of the change sequence;

acquiring the message corresponding to the update content of the state of the update object, the message being sent simultaneously from the shared server terminal when the state of the update object controlled by the shared server terminal is updated; and synchronously changing the state of each of the plurality of sub objects based on the change sequence specified by the message to reflect the change in the displayed three-dimensional virtual reality space.

41. A client terminal in a three-dimensional virtual reality space sharing system including a plurality of client terminals for displaying a three-dimensional virtual reality space including an update object formed of at least two sub objects located in a predefined relationship with respect to each other and each having a state independently subject to change, are connected via a shared server terminal for controlling a state of the update object on each of the plurality of client terminals via a communication network, the client terminal comprising:

storage means for initially storing in each of the plurality of client terminals a change sequence table for defining a relationship between a sequence for changing the state of each of the plurality of sub objects according to a change in the state of the update object and for providing a message for specifying a type of the change sequence;

acquiring means for acquiring the message corresponding to the update content of the state of the update object, the message being provided simultaneously from the shared server terminal when the state of the update object controlled by the shared server terminal is updated; and changing means for synchronously changing the state of each of the plurality of sub objects based on the change sequence specified by the message to reflect the change in the displayed three-dimensional virtual reality space.

42. In an information recording medium for use in a client terminal in a three-dimensional virtual reality space sharing system to record a computer program comprising the steps of:

initially storing in each of the plurality of client terminals a change sequence table for defining a relationship between a sequence for independently changing the state of each of a plurality of sub objects according to a change in the state of an update object and for a message for specifying a type of the change sequence, said plurality of sub objects located in a predefined relationship with respect to each other to form at least a portion of said update object;

acquiring the message corresponding to the update content of the state of the update object, the message being sent simultaneously from the shared server terminal when the state of the update object controlled by the shared server terminal is updated; and synchronously changing the state of each of the plurality of sub objects based on the change sequence specified by the message to reflect the change in the displayed three-dimensional virtual reality space;

wherein the computer program is recorded in the information recording medium in a state readable and executable by the client terminal.

43. An information recording method for a recording medium for use with a client terminal in a three-dimensional virtual reality space sharing system, to record a computer program, comprising the steps of:

initially storing in each of the plurality of client terminals a change sequence table for defining a relationship between a sequence for independently changing the state of each of a plurality of sub objects according to a change in the state of an update object and a message for specifying a type of the change sequence, said plurality of sub objects located in a predefined relationship with respect to each other to form at least a portion of said update object;

acquiring the message corresponding to the update content of the state of the update object, the message being sent simultaneously from the shared server terminal when the state of the update object controlled by the shared server terminal is updated; and synchronously changing the state of each of the plurality of sub objects based on the change sequence specified by the message to reflect the change in the displayed three-dimensional virtual reality space;

wherein the computer program is recorded in the recording medium in a state readable and executable by the client terminal.

44. An information transmission method for use with a client terminal in a three-dimensional virtual reality space sharing system in which a plurality of client terminals, for displaying a three-dimensional virtual reality space including an update object formed of at least two sub objects located in a predefined relationship with respect to each other and each having a state independently subject to change are connected to a shared server terminal for controlling a state of the update object on each of the plurality of client terminals via a communication network, the information transmission method transmitting a computer program, the information transmission method comprising the processing steps of:

initially storing in each of the plurality of client terminals a change sequence table for defining a relationship between a sequence for changing the state of each of the plurality of sub objects according to a change in the state of the update object and a message for specifying a type of the change sequence;

acquiring the message corresponding to the update content of the state of the update object, the message being sent simultaneously from the shared server terminal when the state of the update object controlled by the shared server terminal is updated; and synchronously changing the state of each of the plurality of sub objects based on the change sequence specified by the message to reflect the change in the displayed three-dimensional virtual reality space;

wherein the computer program is transmitted to the client terminal in a state receivable and executable by the same.

45. An information transmission method for use with a client terminal in a three-dimensional virtual reality space sharing system, in which a plurality of client terminals for displaying a three-dimensional virtual reality space including an update object formed of at least two sub objects located in a predefined relationship with respect to each other and each having a state independently subject to change, are connected via a shared server terminal for controlling a state of the update object on each of the plurality of client terminals via a communication network, the information transmission method transmitting a computer program, the information transmission method comprising the processing steps of:

initially storing in each of the plurality of client terminals a change sequence table for defining a relationship between a sequence for changing the state of each of the plurality of sub objects according to a change to the state of the update object and for providing a message for specifying a type of the change sequence;

acquiring the message corresponding to the update content of the state of the update object, the message being simultaneously provided by the shared server terminal when the state of the update object controlled by the shared server terminal is updated; and synchronously changing the state of each of the plurality of sub objects based on the change sequence specified by the message to reflect the change in the displayed three-dimensional virtual reality space;

wherein the computer program is transmitted to the client terminal in a state receivable and executable by the same.

46. An information processing method for a shared server terminal in a three-dimensional virtual reality space sharing system in which a plurality of client terminals for displaying a three-dimensional virtual reality space including an update object formed of at least two sub objects located in a predefined relationship with respect to each other and each having a state independently subject to change synchronously, are connected to a shared server terminal for controlling a state of the update object on each of the plurality of client terminals via a communication network, the information processing method comprising the steps of:

determining changes of the state of the update object controlled by the shared server terminal; and simultaneously notifying, when the state of the update object is updated, each of the plurality of client terminals of a message for specifying a type of a change sequence for each of the plurality of sub objects corresponding to the updated content of the state of the update object from the shared server terminal.

47. A shared server terminal in a three-dimensional virtual reality space sharing system in which a plurality of client terminals, for displaying a three-dimensional virtual reality space including an update object sub objects located in a predefined relationship with respect to each other and each having a state independently subject to change synchronously, are connected to a shared server terminal for controlling a state of the update object on each of the plurality of client terminals via a communication network, the shared server terminal comprising:

determining means for determining a change of the state of the update object controlled by the shared server terminal; and notifying means for simultaneously sending each of the plurality of client terminals of a message, when the state of the update object is updated, for specifying the type of a change sequence for each of the plurality of sub objects, corresponding to the updated content of the state of the update object from the shared server terminal.

48. An information recording method for use with a shared server terminal in a three-dimensional virtual reality space sharing system in which a plurality of client terminals, for displaying a three-dimensional virtual reality space, including an update object formed of at least two sub objects located in a predefined relationship with respect to each other and each having a state independently subject to change synchronously, are connected to a shared server terminal for controlling a state of the update object on each of the plurality of client terminals via a communication network, the information recording method recording a computer program comprising the steps of:

determining a change of the state of the update object controlled by the shared server terminal; and simultaneously notifying each of the plurality of client terminals of a message, when the state of the update object is updated, for specifying the type of a change sequence for each of the plurality of sub objects corresponding to the updated content of the state of the update object from the shared server terminal;

wherein the computer program is stored in the information recording medium in a state readable and executable by the shared server terminal.

49. An information recording method for use with a shared server terminal in a three-dimensional virtual reality space sharing system in which a plurality of client terminals, for displaying a three-dimensional virtual reality space including an update object formed of at least two sub objects located in a predefined relationship with respect to each other and each having a state independently subject to change synchronously, are connected to a shared server terminal for controlling a state of the update object on each of the plurality of client terminals via a communication network, the information recording method recording a computer program comprising of the steps of:

determining a change of the state of the update object controlled by the shared server terminal; and simultaneously notifying each of the plurality of client terminals of a message, when the state of the update object is updated, for specifying a type of a change sequence of each of the plurality of sub objects corresponding to the updated content of the state of the update object from the shared server terminal;

wherein the computer program is stored in an information recording medium in a state readable and executable by the shared server terminal.

50. An information transmission method for use with a shared server terminal in a three-dimensional virtual reality space sharing system in which a plurality of client terminals, for displaying a three-dimensional virtual reality space including an update object formed of at least two sub objects located in a predefined relationship with respect to each other and each having a state independently subject to change synchronously, are connected to a shared server terminal for controlling a state of the update object on each of the plurality of client terminals via a communication network, the information transmission method transmitting a computer program, the information transmission method comprising the steps of:

determining a change of the state of the update object controlled by the shared server terminal; and simultaneously notifying each of the plurality of client terminals of a message, when the state of the update object is updated, for specifying a type of a change sequence of each of the plurality of sub objects corresponding to the updated content of the state of the update object from the shared server terminal;

wherein the computer program is transmitted to the shared server terminal in a state receivable and executable by the same.

51. An information transmission method for use with a shared server terminal in a three-dimensional virtual reality space sharing system in which a plurality of client terminals, for displaying a three-dimensional virtual reality space including an update object formed of at least two sub objects located in a predefined relationship with respect to each other and each having a state independently subject to change synchronously, are connected to a shared server terminal for controlling a state of the update object on each of the plurality of client terminals via a communication network, the information transmission method transmitting a computer program, the information transmission method comprising the steps of:

determining a change of the state of the update object controlled by the shared server terminal; and simultaneously notifying each of the plurality of client terminals, when the state of the update object is updated, of a message for specifying a type of a change sequence of each of the plurality of sub objects corresponding to the updated content of the state of the update object from the shared server terminal; wherein the computer program is transmitted to the shared server terminal in a state receivable and executable by the same.

52. A method of sharing a three-dimensional virtual reality space, comprising the steps of:

connecting a plurality of client terminals for displaying a three-dimensional virtual reality space including an update object formed of at least two sub objects located in a predefined relationship with respect to each other and each having a state independently subject to change by a shared server terminal for controlling the state of the update object on each of the plurality of client terminals via a communication network;

registering in each of the plurality of client terminals a change sequence table for defining a relationship between a sequence of changing the state of each of the plurality of sub objects according to a change to the state of the update object and a message for specifying a type of the change sequence;

simultaneously notifying each of the plurality of client terminals of the message corresponding to the updated content of the state of the update object from the shared server terminal when the state of the update object controlled by the shared server terminal is updated; and synchronously changing on each of the plurality of client terminals the state of each of the plurality of sub objects based on the change sequence specified by the message to reflect the change in the displayed three-dimensional virtual reality space;

wherein when said message indicating said change of the state of the update object is entered from one of said plurality of client terminals, said message is transmitted to each other of said other plurality of client terminals and in synchronization with the change sequence of said plurality of sub objects in said one of said plurality of client terminals, said change sequences of the plurality of sub objects in each of said other plurality of client terminals are started.

53. The method of claim 52 wherein the notifying step includes the step of updating the content of the state of update object modes including displacement and rotation.

54. The method of claim 53 wherein the synchronously changing step includes the steps of synchronously changing in each of said plurality of client terminals at least one of: a direction of displacement, a velocity of displacement, a period of displacement, and a distance of displacement, and changing at least one of: a direction of rotation, a velocity of rotation, a period of rotation and a distance of rotation, of each of the plurality of sub objects.

55. The method of claim 54 further including the step of the server terminal simultaneously notifying each of the plurality of client terminals of the message corresponding to the updated content of the update object in a predetermined timing.

56. The method of claim 55 further including the step of the communication network transferring the message between the plurality of client terminals and the shared server terminal based on a communication protocol, Transmission Control Protocol/Internet Protocol (TCP/IP).

57. The method of claim 56 further including the step of writing three-dimensional graphics data for representing the update object in Virtual Reality Modeling Language (VRML).

58. The method of claim 52 wherein the synchronously changing step includes the steps of synchronously changing in each of said plurality of client terminals at least one of: a direction of displacement, a velocity of displacement, a period of displacement, and a distance of displacement, and changing at least one of: a direction of rotation, a velocity of rotation, a period of rotation and a distance of rotation, of each of the plurality of sub objects.

59. The method of claim 58 further including the step of the server terminal simultaneously notifying each of the plurality of client terminals of the message corresponding to the updated content of the update object in a predetermined timing.

60. The method of claim 59 further including the step of the communication network transferring the message between the plurality of client terminals and the shared server terminal based on a communication protocol, Transmission Control Protocol/Internet Protocol (TCP/IP).

61. The method of claim 60 further including the step of writing three-dimensional graphics data for representing the update object in Virtual Reality Modeling Language (VRML).

62. The method of claim 52 further including the step of the server terminal simultaneously notifying each of the plurality of client terminals of the message corresponding to the updated content of the update object in a predetermined timing.

63. The method of claim 62 further including the step of the communication network transferring the message between the plurality of client terminals and the shared server terminal based on a communication protocol, Transmission Control Protocol/Internet Protocol (TCP/IP).

64. The method of claim 63 further including the step of writing three-dimensional graphics data for representing the update object in Virtual Reality Modeling Language (VRML).

65. The method of claim 52 further including the step of the communication network transferring the message between the plurality of client terminals and the shared server terminal based on a communication protocol, Transmission Control Protocol/Internet Protocol (TCP/IP).

66. The method of claim 65 further including the step of writing three-dimensional graphics data for representing the update object in Virtual Reality Modeling Language (VRML).

67. The method of claim 52 further including the step of writing three-dimensional graphics data for representing the update object in Virtual Reality Modeling Language (VRML).

* * * * *

UNITED STATES PATENT AND TRADEMARK OFFICE
CERTIFICATE OF CORRECTION

PATENT NO. : 6,570,563 B1
DATED : May 27, 2003
INVENTOR(S) : Yasuaki Honda

It is certified that error appears in the above-identified patent and that said Letters Patent is hereby corrected as shown below:

Title page,
Item [57], ABSTRACT,
Line 7, after "According" insert -- to --.

Column 8,
Line 40, change "fifteen" to -- fifteenth --;

Column 9,
Line 64, change "changes" to -- change --.

Column 11,
Line 46, change "38." to -- 38 --;
Line 56, change "build" to -- built --.

Column 12,
Line 9, change ":.co jp" to -- .co.jp --;
Line 10, remove extra space between "html." and "1995.";
Line 55, delete "a" between "WWW" and "server";
Line 55, insert -- a -- between "by" and "server".

Column 14,
Line 25, change "executes" to -- execute --.

Column 16,
Line 57, insert -- . -- after "itself".

Column 17,
Line 13, change "he" to -- the --;
Line 38, after "through" change "13-1" to -- 13-3 --.

Column 19,
Line 22, after "made" insert -- to --.

Column 20,
Line 15, change "an" to -- and --.

Column 21,
Line 7, after "made" insert -- to --.

Column 30,
Line 56, change "user" to -- use --.

UNITED STATES PATENT AND TRADEMARK OFFICE
CERTIFICATE OF CORRECTION

PATENT NO. : 6,570,563 B1
DATED : May 27, 2003
INVENTOR(S) : Yasuaki Honda

It is certified that error appears in the above-identified patent and that said Letters Patent is hereby corrected as shown below:

<u>Column 35,</u>
Line 40, after "talk" insert -- to --.

<u>Column 39,</u>
Line 10, change "allows implements" to -- allows the implementation of --.

<u>Column 40,</u>
Line 40, change "of a" to -- of: a --.

Signed and Sealed this

Thirteenth Day of January, 2004

JON W. DUDAS
*Acting Director of the United States Patent and Trademark Office*